(12) United States Patent
Sato et al.

(10) Patent No.: US 10,108,643 B2
(45) Date of Patent: Oct. 23, 2018

(54) GRAPHICAL INTERFACE DEVICE, GRAPHICAL INTERFACE METHOD AND MEDIUM

(75) Inventors: Tatsuhito Sato, Tokyo (JP); Tomohiko Gotoh, Kanagawa (JP); Daisuke Mochizuki, Chiba (JP); Yuki Okamura, Saitama (JP)

(73) Assignee: SONY CORPORATION, Tokyo (JP)

( * ) Notice: Subject to any disclaimer, the term of this patent is extended or adjusted under 35 U.S.C. 154(b) by 530 days.

(21) Appl. No.: 14/113,399

(22) PCT Filed: May 25, 2012

(86) PCT No.: PCT/JP2012/003419
§ 371 (c)(1),
(2), (4) Date: Oct. 23, 2013

(87) PCT Pub. No.: WO2012/169135
PCT Pub. Date: Dec. 13, 2012

(65) Prior Publication Data
US 2014/0052763 A1    Feb. 20, 2014

(30) Foreign Application Priority Data

Jun. 8, 2011  (JP) ................................ 2011-128360
Jun. 8, 2011  (JP) ................................ 2011-128361

(51) Int. Cl.
*G06F 3/048*      (2013.01)
*G06F 17/30*     (2006.01)
(Continued)

(52) U.S. Cl.
CPC ...... *G06F 17/30289* (2013.01); *G06F 3/0488* (2013.01); *G06F 3/04842* (2013.01);
(Continued)

(58) Field of Classification Search
CPC .............. G06F 17/30289; G06F 3/048; G06F 17/30241; G06F 715/70; G06F 3/0488;
(Continued)

(56) References Cited

U.S. PATENT DOCUMENTS 5,784,061 A * 7/1998 Moran ................ G06F 3/04883
                                                            345/173
5,790,121 A * 8/1998 Sklar ................ G06F 17/30572
                                                            715/835
(Continued)

FOREIGN PATENT DOCUMENTS

JP          10-63462 A      3/1998
JP      2003-173208 A       6/2003
(Continued)

OTHER PUBLICATIONS

Vesanto et al., Clustering of the Self-Organizing Map, IEEE Transactions on Neural Networks, vol. 11, No. 3, May 2000.*
(Continued)

*Primary Examiner* — Tuyetlien T Tran
(74) *Attorney, Agent, or Firm* — Chip Law Group

(57) ABSTRACT

An information processing device, method and computer program product use a display controller that causes a display device to display a cluster name having a data item association with a cluster of at least one data item. An operation acquisition portion is configured to acquire information associated with a user operation performed on the cluster. An editing portion edits the cluster name and data item association in accordance with the user operation. As a consequence the associations between data items may easily be formed along with associated cluster names formed.

21 Claims, 31 Drawing Sheets

(51) Int. Cl.
*G06F 3/0488* (2013.01)
*G06F 3/0484* (2013.01)
*G06F 3/01* (2006.01)

(52) U.S. Cl.
CPC .... *G06F 3/04883* (2013.01); *G06F 17/30241* (2013.01); *G06F 3/017* (2013.01)

(58) Field of Classification Search
CPC ...... G06F 3/041; G06F 3/04883; G06F 3/017; G06F 3/04842; G06F 3/0482
See application file for complete search history.

(56) References Cited

U.S. PATENT DOCUMENTS

| | | | | |
|---|---|---|---|---|
| 8,538,961 | B2* | 9/2013 | Xu | G06F 17/30244 382/159 |
| 8,874,525 | B2* | 10/2014 | Grossman | G06F 17/2288 707/665 |
| 2002/0080180 | A1* | 6/2002 | Mander | G06F 3/0483 715/769 |
| 2004/0119763 | A1* | 6/2004 | Mizobuchi | G06F 3/04883 715/863 |
| 2004/0189707 | A1* | 9/2004 | Moore | G06F 17/30115 715/777 |
| 2005/0027712 | A1* | 2/2005 | Gargi | G06F 17/30274 |
| 2006/0238498 | A1* | 10/2006 | Kando | G06F 3/04883 345/156 |
| 2006/0251338 | A1* | 11/2006 | Gokturk | G06F 17/30253 382/305 |
| 2007/0273558 | A1* | 11/2007 | Smith | G08G 1/0962 340/995.1 |
| 2008/0103773 | A1* | 5/2008 | Kirshenbaum | G06F 17/2785 704/252 |
| 2008/0163107 | A1* | 7/2008 | Haug | G06F 17/30637 715/804 |
| 2008/0232695 | A1 | 9/2008 | Noda et al. | |
| 2008/0301565 | A1* | 12/2008 | Abhyanker | G06F 3/0481 715/744 |
| 2009/0100383 | A1* | 4/2009 | Sunday | G06F 3/04883 715/863 |
| 2009/0132469 | A1* | 5/2009 | White | G06Q 10/00 |
| 2010/0004857 | A1* | 1/2010 | Pereira | G01C 21/00 701/533 |
| 2010/0095248 | A1* | 4/2010 | Karstens | G06F 3/048 715/846 |
| 2010/0149212 | A1* | 6/2010 | Fukuya | G06F 17/30241 345/629 |
| 2010/0229129 | A1* | 9/2010 | Price | G06F 3/04883 715/863 |
| 2012/0026100 | A1* | 2/2012 | Migos | G06F 3/04883 345/173 |
| 2012/0131500 | A1* | 5/2012 | Fujisawa | G06F 3/04817 715/800 |
| 2012/0162093 | A1* | 6/2012 | Buxton | G06F 3/0482 345/173 |
| 2012/0250950 | A1* | 10/2012 | Papakipos | G06F 17/30247 382/118 |
| 2013/0055127 | A1* | 2/2013 | Saito | G06F 3/0486 715/769 |
| 2013/0069885 | A1* | 3/2013 | Davidson | G06F 3/0416 345/173 |

FOREIGN PATENT DOCUMENTS

| | | | | |
|---|---|---|---|---|
| JP | 2006-304855 A | | 11/2006 | |
| JP | 2008-204348 A | | 9/2008 | |
| JP | 2011-34152 A | * | 2/2011 | |
| WO | WO 2012112132 | * | 8/2012 | H04N 5/445 |

OTHER PUBLICATIONS

Zhang et al., Efficient Propagation for Face Annotation in Family Albums, ISSN/ISBN 9781581138931, Dec. 1, 2004.*
International Search Report dated Jul. 3, 2012, in PCT/JP2012/003419.

* cited by examiner

[Fig. 1]
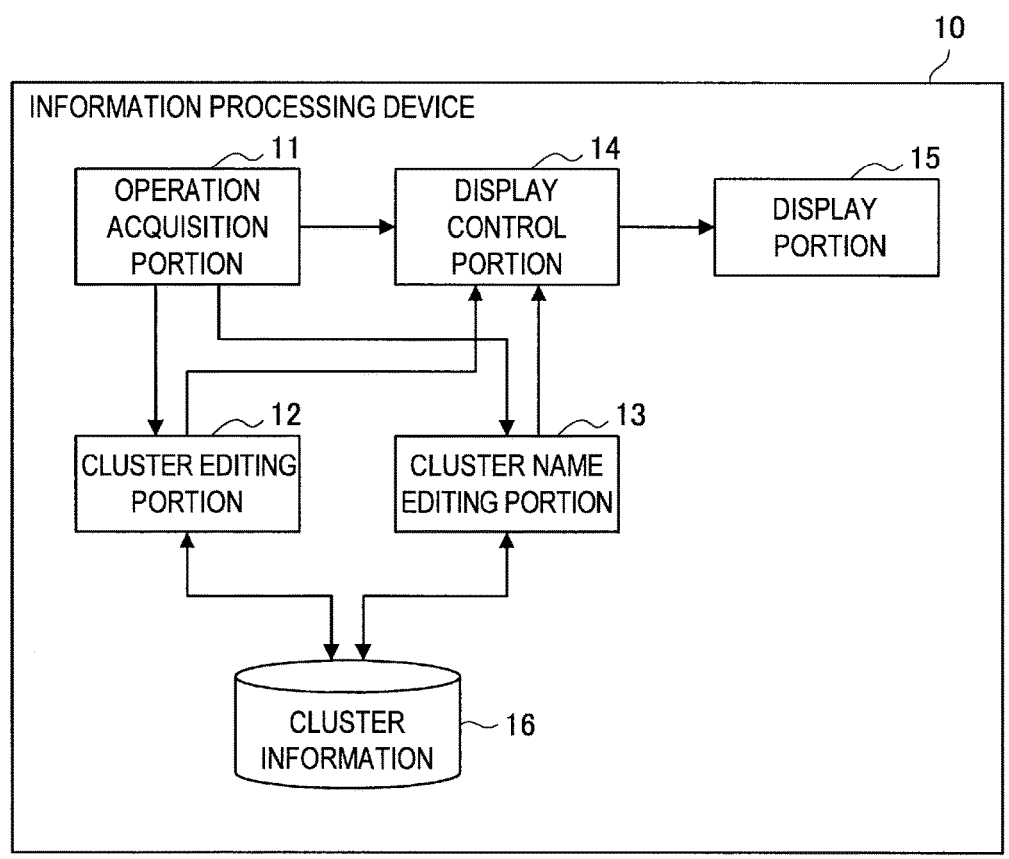

[Fig. 2]
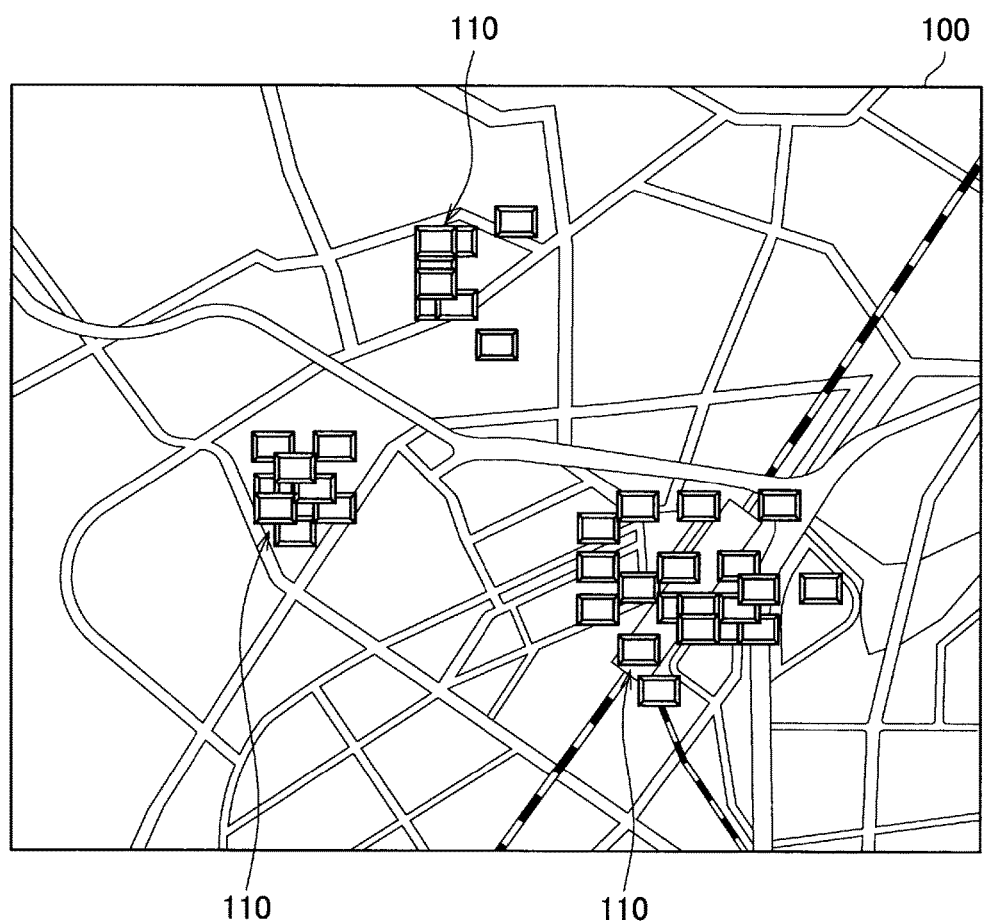

[Fig. 3]
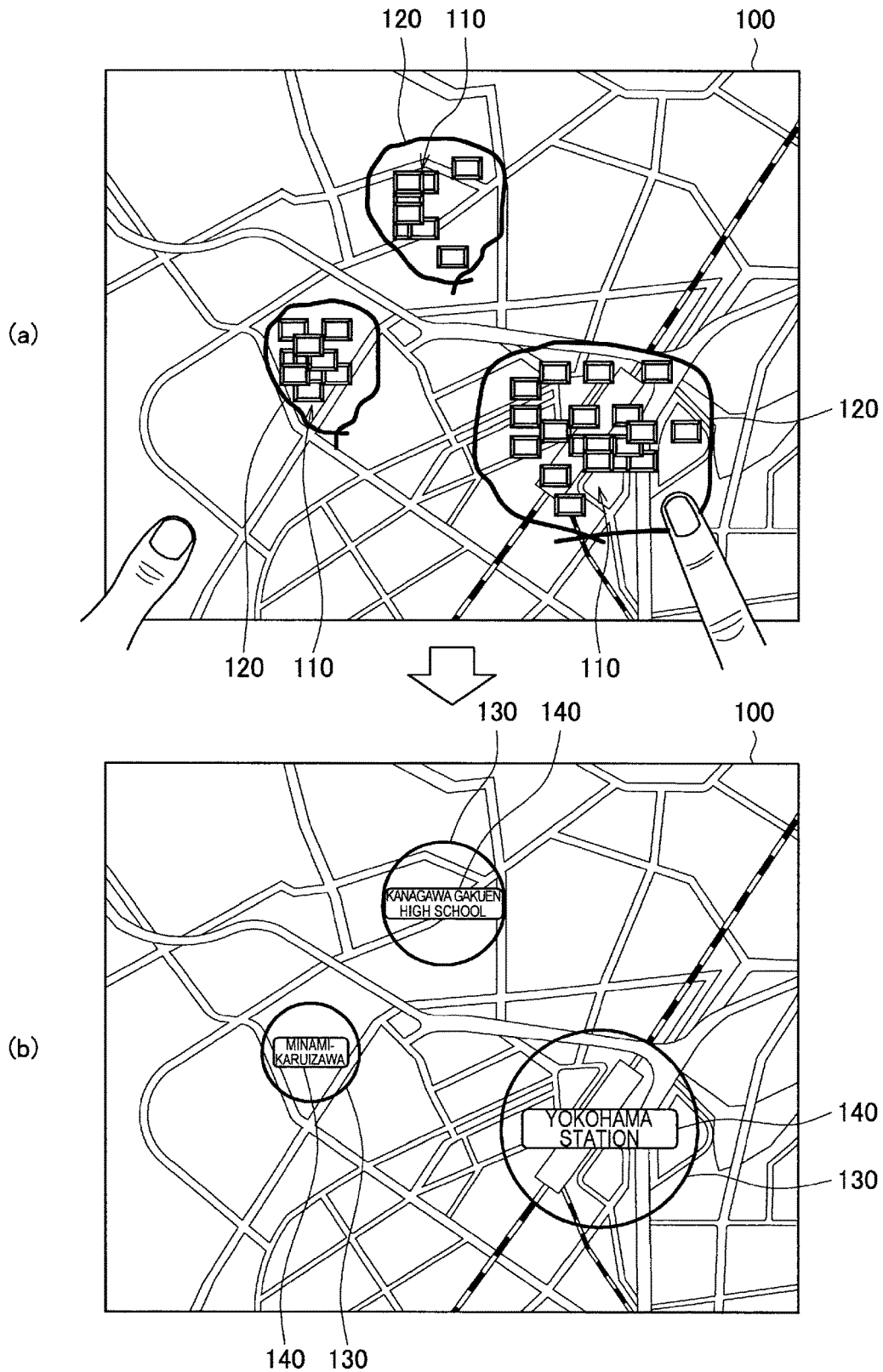

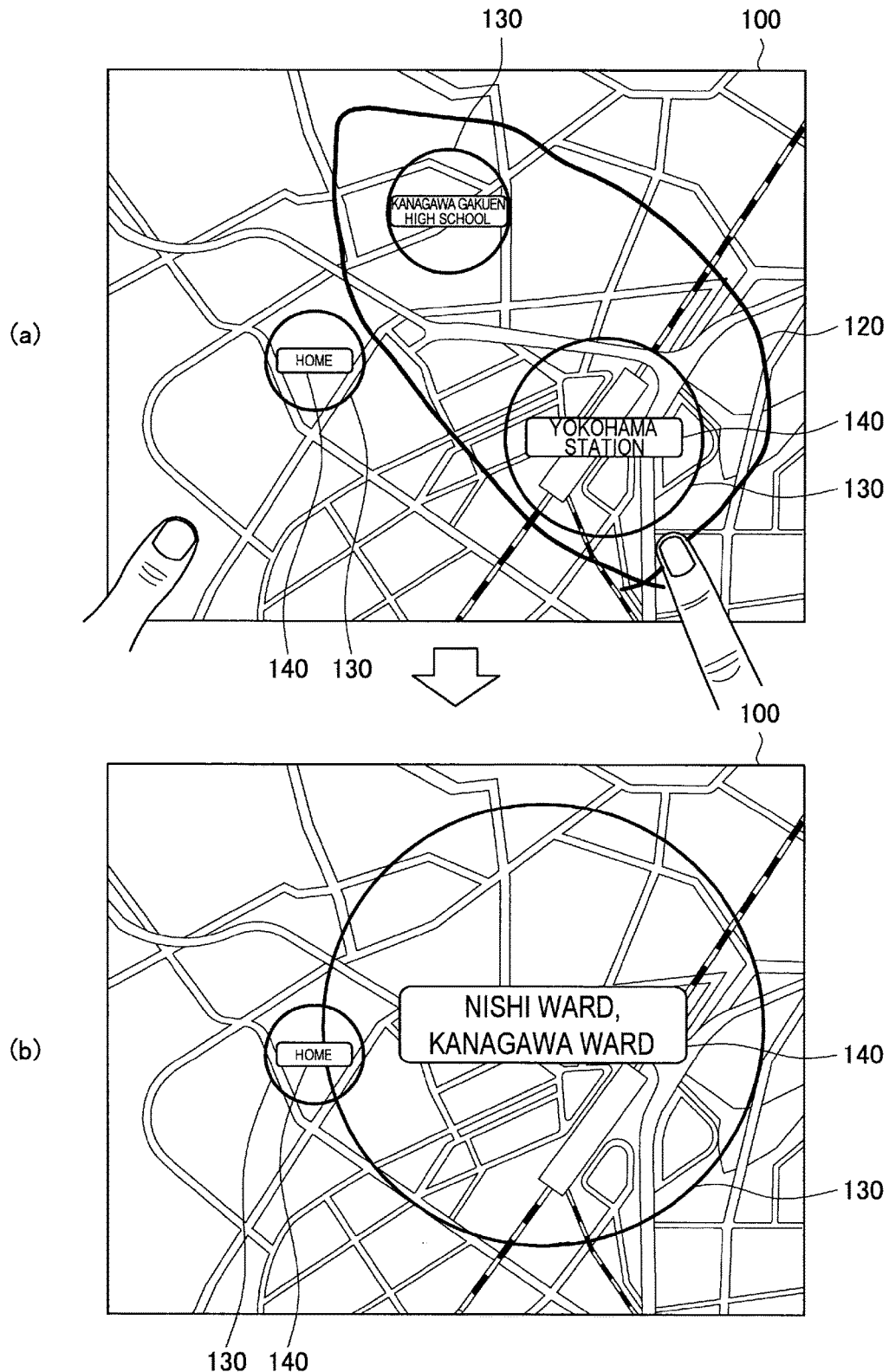
[Fig. 4]

[Fig. 5]
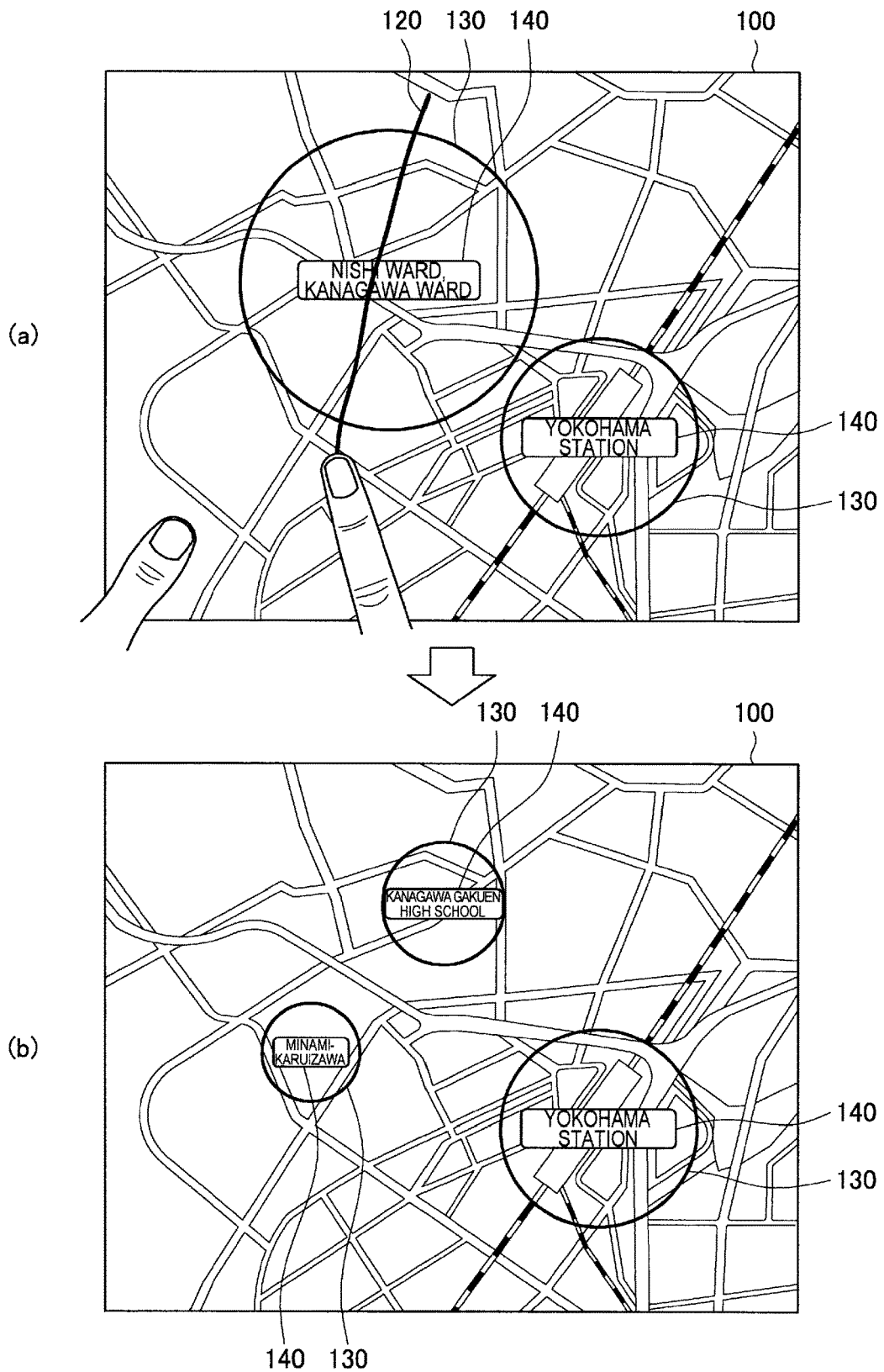

[Fig. 6]
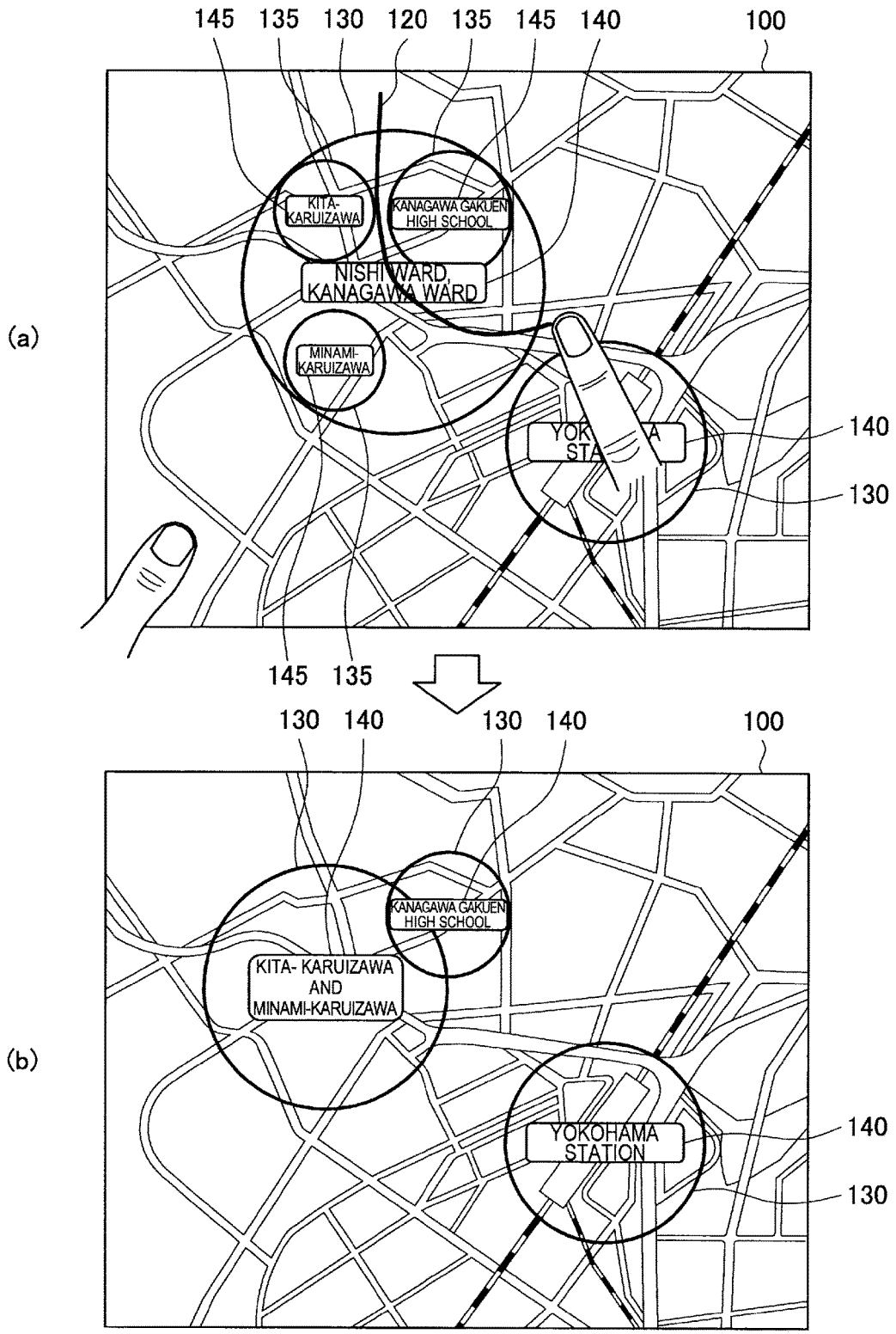

[Fig. 7]
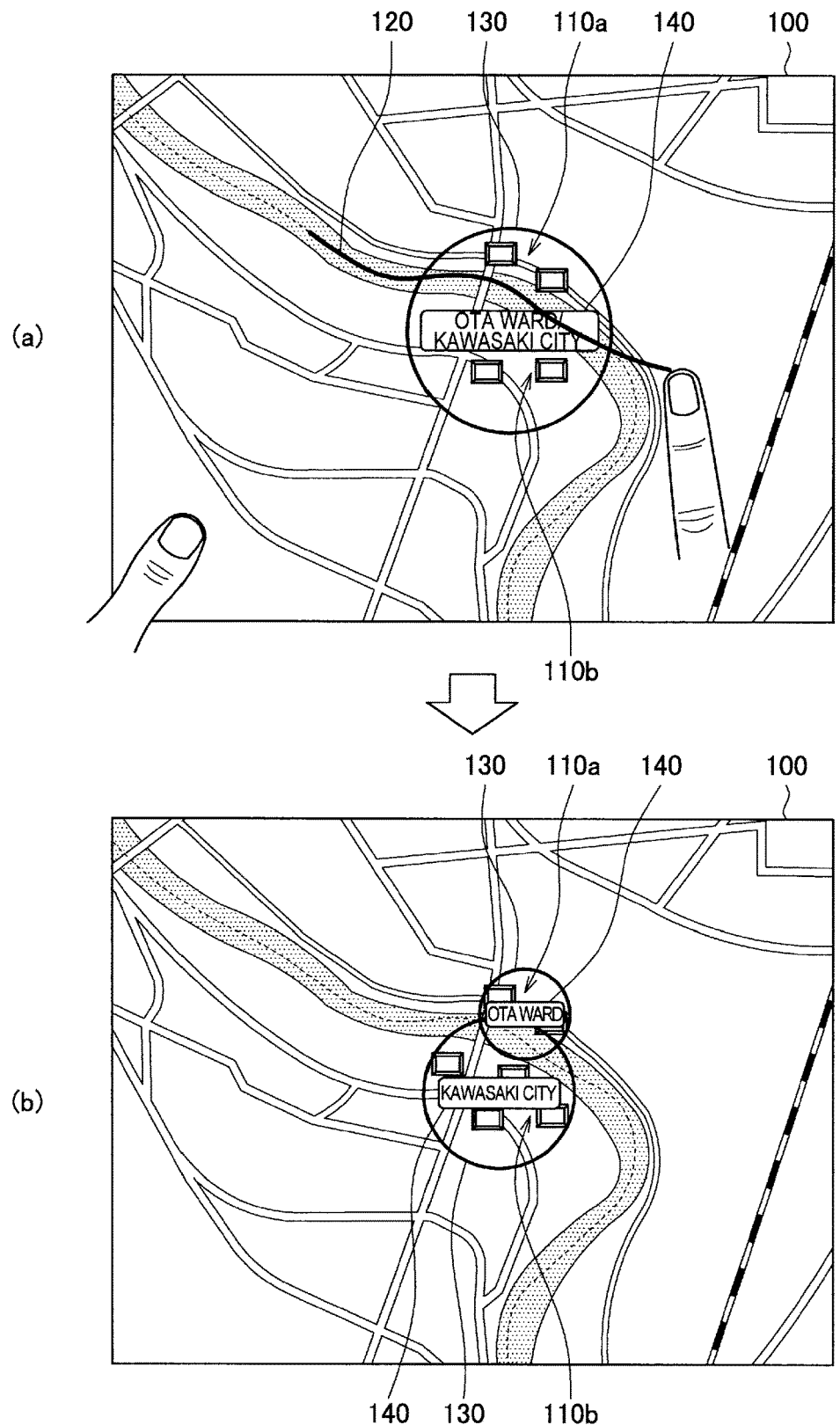

[Fig. 8]
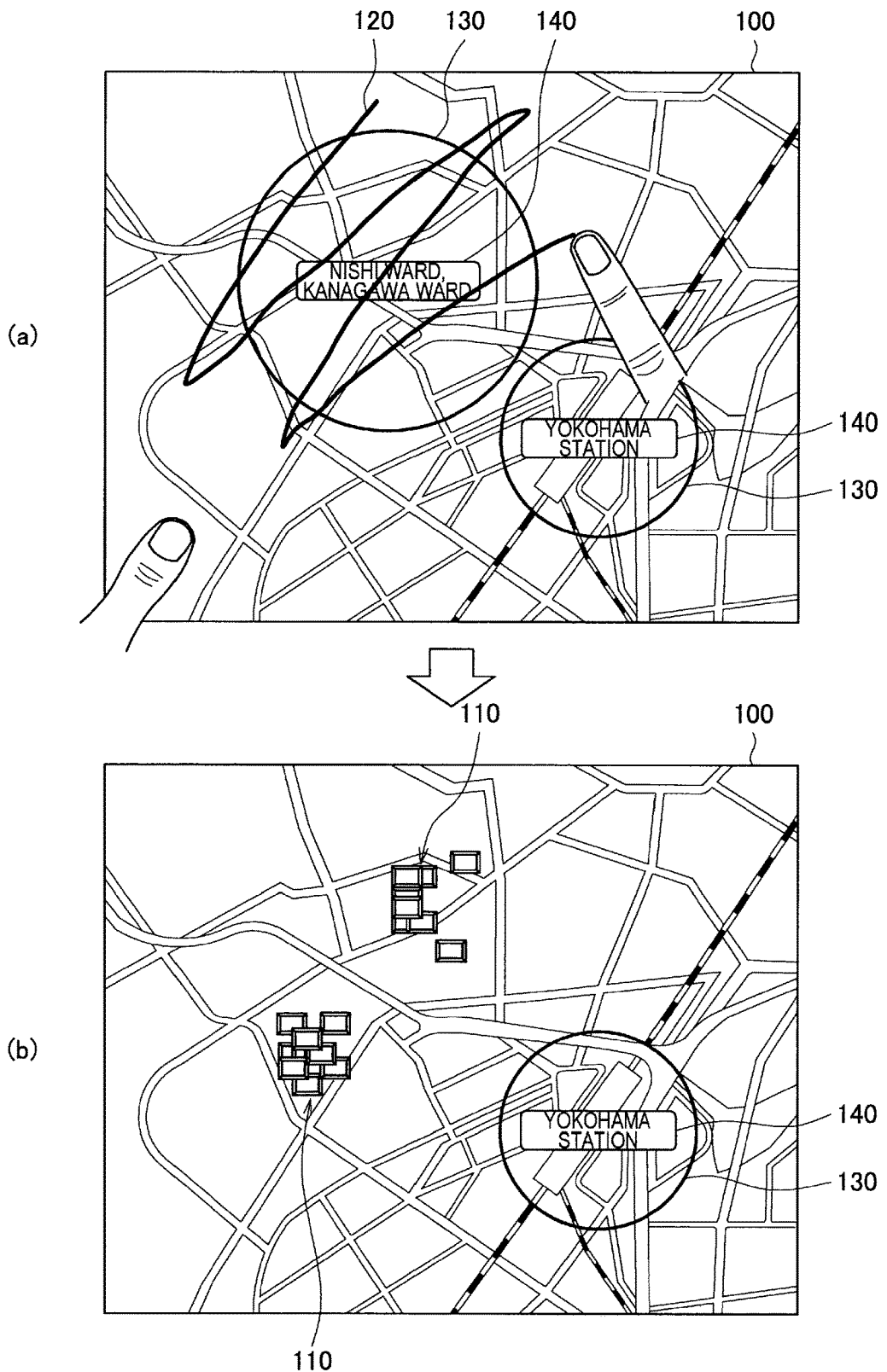

[Fig. 9]
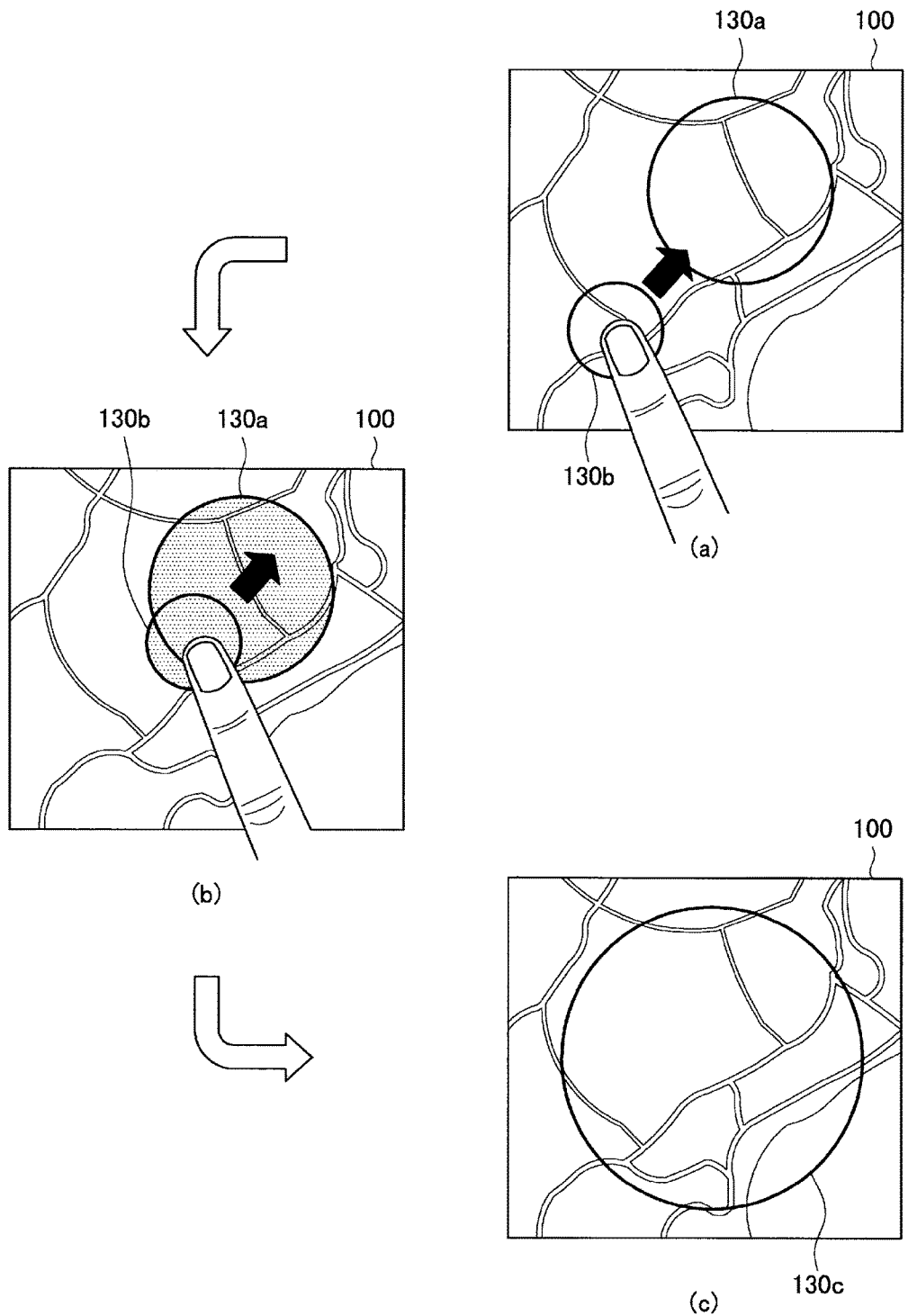

[Fig. 10]
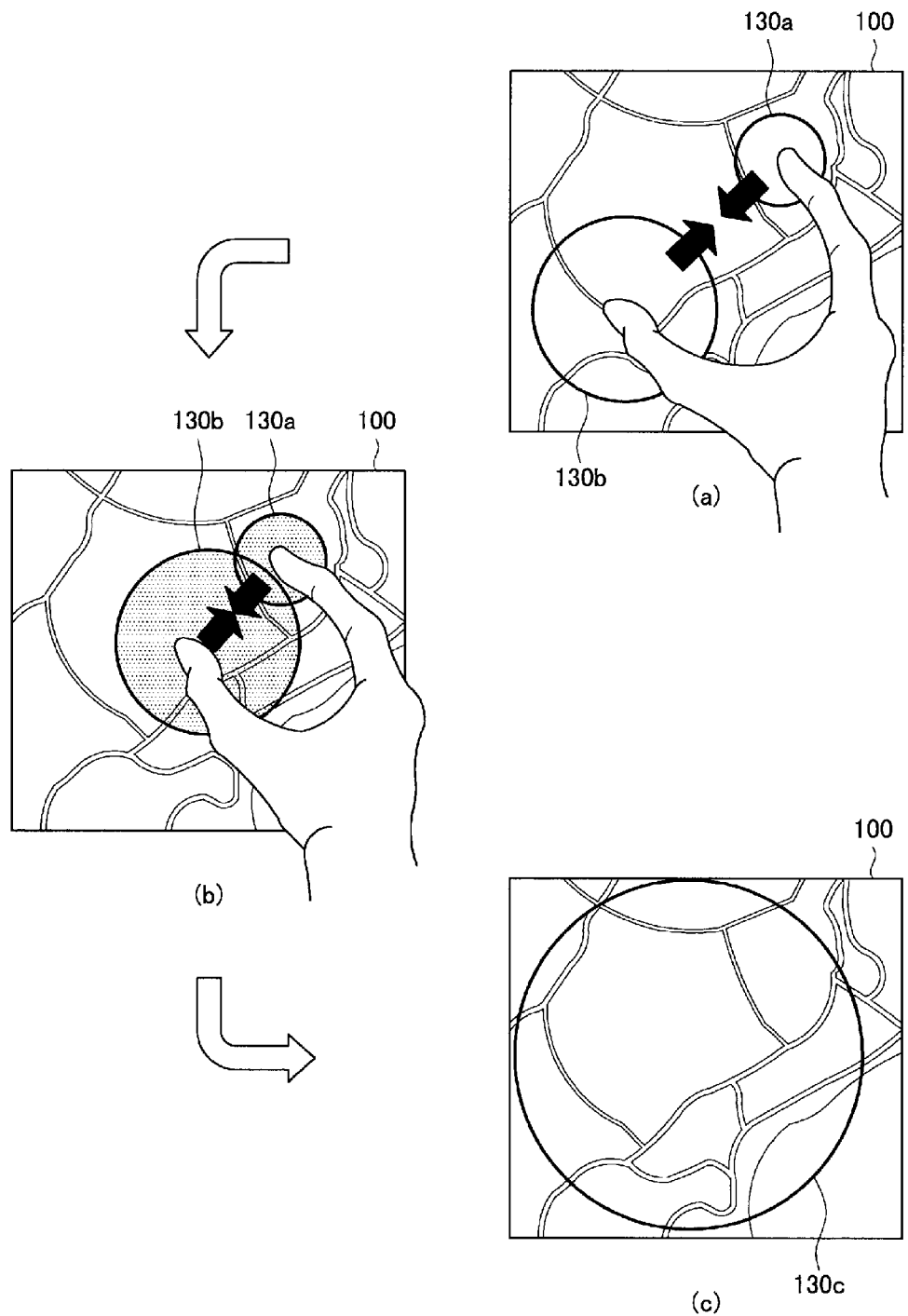

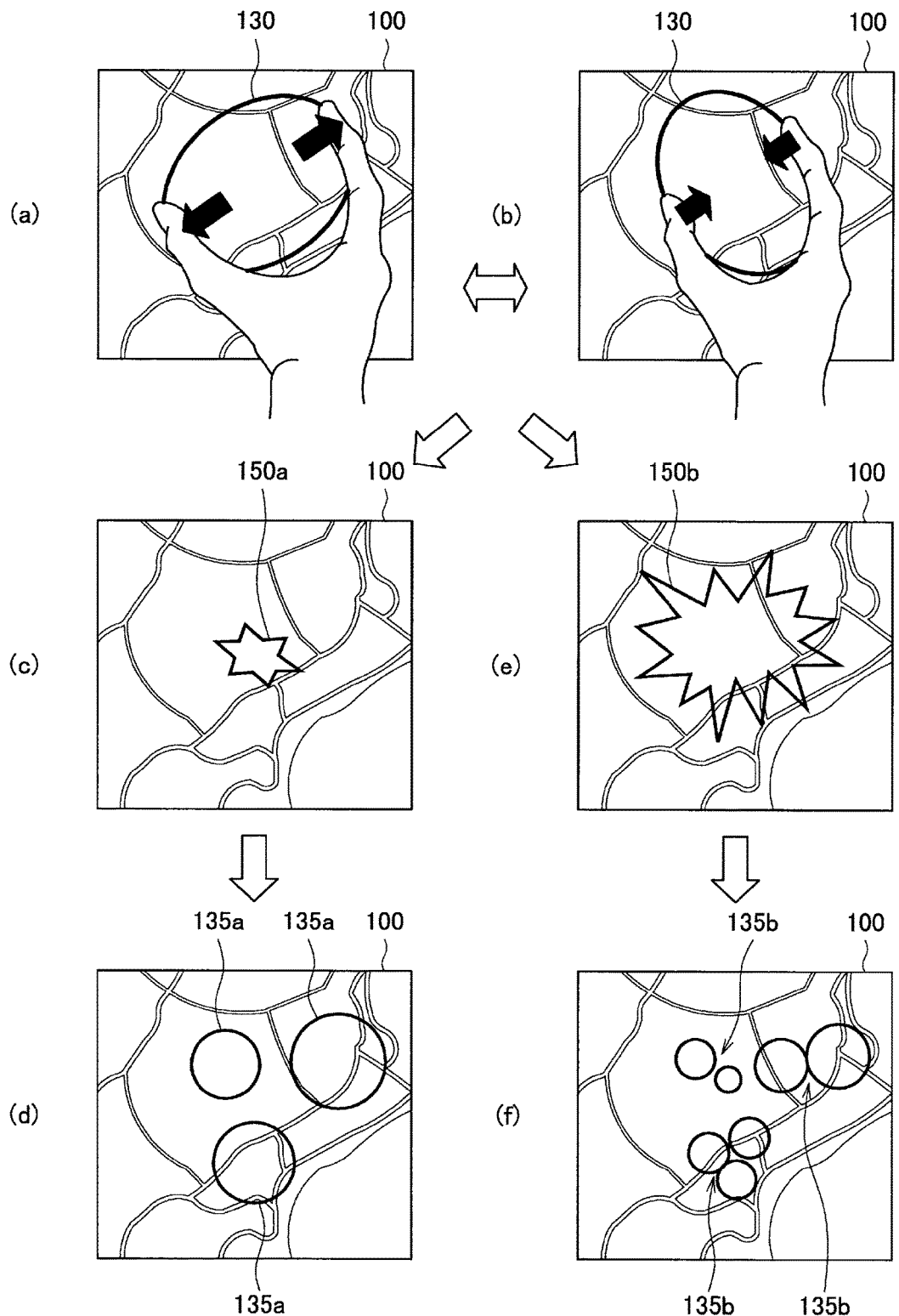
[Fig. 11]

[Fig. 12]
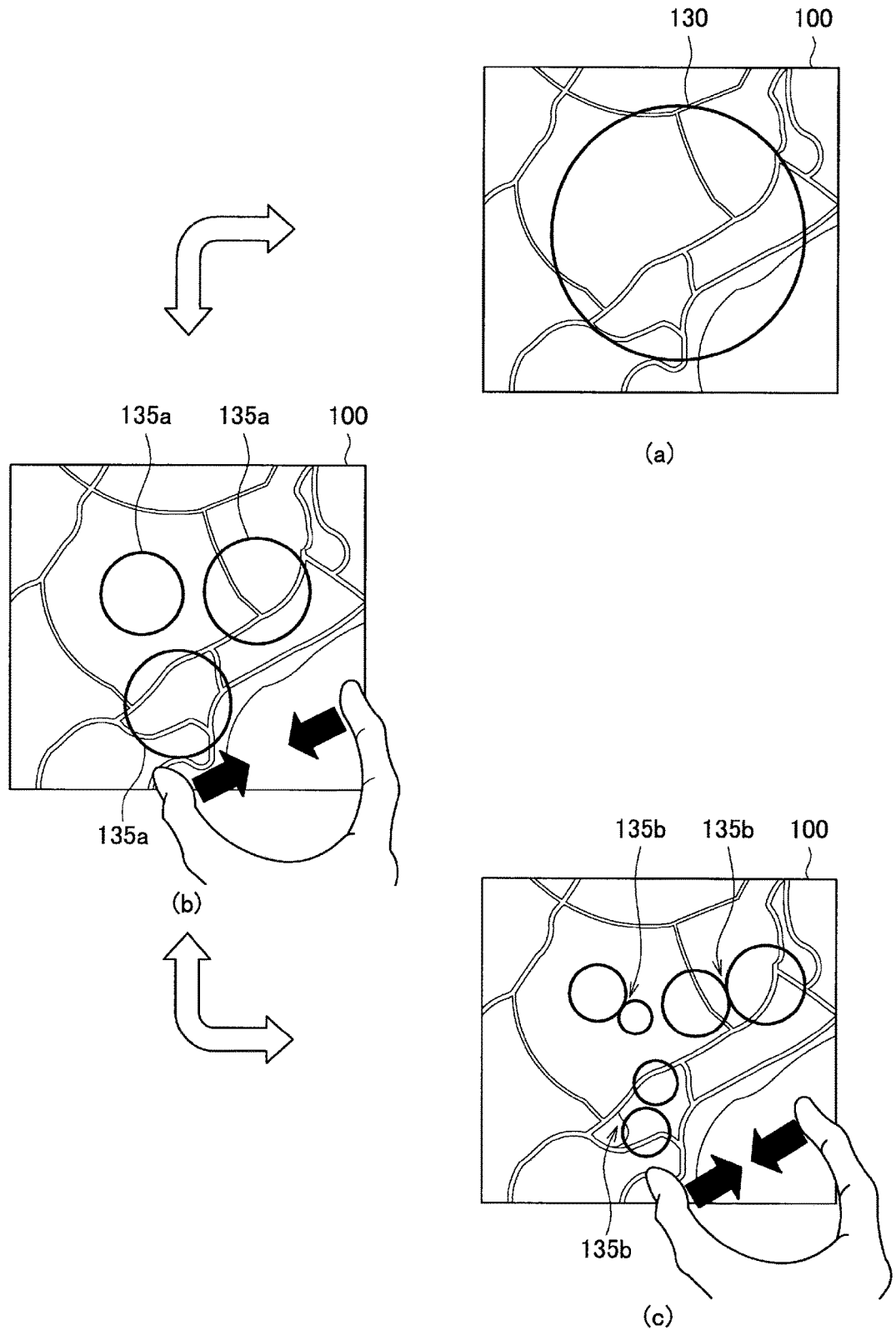

[Fig. 13]
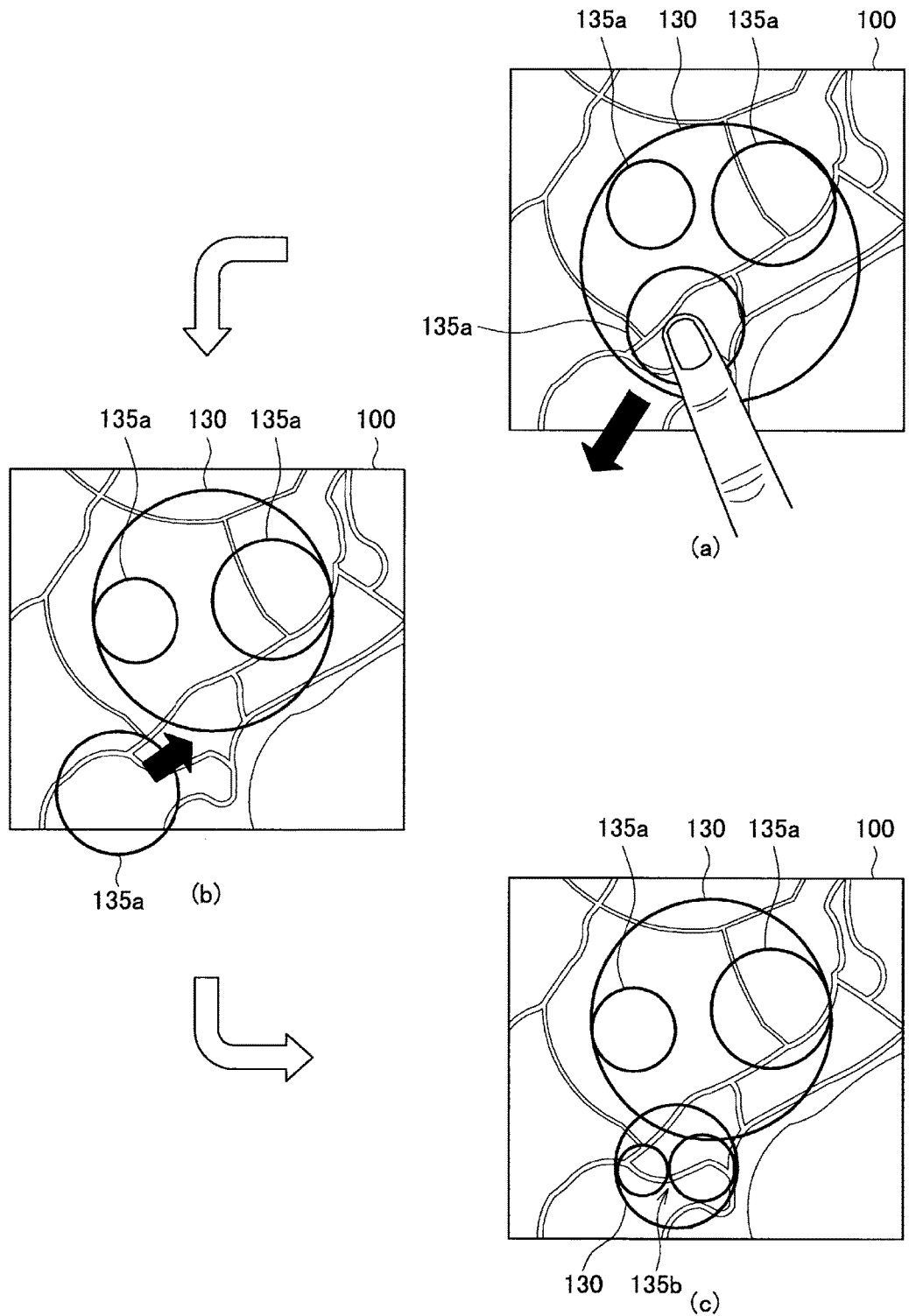

[Fig. 14]
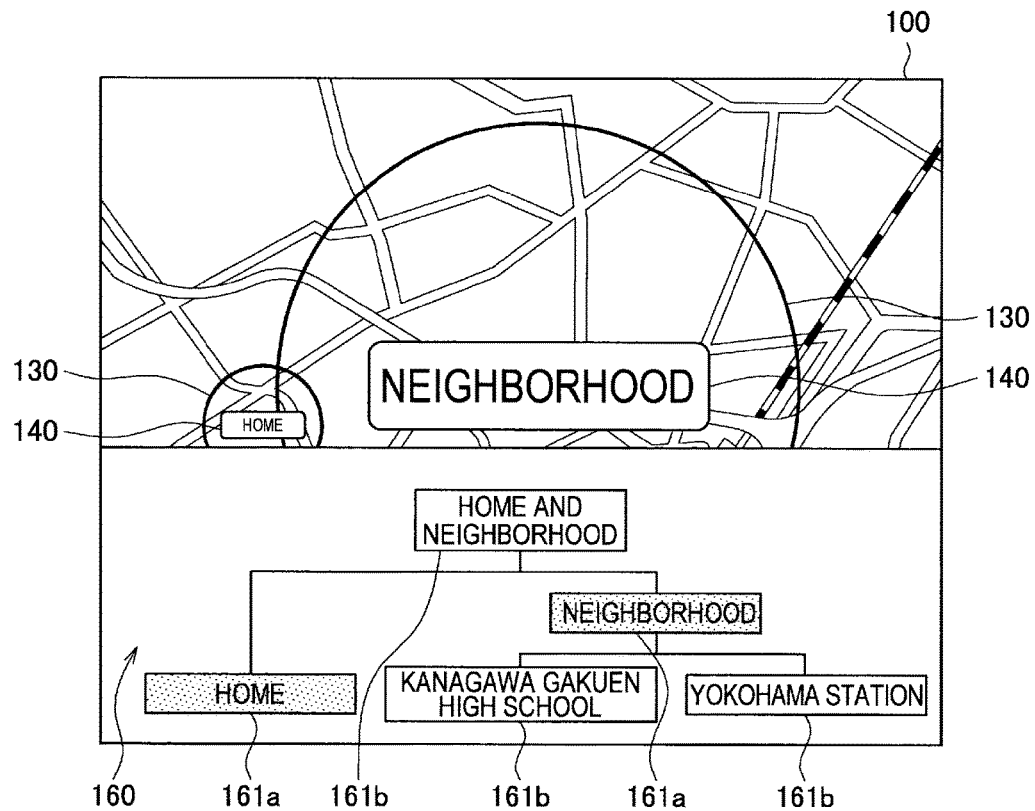
[Fig. 15]
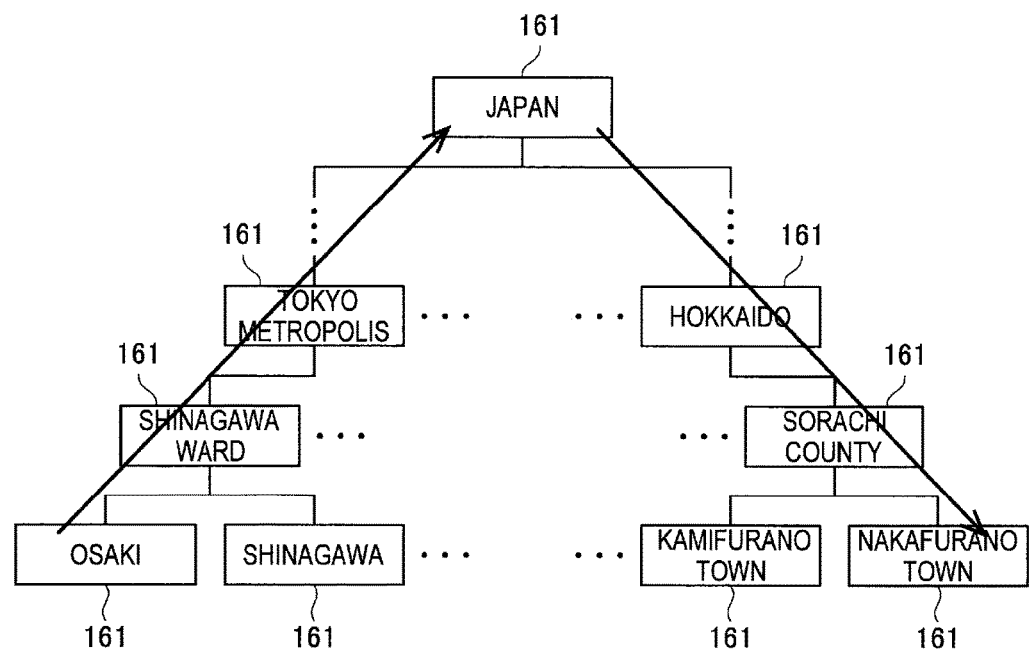

[Fig. 16]
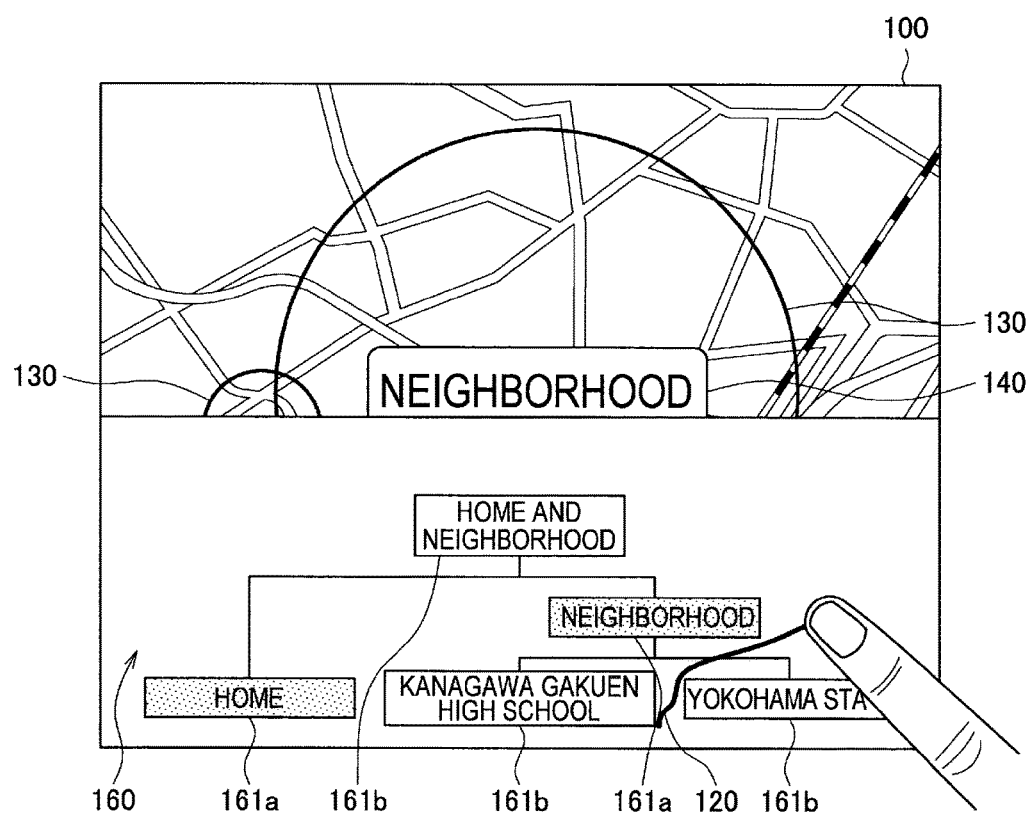

[Fig. 17]
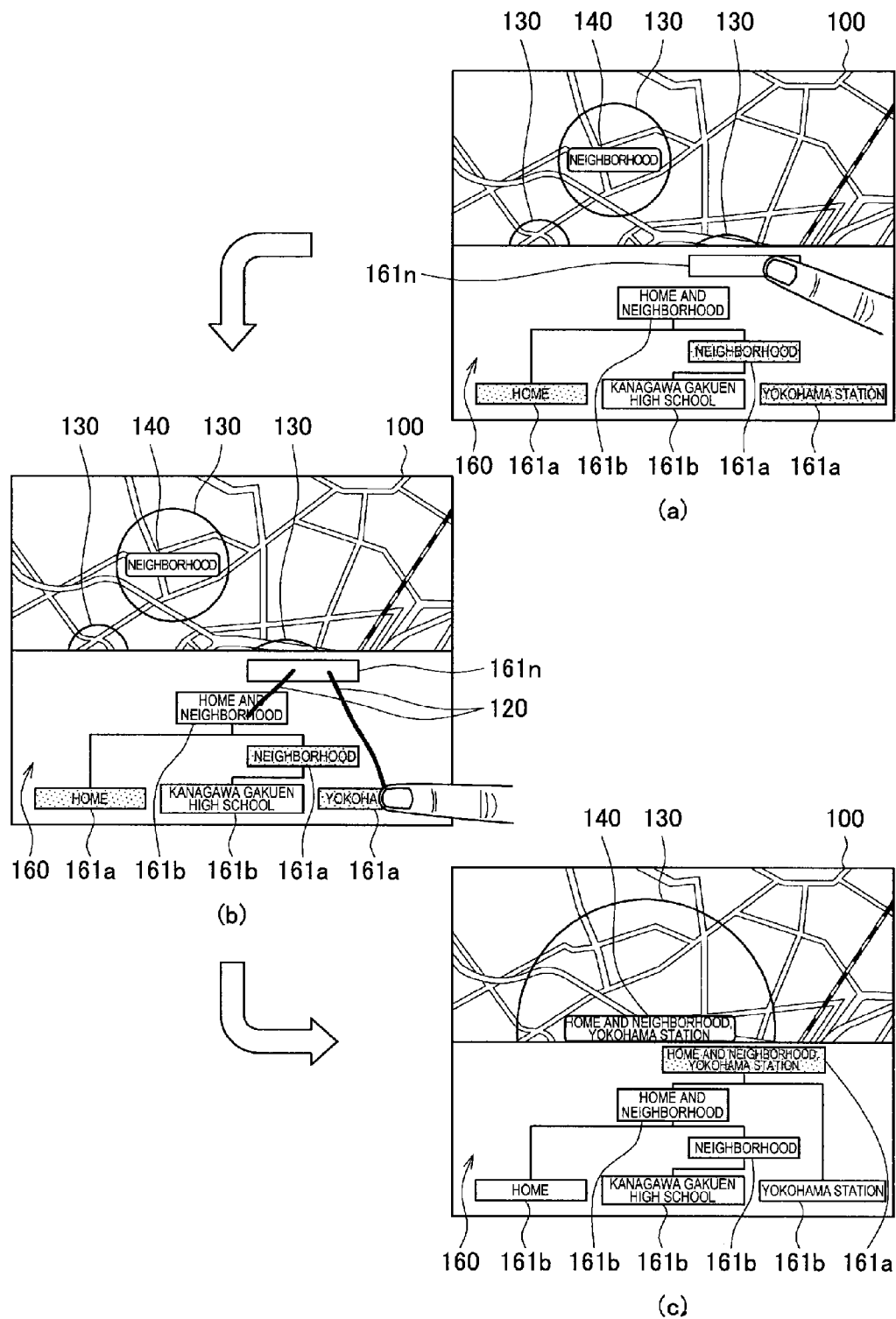

[Fig. 18]
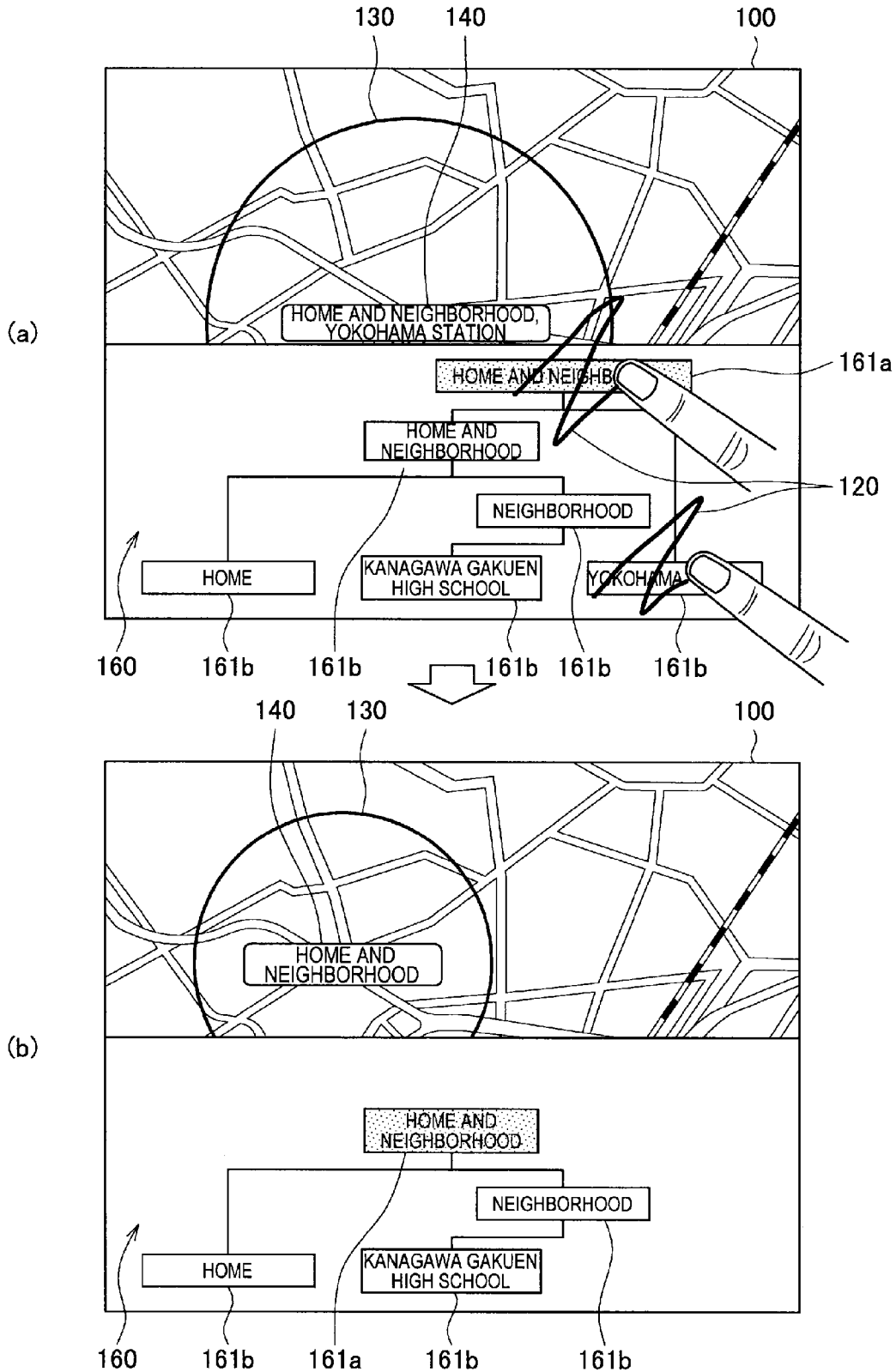

[Fig. 19]
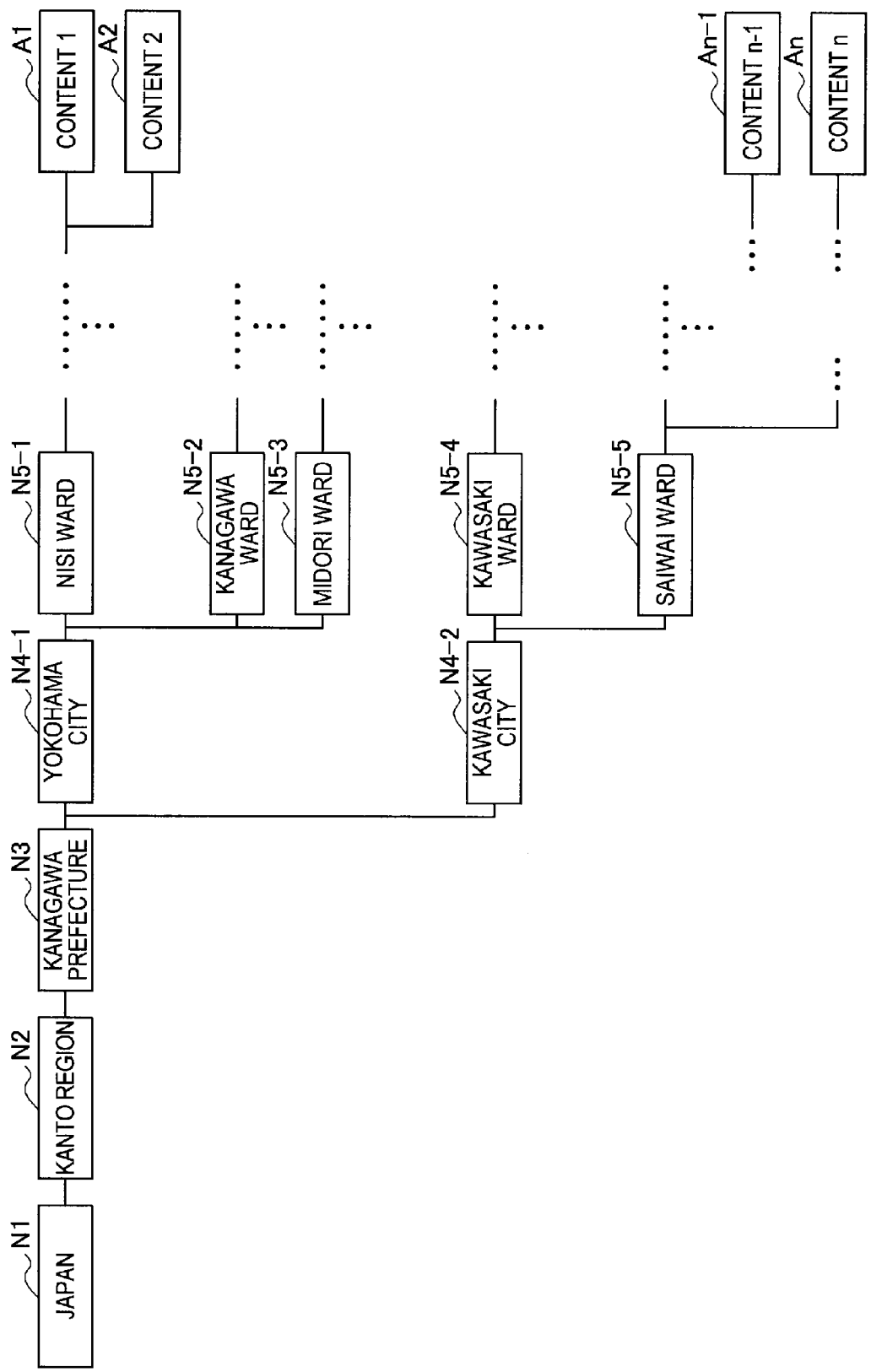

[Fig. 20]
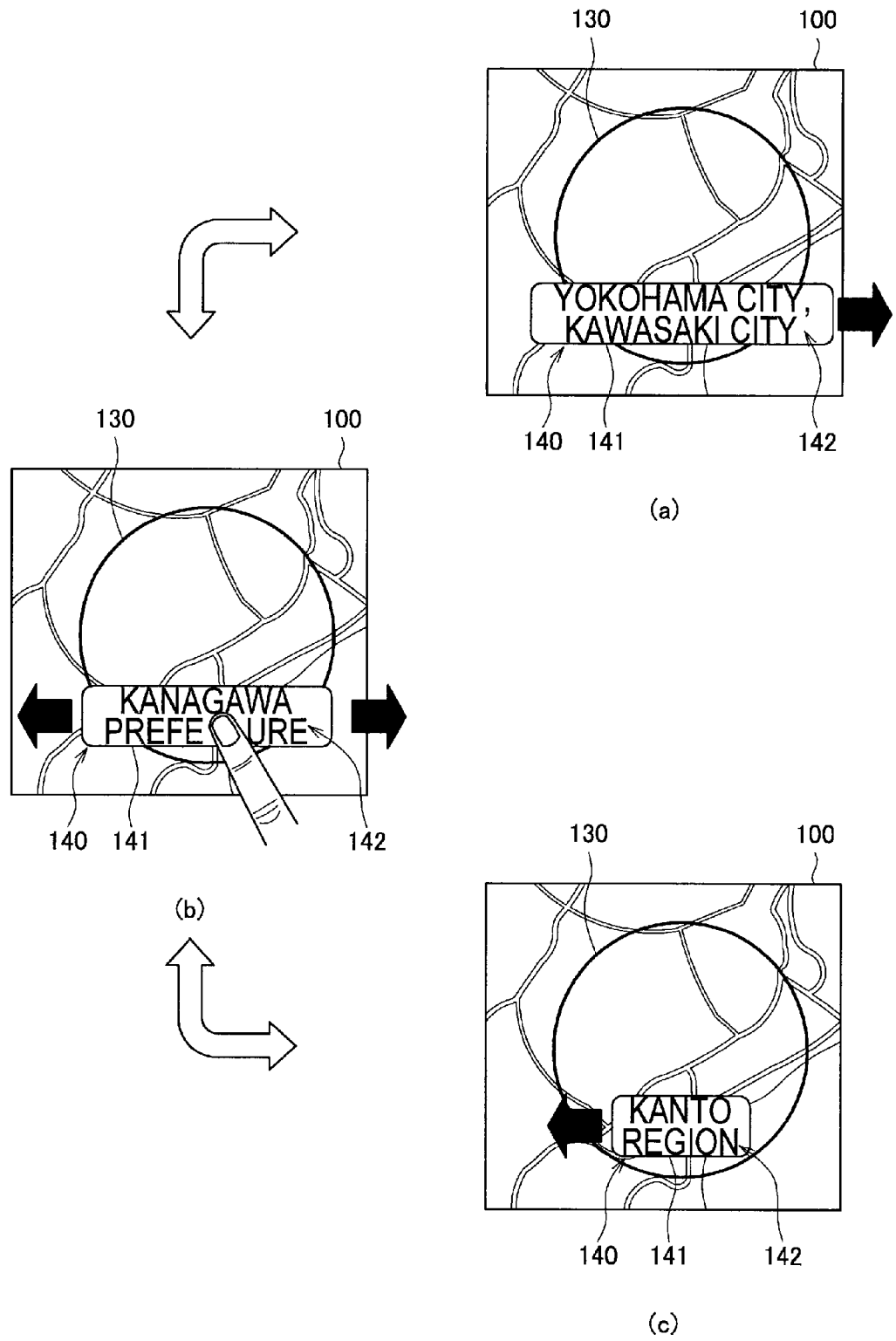

[Fig. 21]
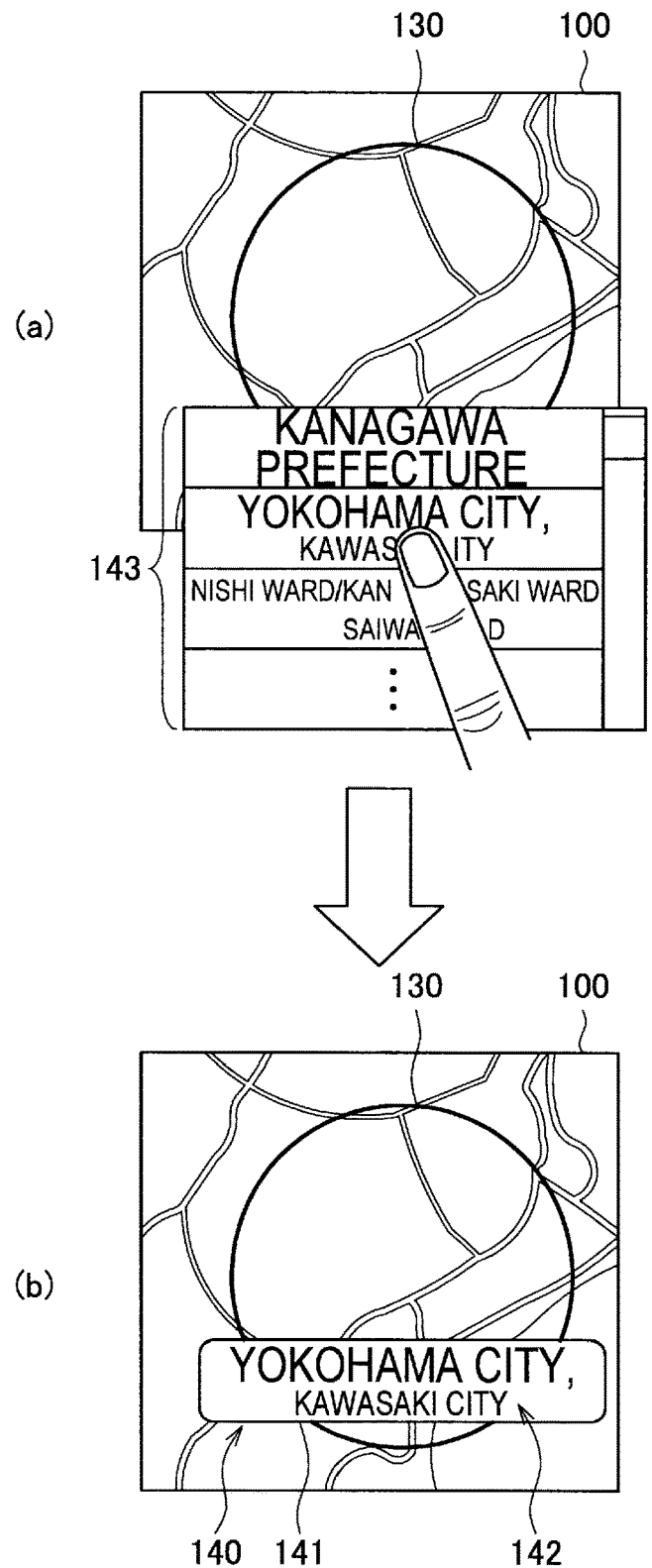

[Fig. 22]
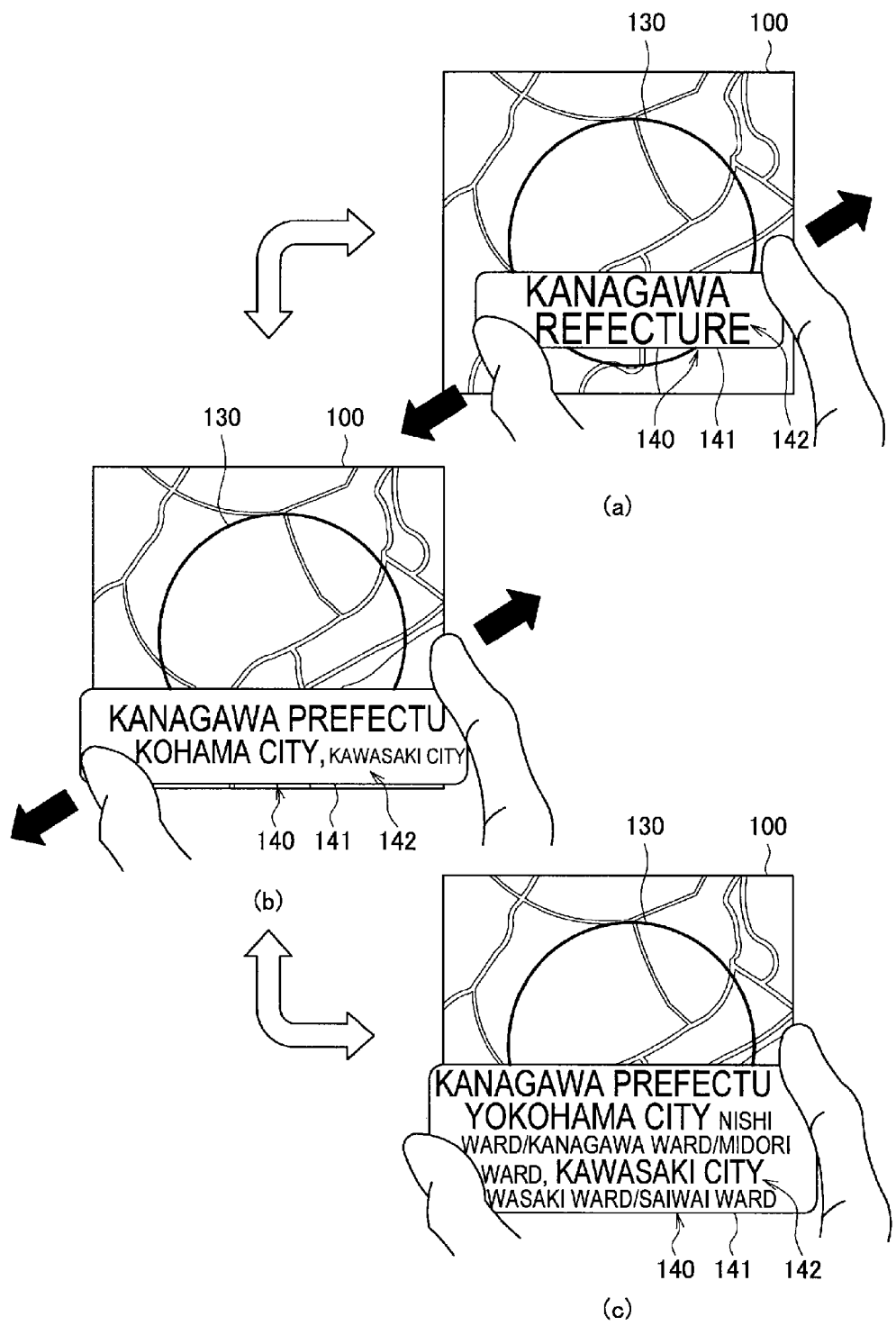

[Fig. 23]
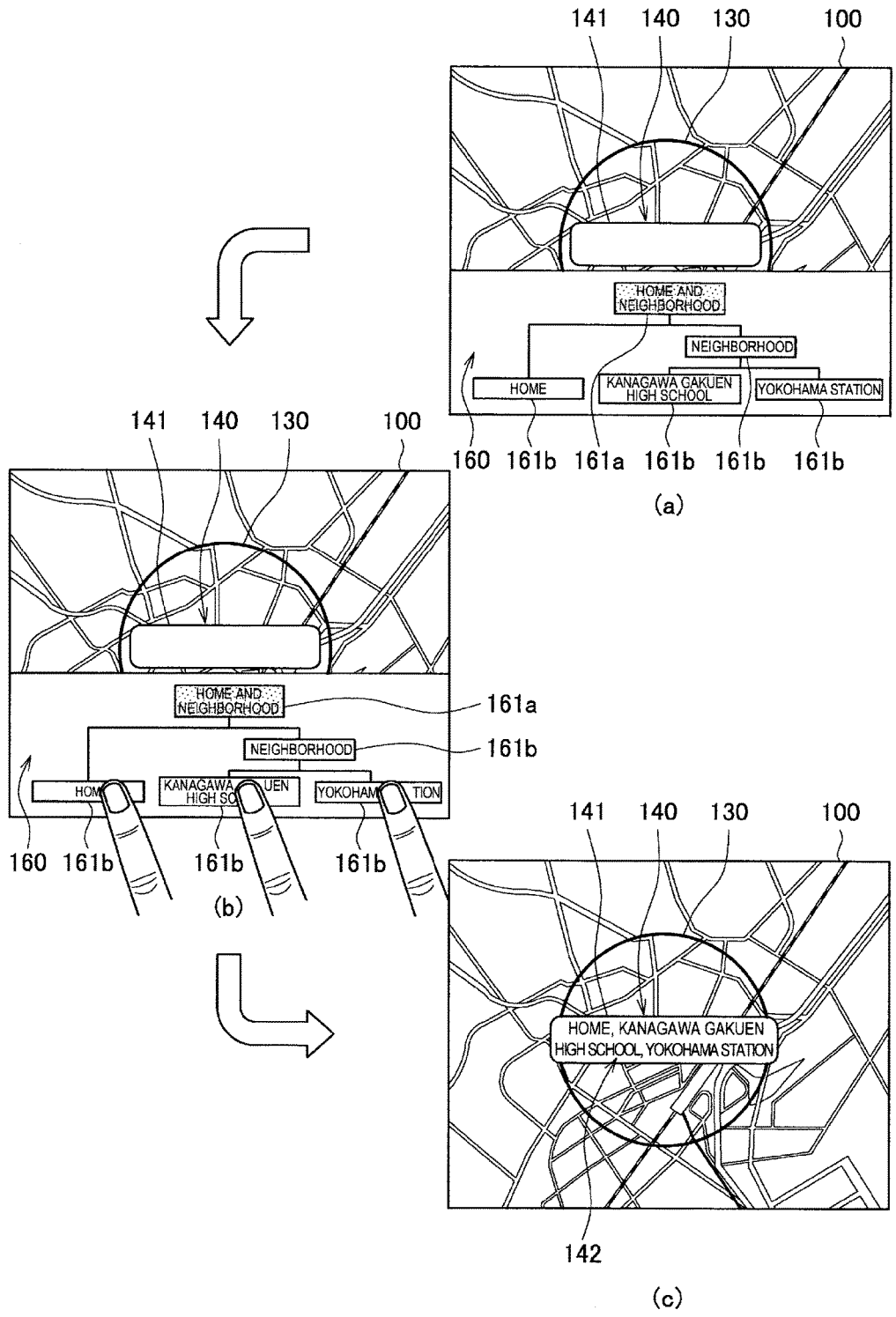

[Fig. 24]
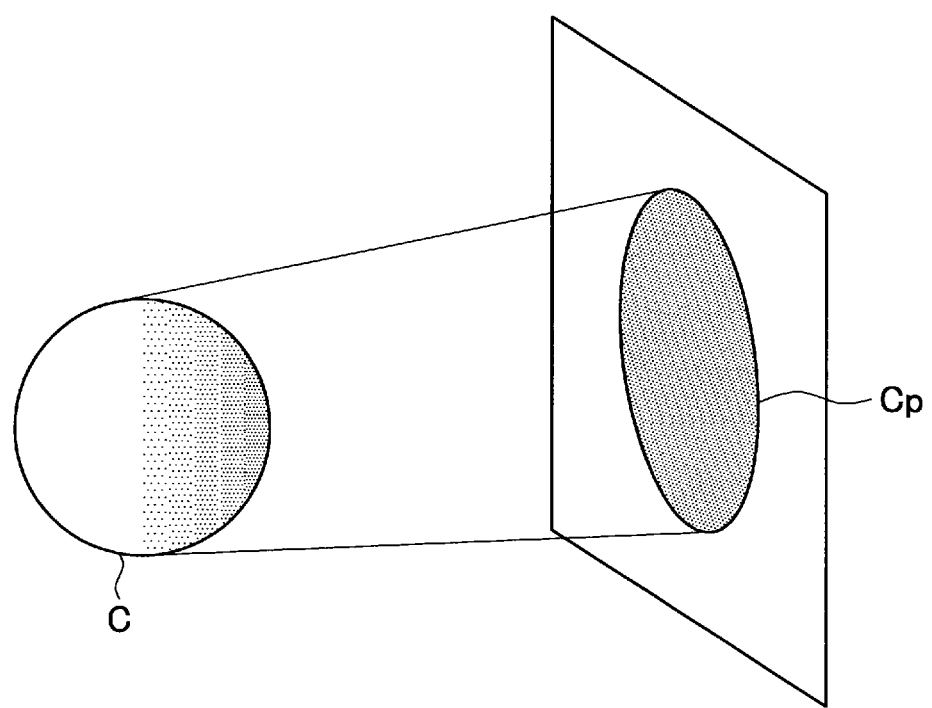

[Fig. 25]
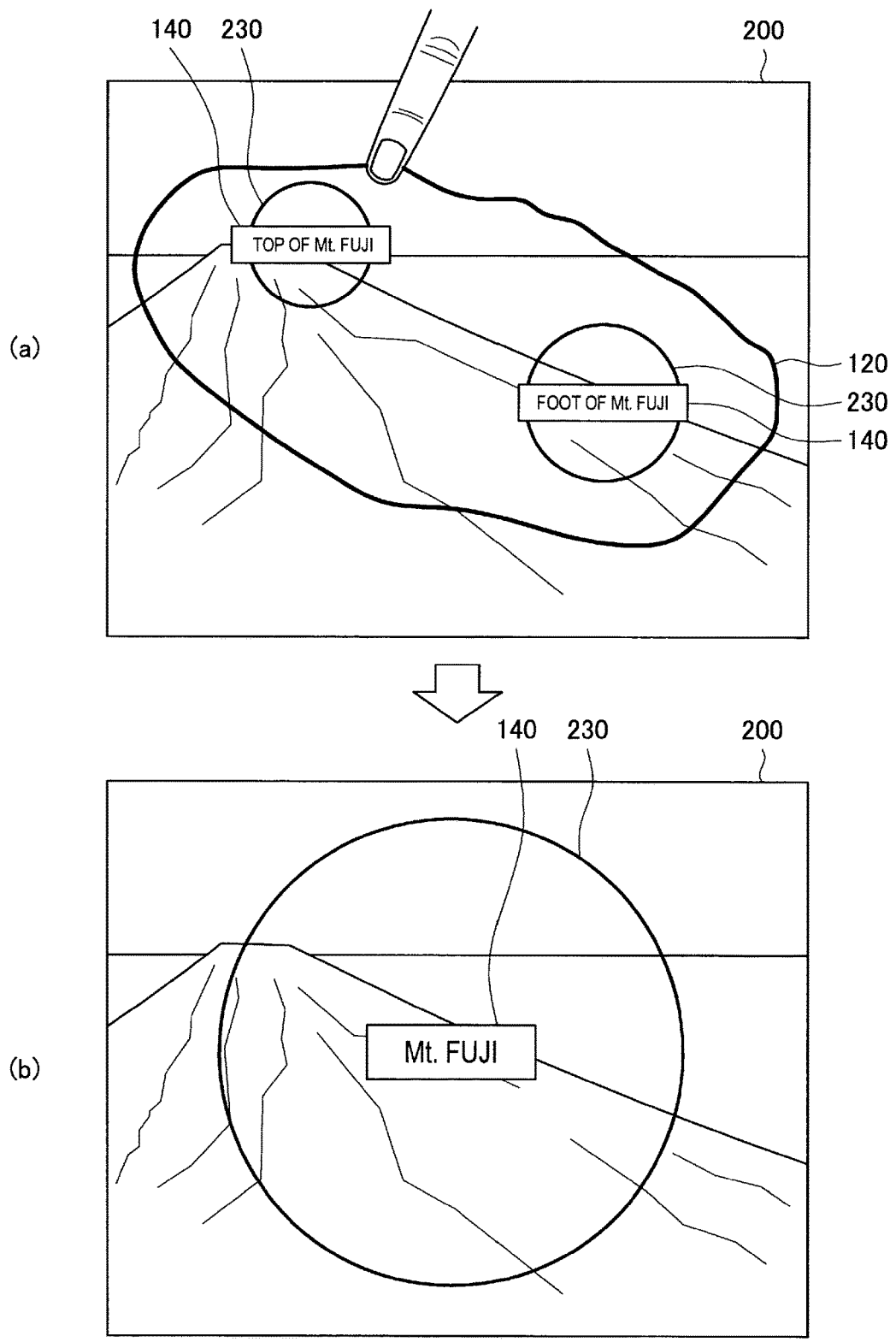

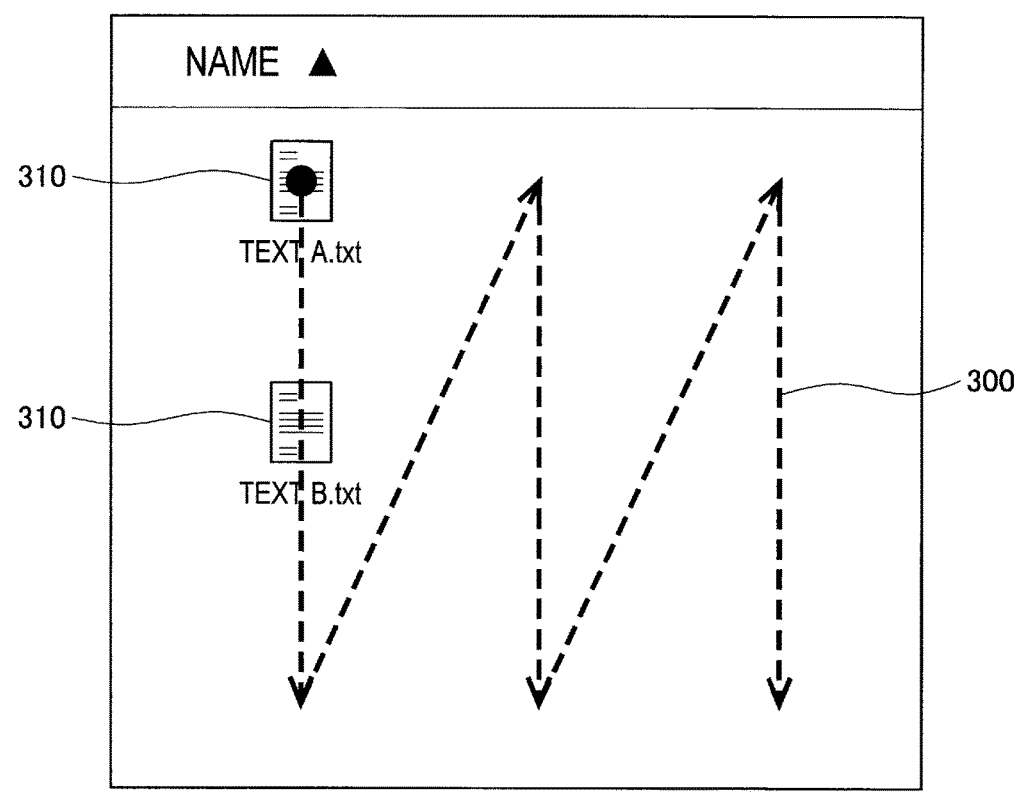
[Fig. 26]

[Fig. 27]
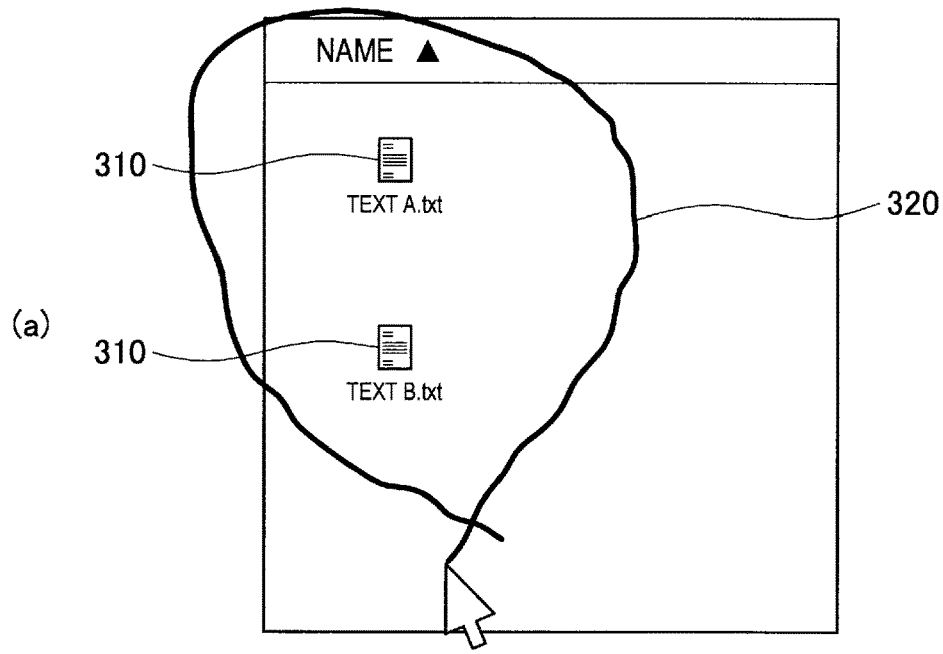
(a)
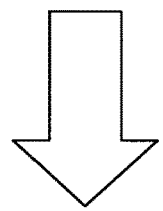
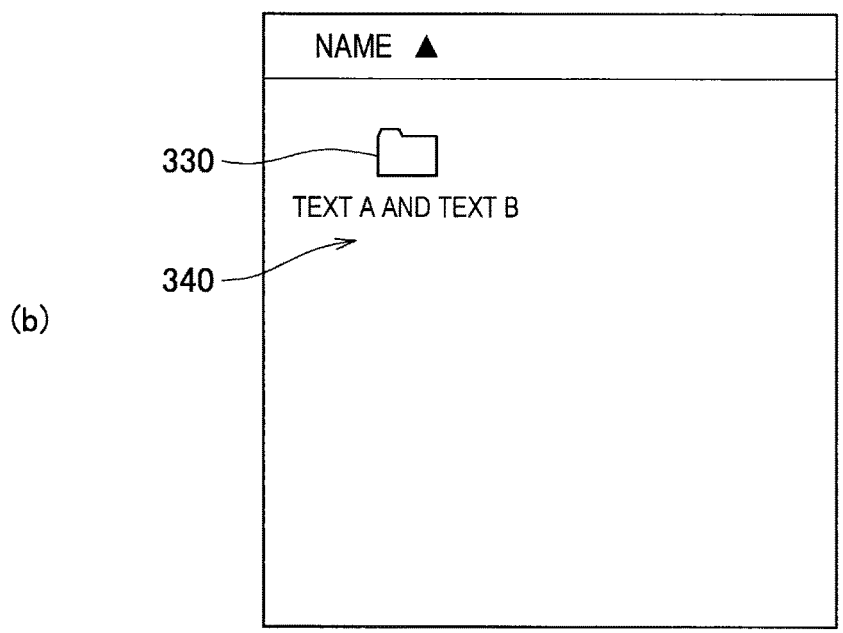
(b)

[Fig. 28]
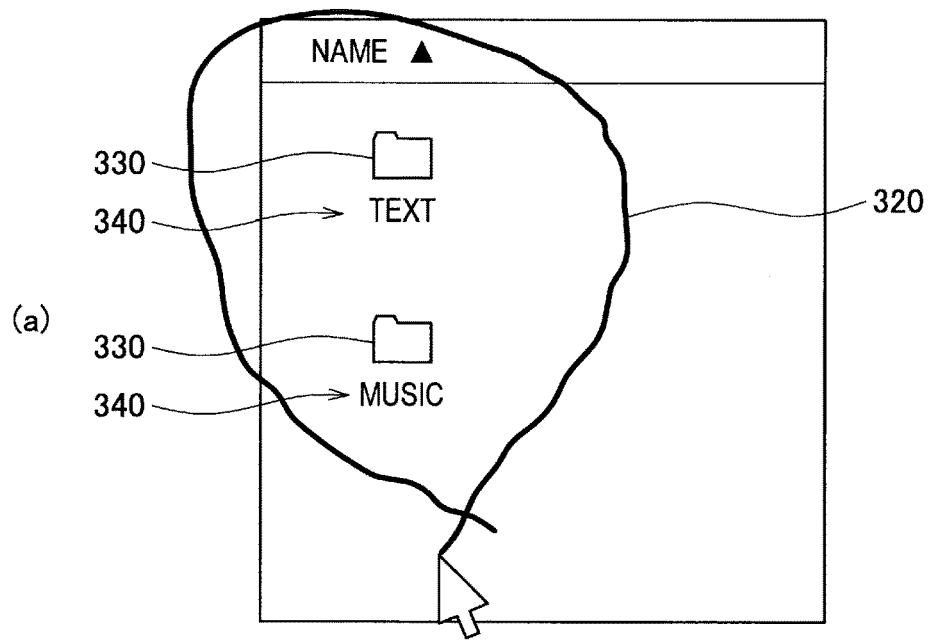
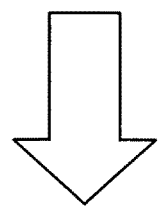
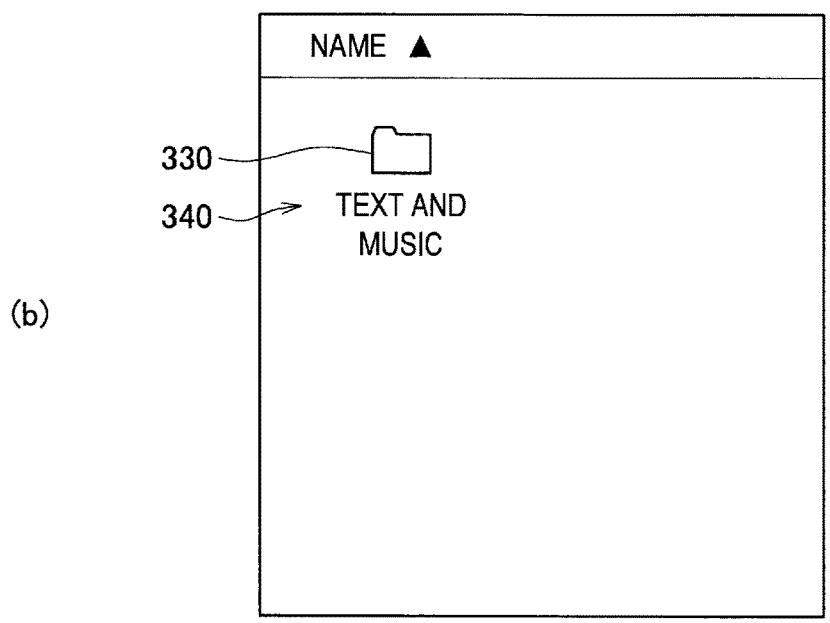

[Fig. 29]
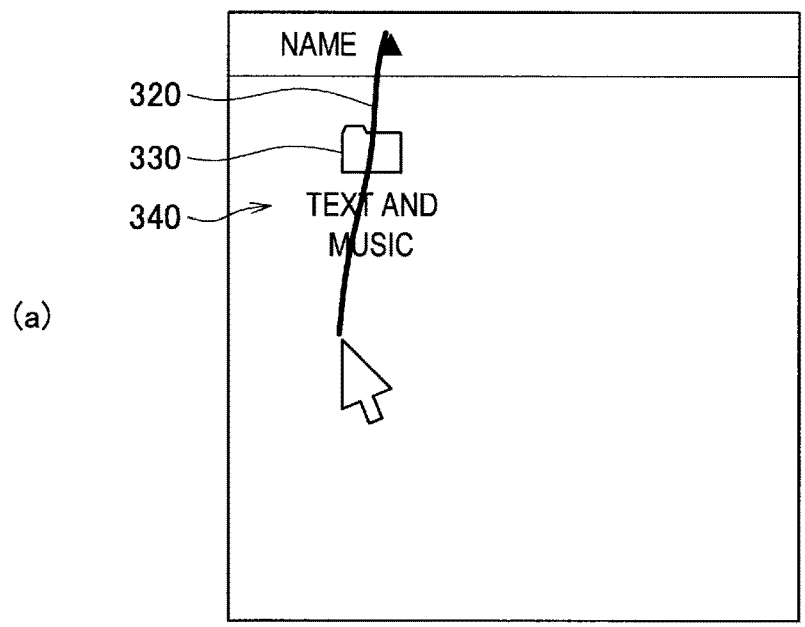
(a)
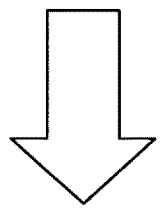
(b)
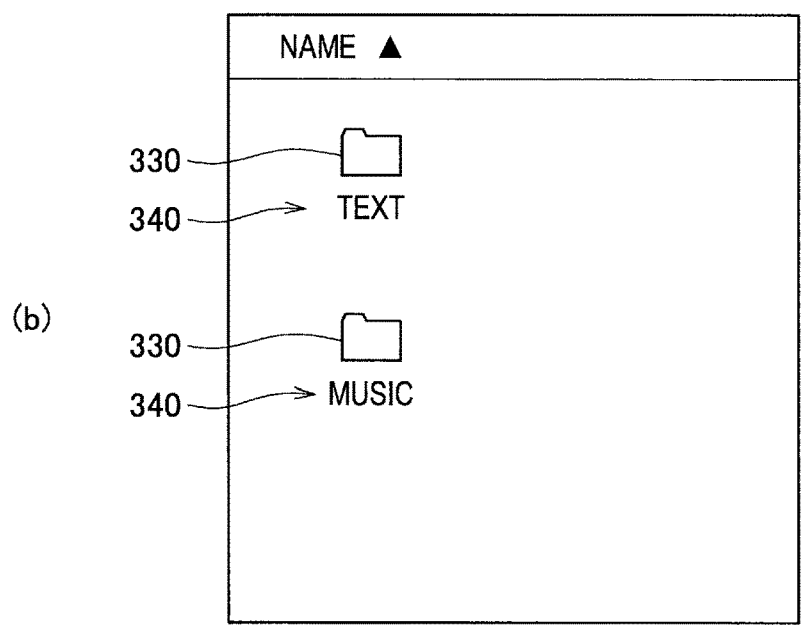

[Fig. 30]
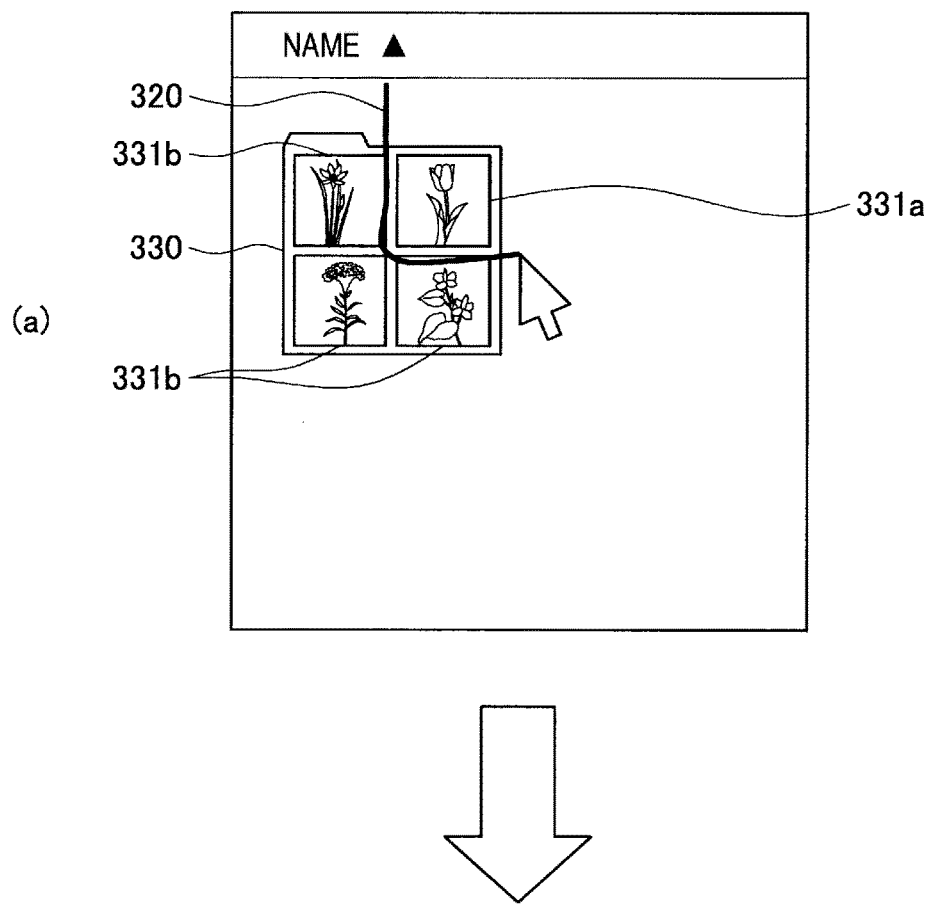
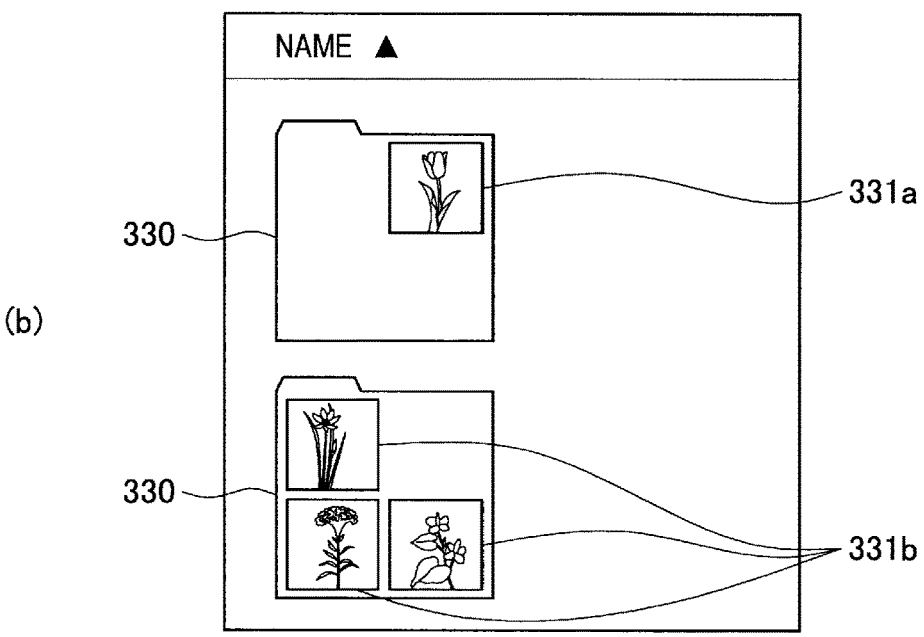

[Fig. 31]
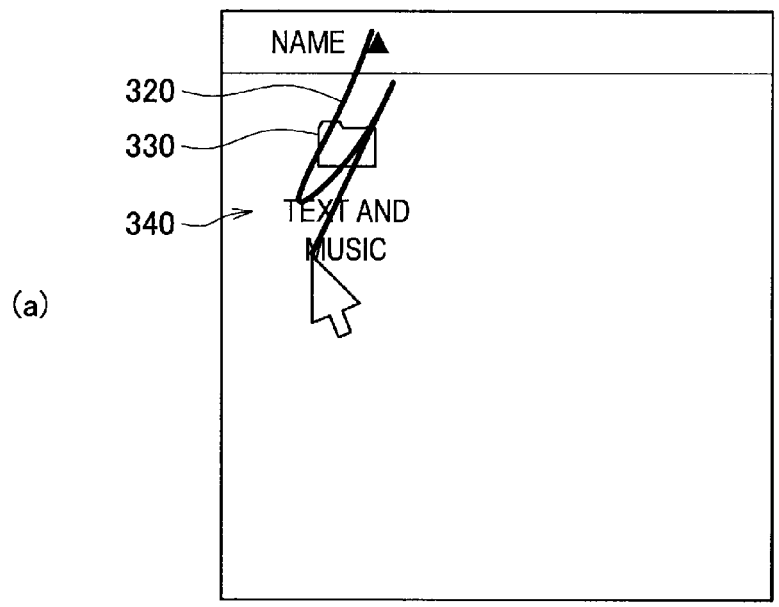
(a)
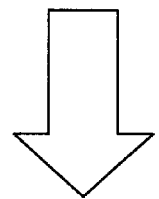
(b)
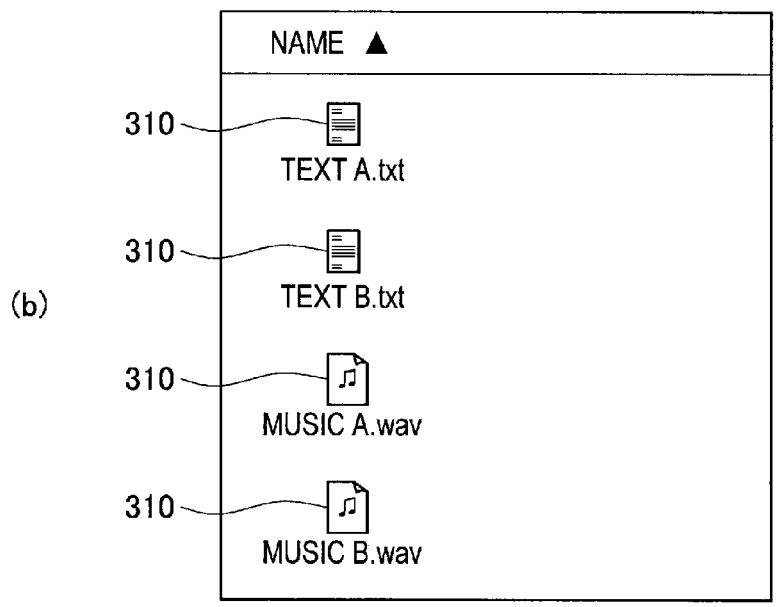

[Fig. 32]
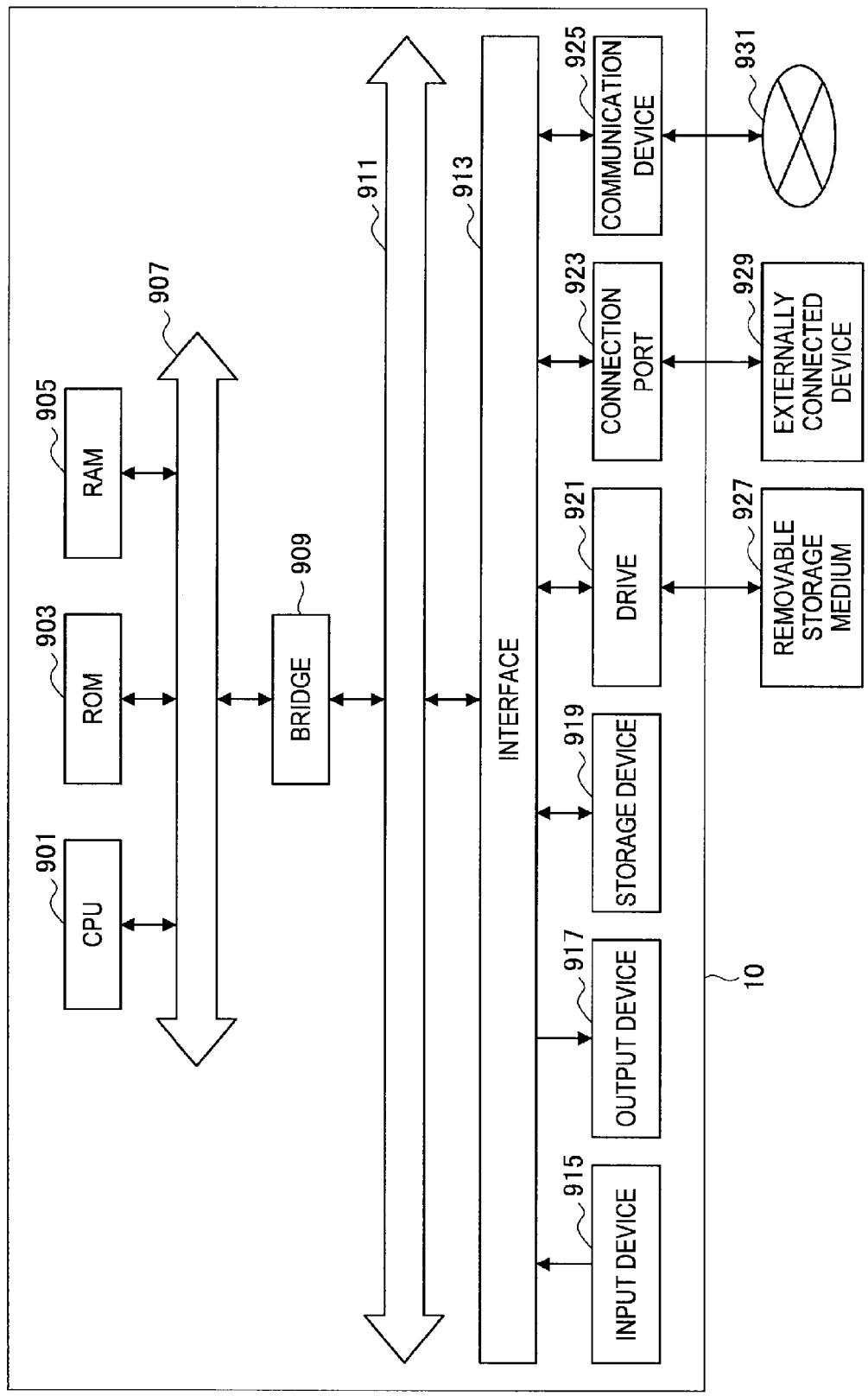

GRAPHICAL INTERFACE DEVICE, GRAPHICAL INTERFACE METHOD AND MEDIUM

TECHNICAL FIELD

The present disclosure relates to an information processing device, an information processing method and a computer program product.

BACKGROUND ART

Content clustering is widely known as a grouping technique in which, for example, photographs are grouped based on whether their image capturing positions or image capturing times are close to each other. The amount of content held by a user has increased dramatically along with an increase in capacity of a storage device, and the like. In order to easily search or view a large amount of content, technology has been developed that allows automatic content clustering.

For example, Patent Literature 1 discloses a technology in which clustering of image content items is automatically performed based on the image capturing position, and the generated clusters are further grouped using the image capturing date and time. Patent Literature 2 discloses a technology in which clustering of image content items is automatically performed based on the image capturing date and time.

CITATION LIST

Patent Literature

PTL 1: Japanese Patent No. 4412342
PTL 2: Japanese Patent No. 4577173

SUMMARY

Technical Problem

However, there is a case in which the name that is automatically assigned to the cluster by the above-described technology is not necessarily the name that the user wants. In this type of case, the user adds editing to the name that has been automatically assigned to the cluster. A user interface (UI) that is used at this time requires further improvements in operability.

To address this, the present disclosure provides an information processing device, an information processing method and a computer program product that are novel and improved and that are capable of editing a cluster name by a more intuitive and simple operation.

Solution to Problem

An information processing device, method and computer program product use a display controller that causes a display device to display a cluster name having a data item association with a cluster of at least one data item. An operation acquisition portion is configured to acquire information associated with a user operation performed on the cluster. An editing portion edits the cluster name and data item association in accordance with the user operation. As a consequence the associations between data items may easily be formed along with associated cluster names formed.

BRIEF DESCRIPTION OF DRAWINGS

FIG. 1 is a block diagram schematically showing a functional configuration of an information processing device according to a first embodiment of the present disclosure.

FIG. 2 is a diagram showing an example in which clusters are generated in the first embodiment of the present disclosure.

FIG. 3 is a diagram showing an example in which the clusters are generated in the first embodiment of the present disclosure.

FIG. 4 is a diagram showing an example in which the clusters are combined in the first embodiment of the present disclosure.

FIG. 5 is a diagram showing a first example in which the cluster is divided in the first embodiment of the present disclosure.

FIG. 6 is a diagram showing a second example in which the cluster is divided in the first embodiment of the present disclosure.

FIG. 7 is a diagram showing a third example in which the cluster is divided in the first embodiment of the present disclosure.

FIG. 8 is a diagram showing an example in which the cluster is deleted in the first embodiment of the present disclosure.

FIG. 9 is a diagram showing an example in which clusters are combined by movement of a cluster display in a second embodiment of the present disclosure.

FIG. 10 is a diagram showing an example in which the clusters are combined by a pinch operation in the second embodiment of the present disclosure.

FIG. 11 is a diagram showing an example in which the cluster is divided by a pinch operation in the second embodiment of the present disclosure.

FIG. 12 is a diagram showing an example in which the hierarchy of the cluster display is changed by an expanding and contracting operation in the second embodiment of the present disclosure.

FIG. 13 is a diagram showing an example in which the cluster is divided by a movement operation in the second embodiment of the present disclosure.

FIG. 14 is a diagram showing an example in which clusters are displayed as nodes of a tree structure in a third embodiment of the present disclosure.

FIG. 15 is a diagram illustrating an example of movement between clusters that are displayed as nodes of a tree structure in the third embodiment of the present disclosure.

FIG. 16 is a diagram showing an example in which the cluster is divided using a tree structure display in the third embodiment of the present disclosure.

FIG. 17 is a diagram showing an example in which the clusters are generated and combined using the tree structure display in the third embodiment of the present disclosure.

FIG. 18 is a diagram showing an example in which the cluster is deleted using the tree structure display in the third embodiment of the present disclosure.

FIG. 19 is a diagram illustrating a tree structure of cluster names in a fourth embodiment of the present disclosure.

FIG. 20 is a diagram showing an example in which the cluster name is changed by an operation that moves a cluster name display in the fourth embodiment of the present disclosure.

FIG. 21 is a diagram showing an example in which the cluster name is changed by selection from a list in the fourth embodiment of the present disclosure.

FIG. 22 is a diagram showing an example in which the cluster name is changed by a pinch operation on the cluster name display in the fourth embodiment of the present disclosure.

FIG. 23 is a diagram showing an example in which the cluster name is set using the tree structure display in a fifth embodiment of the present disclosure.

FIG. 24 is a diagram illustrating a relationship between a chosen dimensional feature space and a two-dimensional feature space.

FIG. 25 is a diagram showing an example in which clusters are combined in a sixth embodiment of the present disclosure.

FIG. 26 is a diagram illustrating a feature space and position data item in a seventh embodiment of the present disclosure.

FIG. 27 is a diagram showing an example in which a folder is generated in the seventh embodiment of the present disclosure.

FIG. 28 is a diagram showing an example in which folders are combined in the seventh embodiment of the present disclosure.

FIG. 29 is a diagram showing a first example in which the folder is divided in the seventh embodiment of the present disclosure.

FIG. 30 is a diagram showing a second example in which the folder is divided in the seventh embodiment of the present disclosure.

FIG. 31 is a diagram showing an example in which the folder is deleted in the seventh embodiment of the present disclosure.

FIG. 32 is a block diagram illustrating a hardware configuration of the information processing device according to the embodiments of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the explanation will be given in the order shown below.
1. First embodiment
2. Second embodiment
3. Third embodiment
4. Fourth embodiment
5. Fifth embodiment
6. Sixth embodiment
7. Seventh embodiment
8. Hardware configuration
9. Supplement

1. First Embodiment

Firstly, a first embodiment of the present disclosure will be explained with reference to FIG. 1 to FIG. 8.
(Device Configuration)
FIG. 1 is a block diagram schematically showing a functional configuration of an information processing device 10 according to a first embodiment of the present disclosure.

The information processing device 10 is, for example, a personal computer (PC), a game console, a digital camera, a video camera, a mobile phone, a smart phone, a tablet terminal, a car navigation system, a personal digital assistant (PDA), or the like. The information processing device 10 includes an operation acquisition portion 11, a cluster editing portion 12, a cluster name editing portion 13, a display control portion 14 and a display portion 15.

The operation acquisition portion 11 acquires information about an operation performed by a user on a data display, a cluster display or a cluster name display that are displayed on the display portion 15. The operation acquisition portion 11 takes the form of, for example, an input device such as a touch panel or a mouse, or an interface that acquires information from the input device. The operation acquisition portion 11 provides information about the acquired operation to the cluster editing portion 12 or to the cluster name editing portion 13. Further, the operation acquisition portion 11 may provide the information about the acquired operation to the display control portion 14.

The cluster editing portion 12 edits a cluster in accordance with the information about the operation acquired by the operation acquisition portion 11. The cluster editing portion 12 takes the form of, for example, a central processing unit (CPU), a random access memory (RAM), a read only memory (ROM) or the like of the information processing device 10. Position data item of a feature space is classified in the cluster. The cluster editing portion 12 performs, for example, cluster generation, combining, division, deletion and the like, as editing of the cluster. The cluster editing portion 12 reflects an editing result on cluster information 16, and at the same time, the cluster editing portion 12 provides the editing result to the display control portion 14.

The cluster name editing portion 13 edits a cluster name in accordance with the information about the operation acquired by the operation acquisition portion 11. The cluster name editing portion 13 takes the form of, for example, the CPU, the RAM, the ROM or the like of the information processing device 10. The cluster name is a name assigned to the cluster. The cluster name editing portion 13 performs, for example, a change of the length of the cluster name and a change of content of the cluster name, as editing of the cluster name. The cluster name editing portion 13 reflects an editing result on the cluster information 16, and provides the editing result to the display control portion 14.

The display control portion 14 causes the display portion 15 to display at least one of the data display, the cluster display and the cluster name display. The display control portion 14 takes the form of, for example, the CPU, the RAM, the ROM or the like of the information processing device 10. The display control portion 14 changes the cluster display or the cluster name display to be displayed on the display portion 15, in accordance with the editing result of the cluster or the cluster name by the cluster editing portion 12 or the cluster name editing portion 13. Further, the display control portion 14 may display, on the display portion 15, the information about the operation acquired by the operation acquisition portion 11, for example, a trajectory of a pointing operation.

At least one of the data display, the cluster display and the cluster name display is displayed on the display portion 15 by the display control portion 14. The display portion 15 takes the form of, for example, an output device of the information processing device 10. The display portion 15 visually presents to the user the position data item of the feature space, the cluster and the cluster name. Note that the display portion 15 need not necessarily be included in the information processing device 10. The information processing device 10 may communicate with the display portion 15 that takes the form of a separate display device, and may display the data display, the cluster display or the cluster name display on the display portion 15.

The cluster information 16 is information that includes information about the position data item of the feature space, information about the cluster whose position data item is classified, and information about the cluster name. The cluster information 16 is stored, for example, in a storage device of the information processing device 10. Note that the cluster information 16 need not necessarily be held inside the information processing device 10, and the information processing device 10 may acquire the cluster information 16 from storage on a network according to need.

While the above described embodiment includes the operation acquisition portion 11, display control portion 14, cluster editing portion 12, and cluster name editing portion 13 in a common device, an alternative embodiment uses a remote server, or group of servers, in a cloud resource to perform all or some of the functions performed by the display control portion 14, cluster editing portion 12, and cluster name editing portion 13. Communications between the operation acquisition portion 11, and display portion 14 with the other portions are performed via wired or wireless network connections such as through an Internet connection.

(Generation of Clusters)

FIG. 2 and FIG. 3 are diagrams each showing an example in which clusters are generated in the first embodiment of the present disclosure. FIG. 2 shows a state before the clusters are generated. FIG. 3 shows a user's operation to generate the clusters and a state after the clusters have been generated.

In FIG. 2, the display control portion 14 causes the display portion 15 to display a map 100 and image icons 110. The map 100 is a two-dimensional feature space in which the position is defined by the latitude and longitude. The image icons 110 are icons each indicating captured image content. Information about an image capturing position is added to the captured image content, as position data item on the map 100. Each of the image icons 110 is, based on the position data item, displayed on the image capturing position of each of the image content items on the map 100. In other words, the image icons 110 are data displays indicating the position data item of the feature space.

In (a) of FIG. 3, the operation acquisition portion 11 acquires trajectories 120 of user's pointing operations with respect to the image icons 110 displayed on the display portion 15. When the operation acquisition portion 11 is a mouse, for example, each of the trajectories 120 can be acquired as a trajectory of a pointer moved by the mouse. Further, for example, when the operation acquisition portion 11 is a touch panel, each of the trajectories 120 can be acquired as a trajectory of a user's touch on the display portion 15.

Further, when the operation acquisition portion 11 is a touch panel, the operation acquisition portion 11 may enter a cluster editing mode from a normal mode when the operation acquisition portion 11 detects a user's touch on a specific section, such as a lower left corner section of the display portion 15, and may acquire the trajectory 120, as shown in (a) of FIG. 3. For example, in the normal mode, the operation acquisition portion 11 acquires movement of the user's touch on the display portion 15, as a dragging operation to move the map 10, for example. On the other hand, in the cluster editing mode in which the user continues to touch the specific section of the display portion 15, the operation acquisition portion 11 acquires the trajectory 120 based on the user's touch on the display portion 15.

As a result, it is possible to identify a case in which the user wants to edit the cluster. Thus, it is possible to achieve both the operability of a drag operation etc. in the normal mode and the operability of the cluster editing using the trajectory 120 in the cluster editing mode.

Further, the operation acquisition portion 11 provides information about the trajectory 120 to the cluster editing portion 12 and the display control portion 14. When the cluster editing portion 12 acquires the information about the trajectory 120, the cluster editing portion 12 determines how to edit the cluster based on the shape of the trajectory 120. On the other hand, when the display control portion 14 acquires the information about the trajectory 120, the display control portion 14 causes the display portion 15 to display the trajectory 120 as shown in (a) of FIG. 3.

In the example shown in (a) of FIG. 3, the trajectories 120 classify the image icons 110 into three groups and surround the classified image icons 110. When the trajectories 120 surround the image icons 110 in this way, the cluster editing portion 12 generates new clusters that contain the image content items indicated by the surrounded image icons 110. Therefore, in the example shown in (a) of FIG. 3, the cluster editing portion 12 generates three new clusters.

In (b) of FIG. 3, the cluster editing portion 12 generates the clusters that contain the image content items indicated by the image icons 110. These clusters are expressed as regions on the map 100 that contain the image icons 110. The cluster editing portion 12 provides information about the generated clusters to the display control portion 14, and the display control portion 14 causes the display portion 15 to display cluster displays 130 that indicate the generated clusters. Note that, although in the example shown in (b) of FIG. 3, the cluster displays 130 have a circular shape, it is merely an example and the cluster displays 130 may have a variety of shapes, such as a rectangular shape and a polygonal shape.

At this time, the display control portion 14 may delete the image icons 110 contained in each of the cluster displays 130 from the display portion 15. By doing this, overlap between each cluster display 130 and the image icons 110 can be inhibited, and visibility can be improved. In addition, it is possible to reduce the number of objects to be displayed on the display portion 15 by the display control portion 14, and highspeed display is achieved.

Further, the display control portion 14 may move the displayed map 100 in accordance with the cluster display 130. For example, the display control portion 14 matches the center of the map 100 with the center of the cluster display 130. When there are a plurality of the cluster displays 130, the display control portion 14 may match the center of the map 100 with the center of the plurality of cluster displays 130.

Further, the display control portion 14 may change the scale of the displayed map 100 in accordance with the cluster display 130. For example, the display control portion 14 displays the map 100 at a maximum scale under the condition that the diameter of the cluster display 130 is smaller than the short side of the map 100. However, when there are a plurality of the cluster displays 130, the display control portion 14 may set the scale of the map 100 such that all the plurality of cluster displays 130 are displayed.

In this way, the display control portion 14 moves the displayed map 100 in accordance with the cluster display 130 before and after the editing, or changes the scale of the displayed map 100. Thus, a subsequent editing operation can be easily performed on the edited cluster display 130.

On the other hand, the cluster editing portion 12 may provide the information about the generated clusters to the cluster name editing portion 13, and the cluster name editing portion 13 may generate a cluster name for each of the generated clusters. Note that any known technique can be used to generate the cluster name, although the data items share a common data item association or feature attribute with other data items in the cluster. In this case, the cluster name editing portion 13 provides information about the generated cluster name to the display control portion 14, and the display control portion 14 displays the cluster name in the vicinity of the corresponding cluster display 130, as a cluster name display 140.

(Combining of Clusters)

FIG. 4 is a diagram showing an example in which the clusters are combined in the first embodiment of the present disclosure. FIG. 4 shows states before and after the clusters are combined.

In (a) of FIG. 4, the display control portion 14 causes the display portion 15 to display the map 100, the cluster displays 130 and the cluster name displays 140. The operation acquisition portion 11 acquires the trajectory 120. The operation acquisition portion 11 provides information about the trajectory 120 to the cluster editing portion 12 and the display control portion 14. The display control portion 14 causes the display portion 15 to display the trajectory 120 as shown in (a) of FIG. 4. Here, in a similar way to the example of the cluster generation, the operation acquisition portion 11 may enter the cluster editing mode from the normal mode in response to a user's touch on the specific section of the display portion 15, and may acquire the trajectory 120.

In the example shown in (a) of FIG. 4, the trajectory 120 surrounds the two cluster displays 130. When the trajectory 120 surrounds the cluster displays 130 in this manner, the cluster editing portion 12 generates a new cluster that contains the clusters shown by the surrounded cluster displays 130. Accordingly, in the example shown in (a) of FIG. 4, the cluster editing portion 12 generates the new cluster that contains the clusters shown by the cluster displays 130 "Kanagawa gakuen high school" and "Yokohama station".

In (b) of FIG. 4, the cluster editing portion 12 generates the new cluster that contains the clusters shown by the above-described two cluster displays 130. It should be noted that the new cluster is a cluster obtained by combining the original two clusters. At this time, the cluster editing portion 12 need not necessarily hold the information about the original two clusters in the cluster information 16, and may replace it with the information about the new cluster. Alternatively, the cluster editing portion 12 may hold the information about the original two clusters in the cluster information 16, and may further generate a new cluster as a higher level cluster of the original two clusters. In this case, the new cluster and the original two clusters have a parent-child relationship in a tree structure, and information of the tree structure formed by these clusters is held in the cluster information 16.

Here, the cluster editing portion 12 provides the information about the generated new cluster to the display control portion 14, and the display control portion 14 causes the display portion 15 to display the cluster display 130 that shows the new cluster. Here, in a similar way to the example of the cluster generation, the display control portion 14 may move the displayed map 100 or change the scale of the displayed map 100, in accordance with the cluster display 130 obtained after combining the clusters.

Further, the display control portion 14 may delete the cluster displays 130 that show the original two clusters contained in the new cluster, from the display portion 15. By doing this, overlap between each of the cluster displays 130 can be inhibited, and visibility can be improved. In addition, it is possible to reduce the number of objects to be displayed on the display portion 15 by the display control portion 14, and highspeed display is achieved. Disappearance of the original cluster displays 130 and appearance of the new cluster display 130 may be performed using animations such as fade-out and fade-in. By doing this, it is possible to visually show the user that the cluster combining is being performed.

On the other hand, when the information about the original clusters is held in the cluster information 16, the display control portion 14 may continue to display, on the display portion 15, the cluster displays 130 that show the original two clusters contained in the new cluster. By doing this, it is possible to visually show the user that the new cluster and the original two clusters have a parent-child relationship.

Further, the cluster editing portion 12 may provide the information about the generated cluster to the cluster name editing portion 13, and the cluster name editing portion 13 may generate a cluster name for the generated cluster. Note that any technique can be used to generate the cluster name. In this case, the cluster name editing portion 13 provides information about the generated cluster name to the display control portion 14, and the display control portion 14 displays the cluster name display 140 in the vicinity of the corresponding cluster display 130. In the example shown in (b) of FIG. 4, the cluster name "Nishi ward, Kanagawa ward" is generated and displayed on the display portion 15, as the cluster name display 140. Of course, the cluster name need not be limited to Japanese geographical annotations, but may also be any other suitable breakdown depending on the venue. For example, the US, a neighborhood, town, county, state, country nomenclature may be more suitable.

(Division of Cluster)

FIG. 5 is a diagram showing a first example in which the cluster is divided in the first embodiment of the present disclosure. FIG. 5 shows states before and after the cluster is divided.

In the first example, the cluster is divided using the information about the cluster tree structure held in the cluster information 16. More specifically, the cluster is divided by changing the cluster displayed as the cluster display 130 from a parent cluster to child clusters in the tree structure.

In (a) of FIG. 5, the display control portion 14 causes the display portion 15 to display the map 100, the cluster displays 130 and the cluster name displays 140. The operation acquisition portion 11 acquires the trajectory 120. The operation acquisition portion 11 provides information about the trajectory 120 to the cluster editing portion 12 and the display control portion 14. The display control portion 14 causes the display portion 15 to display the trajectory 120 as shown in (a) of FIG. 5. Also in this case, in a similar way to the example of the cluster generation, the operation acquisition portion 11 may enter the cluster editing mode from the normal mode in response to a user's touch on the specific section of the display portion 15, and may acquire the trajectory 120.

In the example shown in (a) of FIG. 5, the trajectory 120 traverses the cluster display 130. When the trajectory 120 traverses the cluster display 130 in this manner (e.g., shown a bisecting the larger cluster 130), the cluster editing portion 12 divides the cluster shown by the traversed cluster display 130. Accordingly, in the example shown in (a) of FIG. 5, the cluster editing portion 12 divides the cluster shown by the cluster display 130 "Nishi ward, Kanagawa ward".

In (b) of FIG. 5, the cluster editing portion 12 divides the cluster shown by the above-described cluster display 130 into two clusters. As described above, the two clusters after the division are lower level clusters of the original cluster in the tree structure. The cluster editing portion 12 provides information about the divided clusters to the display control portion 14, and the display control portion 14 causes the display portion 15 to display the cluster displays 130 showing the divided clusters. At this time, the display control portion 14 deletes the cluster display 130 showing the cluster before the division, from the display portion 15. Here, the appearance and disappearance of the cluster display 130 may be displayed using animations such as fade-in and fade-out. By doing this, it is possible to visually show the user that the cluster division is being performed.

Further, the display control portion 14 may move the displayed map 100 in response to the division of the cluster. For example, the display control portion 14 matches the center of the map 100 with the center of the cluster display 130 before the division.

Further, the display control portion 14 may change the scale of the displayed map 100 in response to the division of the cluster. For example, the display control portion 14 displays the map 100 at a maximum scale under the condition that the diameter of the cluster display 130 before the division is smaller than the short side of the map 100.

On the other hand, the cluster editing portion 12 may provide the information about the divided clusters to the cluster name editing portion 13, and the cluster name editing portion 13 may generate cluster names for the divided clusters. Note that any known technique can be used to generate the cluster names. In this case, the cluster name editing portion 13 provides information about the generated cluster names to the display control portion 14, and the display control portion 14 displays each of the cluster name displays 140 in the vicinity of the corresponding cluster display 130. When the cluster names are held in the cluster information 16 together with the information about the cluster tree structure, the cluster name editing portion 13 need not necessarily generate new cluster names, and the cluster names held in the cluster information 16 may be provided to the display control portion 14.

FIG. 6 is a diagram showing a second example in which the cluster is divided in the first embodiment of the present disclosure. FIG. 6 shows states before and after the cluster is divided.

In the second example, in a similar way to the first example, the cluster is divided using the information about the cluster tree structure held in the cluster information 16. However, the second example is different from the first example in that the clusters after the division are selected by the user from child clusters of the tree structure.

In (a) of FIG. 6, the display control portion 14 causes the display portion 15 to display the map 100, the cluster displays 130, sub-cluster displays 135, the cluster name displays 140 and sub-cluster name displays 145. The sub-cluster displays 135 are one type of the cluster display 130, and are used to display child clusters when the cluster shown by the cluster display 130 is the parent cluster. The sub-cluster name displays 145 are displays that show cluster names of the clusters shown by the sub-cluster displays 135.

On the other hand, the operation acquisition portion 11 acquires the trajectory 120.

The operation acquisition portion 11 provides information about the trajectory 120 to the cluster editing portion 12 and the display control portion 14. The display control portion 14 causes the display portion 15 to display the trajectory 120 as shown in (a) of FIG. 6. Also in this case, in a similar way to the example of the cluster generation, the operation acquisition portion 11 may enter the cluster editing mode from the normal mode in response to a user's touch on the specific section of the display portion 15, and may acquire the trajectory 120.

In the example shown in (a) of FIG. 6, the trajectory 120 traverses the cluster display 130. When the trajectory 120 traverses the cluster display 130 in this manner, the cluster editing portion 12 divides the cluster shown by the traversed cluster display 130.

Further, in the example shown in (a) of FIG. 6, the trajectory 120 classifies the three sub-cluster displays 135 contained in the cluster shown by the cluster display 130 "Nishi ward, Kanagawa ward", into the sub-cluster displays 135 "Kita-karuizawa" and "Minami-karuizawa", and the sub-cluster display 135 "Kanagawa gakuen high school". In this type of case, the cluster editing portion 12 divides the cluster shown by the cluster display 130, in accordance with the classification of the plurality of sub-cluster displays 135 classified by the trajectory 120.

In (b) of FIG. 6, the cluster editing portion 12 divides the cluster shown by the above-described cluster display 130 into two clusters. As described above, these clusters are generated from lower level clusters of the original cluster in the cluster tree structure, in accordance with the classification of the sub-cluster displays 135 classified by the trajectory 120. The cluster editing portion 12 provides information about the divided clusters to the display control portion 14, and the display control portion 14 causes the display portion 15 to display the cluster displays 130 showing the divided clusters.

More specifically, the cluster editing portion 12 divides the cluster that is shown in (a) of FIG. 6 by the cluster display 130 "Nishi ward, Kanagawa ward" into the clusters that are shown in (b) of FIG. 6 by the cluster displays 130 "Kita-karuizawa and Minami-karuizawa" and "Kanagawa gakuen high school". Among them, the cluster "Kanagawa Gakuen high school" corresponds to the sub-cluster that is shown in (a) of FIG. 6 by the sub-cluster display 135 having the same name. On the other hand, the cluster "Kita-karuizawa and Minami-karuizawa" is the cluster obtained by combining the two sub-clusters that are shown in (a) of FIG. 6 by the sub-cluster displays 135 "Kita-karuizawa" and "Minami-karuizawa".

In this way, when the cluster after the division is a cluster obtained by combining a plurality of sub-clusters, for example, the cluster editing portion 12 may generate cluster information after the division by adding a node to the cluster tree structure. In this case, a new node "Kita-karuizawa and Minami-karuizawa" can be added between the node "Nishi ward, Kanagawa ward" and the nodes "Kita-karuizawa" and "Minami-karuizawa" in the tree structure.

Further, for example, the cluster editing portion 12 may generate the cluster information after the division by changing nodes of the cluster tree structure. In this case, the nodes "Kita-karuizawa" and "Minami-karuizawa" of the tree structure can be combined and replaced by the new node "Kita-karuizawa and Minami-karuizawa".

On the other hand, at this time, the display control portion 14 deletes the cluster display 130 showing the cluster before the division, from the display portion 15. Also in this case, in a similar way to the first example, the appearance and disappearance of the cluster display 130 may be performed using animations. Further, the display control portion 14 may move the displayed map 100 or change the scale of the displayed map 100 in accordance with the cluster division.

In addition, in a similar way to the first example, the cluster editing portion 12 may provide the information about the divided clusters to the cluster name editing portion 13, and the cluster name editing portion 13 may generate cluster names for the divided clusters. The generated cluster names are provided to the display control portion 14 and the display control portion 14 can display on the display portion 15 the cluster names as the cluster name displays 140.

FIG. 7 is a diagram showing a third example in which the cluster is divided in the first embodiment of the present disclosure. FIG. 7 shows states before and after the cluster is divided.

In the third example, unlike the first example and the second example, the cluster need not necessarily have a tree structure.

In (a) of FIG. 7, the display control portion 14 causes the display portion 15 to display the map 100, the image icons 110, the cluster display 130 and the cluster name display 140. The operation acquisition portion 11 acquires the trajectory 120. The operation acquisition portion 11 provides information about the trajectory 120 to the cluster editing portion 12 and the display control portion 14. The display control portion 14 causes the display portion 15 to display the trajectory 120 as shown in (a) of FIG. 7. Also in this case, in a similar way to the example of the cluster generation, the operation acquisition portion 11 may enter the cluster editing mode from the normal mode in response to a user's touch on the specific section of the display portion 15, and may acquire the trajectory 120.

In the example shown in (a) of FIG. 7, the trajectory 120 traverses the cluster display 130. When the trajectory 120 traverses the cluster display 130 in this manner, the cluster editing portion 12 divides the cluster shown by the traversed cluster display 130.

Further, in the example shown in (a) of FIG. 7, the trajectory 120 classifies the image icons 110 contained in the cluster shown by the cluster display 130 into image icons 110a and image icons 110b. In this type of case, the cluster editing portion 12 divides the cluster shown by the cluster display 130, in accordance with the classification of the image icons 110 classified by the trajectory 120.

In (b) of FIG. 7, the cluster editing portion 12 divides the cluster shown by the above-described cluster display 130 into two clusters. Theses clusters are clusters that respectively contain image content items indicated by the image icons 110a and the image icons 110b classified by the trajectory 120. The cluster editing portion 12 provides information about the divided clusters to the display control portion 14, and the display control portion 14 causes the display portion 15 to display the cluster displays 130 that show the divided clusters.

At this time, the display control portion 14 deletes the cluster display 130 showing the cluster before the division, from the display portion 15. The image icons 110 may continue to be displayed in order to indicate the image content items contained in the cluster shown by each of the cluster displays 130. Alternatively, the image icons 110 may be removed in order to improve visibility and increase display speed.

Also in this case, in a similar way to the first example, the appearance and disappearance of the cluster display 130 may be performed using animations. Further, the display control portion 14 may move the displayed map 100 or change the scale of the displayed map 100 in accordance with the cluster division.

(Deletion of Cluster)

FIG. 8 is a diagram showing an example in which the cluster is deleted in the first embodiment of the present disclosure. FIG. 8 shows states before and after the cluster is deleted.

In (a) of FIG. 8, the display control portion 14 causes the display portion 15 to display the map 100, the cluster displays 130 and the cluster name displays 140. The operation acquisition portion 11 acquires the trajectory 120. The operation acquisition portion 11 provides information about the trajectory 120 to the cluster editing portion 12 and the display control portion 14. The display control portion 14 causes the display portion 15 to display the trajectory 120 as shown in (a) of FIG. 8. Also in this case, in a similar way to the example of the cluster generation, the operation acquisition portion 11 may enter the cluster editing mode from the normal mode in response to a user's touch on the specific section of the display portion 15, and may acquire the trajectory 120.

In the example shown in (a) of FIG. 8, the trajectory 120 traverses the cluster display 130 four times. When the trajectory 120 traverses the cluster display 130 a plurality of times (e.g., a predetermined pattern) in this way, the cluster editing portion 12 deletes the cluster shown by the traversed cluster display 130.

In the present embodiment, both the cluster division and the cluster deletion are performed when the trajectory 120 traverses the cluster display 130. The movement that traverses the cluster display 130, which is performed by the user using the trajectory of a pointing operation, is movement that intuitively evokes both the division and the deletion of the cluster. Therefore, it is desirable that, while the trajectory 120 traversing the cluster display 130 is used as a trigger for both the division and the deletion of the cluster, it is determined whether the cluster is to be divided or the cluster is to be deleted, based on some kind of standard that feels natural to the user.

Given this, the cluster editing portion 12 determines whether the cluster is to be divided or the cluster is to be deleted, based on the number of times the trajectory 120 traverses the cluster display 130. More specifically, when the trajectory 120 traverses the cluster display 130 once, the cluster editing portion 12 divides the cluster. On the other hand, when the trajectory 120 traverses the cluster display 130 a plurality of times, the cluster editing portion 12 deletes the cluster. At this time, the cluster editing portion 12 may delete the image content items contained in the deleted cluster, together with the cluster. In this case, the above-described determination based on the number of times traversing is performed may include a determination as to whether only the cluster is to be deleted or the cluster and the image content items are to be deleted together. For example, when the trajectory 120 traverses the cluster display 130 two or three times, the cluster editing portion 12 may delete only the cluster, and when the trajectory 120 traverses the cluster display 130 four or more times, the cluster editing portion 12 may delete the cluster and the image content items contained in the cluster.

Note that the number of times that is used as the standard for determination is not limited to the above-described example. For example, as in the second example and the third example of the cluster division, when the cluster is divided by the trajectory 120 classifying the sub-cluster displays 135 and the image icons 110 contained in the cluster display 130, it is likely to be necessary for the trajectory 120 to have a complicated shape in order to allow classification. Therefore, a larger number of times may be used as the standard for determination. Further, in order to inhibit the cluster from being deleted by an erroneous operation, the trajectory 120 may have to traverse the cluster display 130 three times or more, for example, before the cluster can be deleted.

In (b) of FIG. 8, the cluster editing portion 12 deletes the cluster shown by the above-described cluster display 130. The image content items classified into the deleted cluster are currently not classified by the cluster. The cluster editing portion 12 provides the display control portion 14 with information about the deleted cluster and the image content items classified into the deleted cluster. The display control portion 14 deletes the cluster display 130 showing the deleted cluster from the display portion 15. At the same time, the display control portion 14 causes the display portion 15 to display the image icons 110 indicating the image content items classified into the deleted cluster.

Here, the disappearance of the cluster display 130 and the appearance of the image icons 110 may be performed using animations such as fade-in and fade-out, in a similar way to the above-described examples of the cluster division. The display control portion 14 may move the displayed map 100 in response to the deletion of the cluster. For example, the display control portion 14 may match the center of the map 100 with the center of the cluster display 130 before the deletion.

Further, the display control portion 14 may change the scale of the displayed map 100 in response to the deletion of the cluster. For example, the display control portion 14 may display the map 100 at the maximum scale under the condition that the diameter of the cluster display 130 before the deletion can fit within the short side of the map 100.

In this way, in the present embodiment, information about the user's operation on the cluster display 130 can be acquired as the trajectory 120 of the pointing operation, and various types of cluster editing can be performed depending on the shape of the trajectory 120. Thus, the user can add various types of editing to the cluster displayed as the cluster display 130, by performing an intuitive operation.

2. Second Embodiment

Next, a second embodiment of the present disclosure will be explained with reference to FIG. 9 to FIG. 13. In the second embodiment of the present disclosure, a user's operation, information about which is acquired by the operation acquisition portion 11, and cluster editing that is performed by the cluster editing portion 12 are different from those of the above-described first embodiment. However, the other processing is similar to that in the first embodiment and thus a detailed explanation thereof is omitted.

(Combining of Clusters by Movement of Cluster Display)

FIG. 9 is a diagram showing an example in which clusters are combined by movement of a cluster display in the second embodiment of the present disclosure. FIG. 9 shows a process in which the clusters are combined.

In (a) of FIG. 9, the display control portion 14 causes the display portion 15 to display the map 100 and the cluster displays 130. The operation acquisition portion 11 acquires information about an operation that the user uses to move a cluster display 130b toward a cluster display 130a. Here, the operation that the user moves the cluster display 130 is, for example, a drag operation or a flick operation with respect to the region of the cluster display 130. The operation acquisition portion 11 provides information about the above-described operation to the cluster editing portion 12 and the display control portion 14. In accordance with the information about this operation, the display control portion 14 moves the cluster display 130b toward the cluster display 130a and displays it.

In (b) of FIG. 9, the display control portion 14 displays the cluster display 130b such that the cluster display 130b overlaps with the cluster display 130a, as a result of the movement by the user's operation. For example, when the operation acquisition portion 11 acquires information about a drag operation performed on the touch panel by the user, the user continues to touch the cluster display 130b as shown in (b) of FIG. 9. Further, for example, when the operation acquisition portion 11 acquires information about a flick operation performed on the touch panel by the user, the user's touch on the cluster display 130b may be released at this point in time.

In the example shown in (b) of FIG. 9, when the cluster display 130b overlaps with the cluster display 130a as a result of the movement by the user's operation, the cluster editing portion 12 combines the clusters shown by the cluster display 130a and the cluster display 130b.

For example, when the operation acquisition portion 11 acquires information about a drag operation performed on the touch panel by the user, at a point in time at which the user's drag operation is released in a state where the plurality of cluster displays 130 overlap with each other as shown in (b) FIG. 9, the cluster editing portion 12 may determine that the clusters shown by the plurality of cluster displays 130 are to be combined.

Further, for example, when the operation acquisition portion 11 acquires information about the flick operation performed on the touch panel by the user, at a point in time at which the plurality of cluster displays 130 overlap with each other, the cluster editing portion 12 may determine that the clusters shown by the plurality of cluster displays 130 are to be combined.

As shown in (b) of FIG. 9, when the cluster display 130b overlaps with the cluster display 130a, the display control portion 14 may change the display of both or one of the cluster display 130a and the cluster display 130b. For example, the display control portion 14 may change a display color of the cluster display 130a and the cluster display 130b as shown in (b) of FIG. 9. By doing this, it is possible to visually show the user that the cluster combining is performed by overlapping the cluster display 130a and the cluster display 130b.

In (c) of FIG. 9, the cluster editing portion 12 generates a cluster by combining the clusters shown by the cluster display 130a and the cluster display 130b. This cluster is expressed on the map 100 as a cluster display 130c that circumscribes the cluster display 130a and the cluster display 130b. The cluster editing portion 12 provides information about the generated cluster to the display control portion 14, and the display control portion 14 causes the display portion 15 to display the cluster display 130c. Here, in a similar way to the above-described example of the first embodiment, the display control portion 14 may move the displayed map 100 or change the scale of the displayed map 100 in accordance with the cluster display 130c.

When moving from displaying (b) to (c) of FIG. 9, the display control portion 14 may display an animation. The animation can be displayed such that, for example, the cluster display 130b moved by the user's operation is faded out while the cluster display 130a, which is a combining target, is enlarged and moved and is thereby changed to the cluster display 130c after the combining. With this type of animation, it is possible to visually show the user that the cluster combining is being performed.

(Combining of Clusters by Pinch Operation)

FIG. 10 is a diagram showing an example in which the clusters are combined by a pinch operation in the second embodiment of the present disclosure. FIG. 10 shows a process in which the clusters are combined.

In (a) of FIG. 10, the display control portion 14 causes the display portion 15 to display the map 100 and the cluster displays 130. The operation acquisition portion 11 acquires information about a pinch-in operation performed by the user on the cluster display 130a and the cluster display 130b. Here, the term "pinch-in" indicates an operation in which the user touches two points on the display portion 15 with two fingers and moves the two fingers such that the two points approach one another. On the other hand, an operation in which the user touches two points on the display portion 15 with two fingers and moves the two fingers such that the two points are separated from each other is referred to as pinch-out. In this specification, the pinch-in and pinch-out operations are collectively referred to as a pinch operation. The operation acquisition portion 11 provides information about the above-described pinch-in operation to the cluster editing portion 12 and the display control portion 14. In accordance with the information about this operation, the display control portion 14 moves the cluster display 130a and the cluster display 130b closer to each other and displays them. The cluster display 130a and the cluster display 130b are moved as a result of the pinch operation. Therefore, it can also be said that the pinch operation is an operation to move the cluster displays 130.

In (b) of FIG. 10, the display control portion 14 overlaps and displays the cluster display 130a and the cluster display 130b as a result of the movement by the user's operation. At this point in time, the user's touch on the cluster display 130a and the cluster display 130b may be continued, or it may have already been released.

In the example shown in (b) of FIG. 10, when the cluster display 130a and the cluster display 130b overlap with each other as a result of the movement by the user's operation, the cluster editing portion 12 combines the clusters shown by the cluster display 130a and the cluster display 130b.

When the cluster display 130a and the cluster display 130b overlap with each other, the cluster editing portion 12 may determine that the clusters shown by the cluster display 130a and the cluster display 130b are to be combined, regardless of whether the user is continuing to touch the cluster display 130a and the cluster display 130b.

When the user's touch on the cluster display 130a and the cluster display 130b is released in a state where the cluster display 130a and the cluster display 130b overlap with each other, the cluster editing portion 12 may determine that the clusters shown by the cluster display 130a and the cluster display 130b are to be combined.

As shown in (b) of FIG. 10, when the cluster display 130b overlaps with the cluster display 130a, the display control portion 14 may change the display of both or one of the cluster display 130a and the cluster display 130b. For example, the display control portion 14 may change the display color of the cluster display 130a and the cluster display 130b as shown in (b) of FIG. 10. By doing this, it is possible to visually show the user that the cluster combining is performed by overlapping the cluster display 130a and the cluster display 130b.

In (c) of FIG. 10, the cluster editing portion 12 generates a cluster by combining the clusters shown by the cluster display 130a and the cluster display 130b. This cluster is expressed on the map 100 as the cluster display 130c that circumscribes the cluster display 130a and the cluster display 130b. The cluster editing portion 12 provides information about the generated cluster to the display control portion 14, and the display control portion 14 causes the display portion 15 to display the cluster display 130c. Here, in a similar way to the above-described example of the first embodiment, the display control portion 14 may move the displayed map 100 or change the scale of the displayed map 100 in accordance with the cluster display 130c.

When moving from displaying (b) to (c) of FIG. 10, the display control portion 14 may display an animation. The animation can be displayed such that, for example, the cluster display 130a and the cluster display 130b are faded out while they are enlarged, and at the same time, the cluster display 130c after the combining is faded in. With this type of animation, it is possible to visually show the user that the cluster combining is being performed.

(Division of Cluster by Pinch Operation)

FIG. 11 is a diagram showing an example in which the cluster is divided by a pinch operation in the second embodiment of the present disclosure. FIG. 11 shows a process in which the cluster is divided.

In (a) and (b) of FIG. 11, the display control portion 14 causes the display portion 15 to display the map 100 and the cluster display 130. The operation acquisition portion 11 acquires information about a pinch-in or pinch-out operation that is performed by the user on the cluster display 130. The operation acquisition portion 11 provides information about the pinch-in or pinch-out operation to the cluster editing portion 12 and the display control portion 14. In accordance with the information about this operation, the display control portion 14 compresses or elongates the cluster display 130 and displays it.

In the example shown in (a) and (b) of FIG. 11, when the cluster display 130 is compressed or elongated at a ratio exceeding a predetermined ratio by the pinch operation performed by the user, the cluster editing portion 12 may divide the cluster shown by the cluster display 130. Further, the cluster editing portion 12 may divide the cluster shown by the cluster display 130 when the compression or elongation of the cluster display 130 due to the user's pinch operation is repeated at least a predetermined number of times.

Further, the cluster editing portion 12 may change how much the cluster is divided up in accordance with a speed of the pinch operation performed by the user. In the present embodiment, the cluster is divided using the information of the tree structure held in the cluster information 16. More specifically, the division of the cluster is performed such that the cluster displayed as the cluster display 130 is changed from a higher level cluster to a lower level cluster in the tree structure. At this time, how much the cluster is divided up is determined based on how far the cluster is to be displayed below the original cluster.

As an example, let us consider a case in which the cluster to be displayed is changed from the original cluster to a child cluster that has the original cluster as a parent, namely, a case in which the original cluster is changed to a directly lower cluster, and a case in which the original cluster is changed to a grandchild cluster, namely, a case in which the original cluster is changed to a two-level lower cluster. In this case, the grandchild cluster is a cluster that is divided up more than the child cluster. Therefore, it will be apparent that the child cluster is divided up relatively less while the grandchild cluster is divided up more.

In the example shown in (a) and (b) of FIG. 11, when the speed of the pinch operation performed by the user does not exceed a predetermined threshold value, the cluster editing portion 12 divides up the cluster relatively less. An example of this case is shown in (c) and (d) of FIG. 11. On the other hand, when the speed of the pinch operation performed by the user exceeds the predetermined threshold value, the cluster editing portion 12 divides up the cluster relatively more. An example of this case is shown in (e) and (f) of FIG. 11.

In (c) of FIG. 11, the cluster editing portion 12 notifies the display control portion 14 that the cluster is to be divided, and the display control portion 14 causes the display portion 15 to display an effect display 150a that shows that the cluster is to be divided up. In the case of (c) of FIG. 11, the cluster is divided up relatively less by a relatively slow pinch operation. Therefore, the effect display 150a is relatively small and can be displayed with a calm animation. In the example shown in (c) of FIG. 11, the effect display 150a is displayed as an animation of a bubble popping.

In (d) of FIG. 11, the cluster editing portion 12 divides up the cluster shown by the above-described cluster display 130 into the sub-clusters shown by the sub-cluster displays 135. These sub-clusters are lower level clusters of the cluster shown by the cluster display 130 in the tree structure. The cluster editing portion 12 provides information about the sub-clusters after the division to the display control portion 14, and the display control portion 14 causes the display portion 15 to display the sub-cluster displays 135 that show the sub-clusters. In the example shown in (d) of FIG. 11, the display control portion 14 causes the display portion 15 to display three sub-cluster displays 135a. At this time, in a similar way to the example of the above-described first embodiment, the display control portion 14 may move the displayed map 100 or change the scale of the map 100 in accordance with the cluster division.

When moving from displaying (c) to (d) of FIG. 11, the display control portion 14 may display an animation. The animation can be displayed such that, for example, the effect display 150a is faded out, and at the same time, the sub-cluster displays 135a are faded in. With this type of animation, it is possible to visually show the user that the cluster combining is being performed.

In (e) of FIG. 11, in a similar way to (c) of FIG. 11, the display control portion 14 causes the display portion 15 to display an effect display 150b that shows that the cluster is to be divided up. In the case of (e) of FIG. 11, the cluster is divided up relatively more by a relatively fast pinch operation. Therefore, the effect display 150b is relatively large and can be displayed with an animation having a strong impact. In the example shown in (e) of FIG. 11, the effect display 150b is displayed as an animation of a bubble exploding.

In (f) of FIG. 11, in a similar way to (d) of FIG. 11, the cluster editing portion 12 divides the cluster into sub-clusters and the display control portion 14 causes the display portion 15 to display the sub-cluster displays 135. In the example shown in (f) of FIG. 11, the display control portion 14 causes the display portion 15 to display seven sub-cluster displays 135b. The sub-clusters shown by the sub-cluster displays 135b are clusters whose level in the cluster tree structure is lower than that of the clusters shown by the sub-cluster displays 135a. At this time, in a similar way to the example of (c) of FIG. 11, the display control portion 14 may move the displayed map 100 or change the scale of the displayed map 100 in accordance with the cluster division. Moreover, in transition of the display from (e) to (f), the display control portion 14 may display an animation similar to that used in the transition of the display from (c) to (d).

(Change of Cluster Hierarchy by Expanding and Contracting Operation)

FIG. 12 is a diagram showing an example in which the hierarchy of the cluster display is changed by an expanding and contracting operation in the second embodiment of the present disclosure. FIG. 12 shows a process in which the hierarchy of the cluster display is changed.

In (a) of FIG. 12, the display control portion 14 causes the display portion 15 to display the map 100 and the cluster display 130.

In (b) of FIG. 12, the operation acquisition portion 11 acquires information about a pinch-in operation that is performed on a given section of the display portion 15 by the user. The operation acquisition portion 11 provides the information about this pinch-in operation to the cluster editing portion 12. In response to the information about the pinch-in operation, the cluster editing portion 12 acquires information about the subclusters, which are lower level clusters of the cluster shown by the cluster display 130, from the information of the cluster tree structure held in the cluster information 16, and provides the acquired information to the display control portion 14. The display control portion 14 causes the display portion 15 to display, in place of the cluster display 130, the three sub-cluster displays 135a that are divided up more than the cluster display 130.

In (c) of FIG. 12, the operation acquisition portion 11 acquires information about a pinch-in operation that is performed again on the given section of the display portion 15 by the user. The operation acquisition portion 11 provides the information about this pinch-in operation to the cluster editing portion 12. In response to the information about the pinch-in operation performed again, the cluster editing portion 12 acquires information about the sub-clusters, which are lower level clusters than the subclusters shown by the sub-cluster displays 135a, from the information of the cluster tree structure held in the cluster information 16, and provides the acquired information to the display control portion 14. The display control portion 14 causes the display portion 15 to display, in place of the sub-cluster displays 135a, the seven sub-cluster displays 135b that are divided up even more than the sub-cluster displays 135a.

When in the state shown in (c) of FIG. 12, if the user performs the pinch-out operation on the give section of the display 15 and the operation acquisition portion 11 acquires information about this pinch-out operation, the cluster editing portion 12 performs reverse processing to that in the above-described example, and the display of the display portion 15 returns to the state shown in (b) of FIG. 12. Here, if the operation acquisition portion 11 further acquires information about the pinch-out operation performed by the user on the given section of the display portion 15, the cluster editing portion 12 performs reverse processing to that in the above-described example, and the display of the display portion 15 returns to the state shown in (a) of FIG. 12.

Here, if the user intends to display a higher level cluster than the cluster shown by the cluster display 130, there are some cases when it is necessary to change the scale of the map 100 and as a result the display becomes complicated. For that reason, the cluster editing portion 12 may be set to not change the cluster display 130 even when information about the pinch-out operation is acquired by the operation acquisition portion 11 in the initially displayed state shown in (a) of FIG. 12.

In this way, in the example shown in FIG. 12, the hierarchy of the displayed cluster in the tree structure is changed in response to the pinch-in and pinch-out operations performed by the user with respect to the display of the display portion 15 including the cluster display 130. At this time, the scale of the map 100 displayed on the display portion 15 is maintained.

Here, the pinch-in and pinch-out operations with respect to the display of the display portion 15 are normally used to contract and expand the display of the display portion 15. In other words, the pinch-in and pinch-out operations are operations to contract and expand the display including the cluster display 130. In order to distinguish between a case in which this type of contracting and expanding operations are used to contract and expand the display and a case in which this type of contracting and expanding operations are used to change the hierarchy of the cluster display 130, the operation acquisition portion 11 may be set to enter the cluster editing mode from the normal mode when the operation acquisition portion 11 acquires information about a predetermined operation performed by the user.

In this case, for example, in the normal mode, the operation acquisition portion 11 provides information about the pinch operation performed by the user to the display control portion 14, and the display control portion 14 changes the scale of the map 100 in response to the information about the pinch operation. On the other hand, in the cluster editing mode, as described above, the operation acquisition portion 11 provides information about the pinch operation performed by the user to the cluster editing portion 12, and the cluster editing portion 12 provides information about the clusters in different hierarchies in response to the information about the pinch operation.

The predetermined operation for the operation acquisition portion 11 to enter the cluster editing mode from the normal mode can be a long pressing operation or a tapping operation on the cluster display 130, for example. Further, the predetermined operation can be an operation on an "editing start" button that is separately displayed, for example. Furthermore, the predetermined operation can be continuation of the user's touch on the specific section of the display portion 15 in a similar way to the first embodiment.

(Division of Cluster by Movement Operation)

FIG. 13 is a diagram showing an example in which the cluster is divided by a movement operation in the second embodiment of the present disclosure. FIG. 13 shows a process in which the cluster is divided up.

In (a) of FIG. 13, the display control portion 14 causes the display portion 15 to display the map 100, the cluster display 130 and the sub-cluster displays 135a. The operation acquisition portion 11 acquires information about an operation that the user uses to move one of the sub-cluster displays 135a to the outside of the cluster display 130. Here, the operation that the user uses to move the cluster display 130 is, for example, a drag operation or a flick operation. The operation acquisition portion 11 provides information about the above-described operation to the cluster editing portion 12 and the display control portion 14. In accordance with the information about this operation, the display control portion 14 moves one of the sub-cluster displays 135a toward the outside of the cluster display 130 and displays it.

Normally, in order to improve visibility of the cluster display 130, the sub-cluster displays 135a need not necessarily be displayed. In this case, when the operation acquisition portion 11 acquires information about a predetermined operation performed by the user, the display control portion 14 may enter the cluster editing mode from the normal mode, and may display the sub-cluster displays 135a. The operation acquisition portion 11 acquires, as the information about the predetermined operation, for example, information about the duration of pressing or tapping on the cluster display 130, an operation on the "editing start" button that is separately displayed, continuation of the user's touch on the specific section of the display portion 15, or the like.

In the example shown in (a) of FIG. 13, if the whole of the sub-cluster display 135a is moved to the outside of the cluster display 130 as a result of the movement by the user's operation, the cluster editing portion 12 divides up the sub-cluster shown by the sub-cluster display 135a from the cluster shown by the cluster display 130, and changes the sub-cluster to a cluster in the same hierarchy.

In (b) of FIG. 13, the cluster editing portion 12 determines that the sub-cluster is to be divided from the cluster, and notifies the display control portion 14 that the cluster is to be divided up. When the display control portion 14 receives the notification, the display control portion 14 causes the display portion 15 to display an animation indicating that the cluster is being divided up. For example, the display control portion 14 reduces the size of the cluster display 130 and changes the cluster display 130 to have the smallest shape that can circumscribe the remaining two sub-cluster displays 135a. Further, the display control portion 14 moves the sub-cluster display 135a, which has been moved to the outside of the cluster display 130, to the original position. For example, when the sub-cluster display 135a is moved by a user's drag operation, this movement may be performed when the user's drag operation is released.

In (c) of FIG. 13, the cluster editing portion 12 divides the sub-cluster from the cluster and provides the display control portion 14 with information about the cluster after the division. In accordance with the provided information, the display control portion 14 causes the display portion 15 to display the cluster displays 130 and the sub-cluster displays 135. In the example shown in (c) of FIG. 13, the divided sub-cluster changes to a cluster in the same hierarchy as the original cluster, and the two cluster displays 130 are displayed. The remaining two sub-clusters 135a are displayed on the inner side of the cluster display 130 that shows the original cluster. Further, the sub-cluster displays 135b are displayed on the inner side of the cluster display 130 that shows the divided cluster. The sub-cluster displays 135b show sub-clusters whose level is lower than that of the sub-clusters shown by the sub-cluster displays 135a.

Here, for example, the display control portion 14 may be set to return from the cluster editing mode to the normal mode, and to delete the sub-cluster displays 135 from the display portion 15, in accordance with an operation similar to the operation to switch the display control portion 14 from the normal mode to the cluster editing mode. Further, in a similar way to the above-described example of the first embodiment, the display control portion 14 may move the displayed map 100 or may change the scale of the displayed map 100 in accordance with the cluster division.

In this way, in the example shown in FIG. 13, in response to the user's operation to move the sub-cluster display 135, the sub-cluster shown by the sub-cluster display 135 is divided from the cluster shown by the cluster display 130 and is displayed as the new cluster display 130. Thus, with an intuitive operation, it is possible to divide the sub-cluster from the original cluster and change the sub-cluster to a cluster having the same hierarchy as the original cluster.

Note that, as described above, in the present embodiment, a user's operation that is different from that of the first embodiment is used to edit the cluster and cluster editing is also different from that of the first embodiment. Therefore, the present embodiment can be achieved in combination with the first embodiment. In this case, the cluster editing portion 12 performs cluster generation, combining, division, deletion or the like, in accordance with the trajectory 120 of the user's pointing operation that is acquired by the operation acquisition portion 11 in the cluster editing mode, and the cluster editing portion 120 also performs cluster combining, division or the like, in accordance with a drag, flick or pinch operation etc. on the cluster display 130, information about which is acquired by the operation acquisition portion 11.

3. Third Embodiment

Next, a third embodiment of the present disclosure will be explained with reference to FIG. 14 to FIG. 18. The third embodiment of the present disclosure is different from the above-described first and second embodiments in terms of how the display control portion 14 displays cluster related information. However, the other processing is the same as that of the first and second embodiments, and thus a detailed explanation thereof is omitted.

(Display of Clusters as Nodes of Tree Structure)

FIG. 14 is a diagram showing an example in which clusters are displayed as nodes of a tree structure in the third embodiment of the present disclosure.

In FIG. 14, the display control portion 14 causes the display portion 15 to display the map 100, the cluster displays 130, the cluster name display 140, and a tree structure display 160. The tree structure display 160 shows a tree structure of the clusters including the cluster shown by the cluster displays 130. The tree structure display 160 shows each of the clusters using nodes 161. Note that the nodes 161 are also displays used to show the clusters, and therefore it is apparent that the nodes 161 are one type of cluster display. A link is displayed between the nodes 161 and indicates a parent-child relationship in the tree structure.

At this time, nodes 161a corresponding to the clusters displayed as the cluster displays 130 on the map 100 can be displayed with a different color from other nodes 161b. In the example shown in FIG. 14, the clusters "Home" and "Neighborhood" are displayed as the cluster displays 130 on the map 100. Therefore, the nodes 161a showing the clusters "Home" and "Neighborhood" are displayed with a different color from the other nodes 161b.

In this way, in the present embodiment, in addition to the cluster display using the cluster displays 130 on the map 100, the cluster display using the nodes 161 on the tree structure display 160 is also provided to the user. Thus, in a visually understandable manner, it is possible to provide the user with information about the entire clusters included in the tree structure, as well as information about the clusters that are displayed as the cluster displays 130.

In the example shown in FIG. 14, each of the nodes 161 may be selected by a touch operation, a tapping operation or the like performed by the user, information about which is acquired by the operation acquisition portion 11. Here, if the operation acquisition portion 11 acquires information about an operation that selects one of the nodes 161, the display control portion 14 changes the display of the map 100 so that the cluster display 130 of the cluster shown by the selected node 161 is displayed. For example, the display control portion 14 may perform adjustment by moving the displayed map 100 or changing the scale of the displayed map 100 so that the target cluster display 130 is displayed in an appropriate size and in an appropriate position, such as in the vicinity of the center of the map 100. In accordance with a change of the cluster displayed as the cluster display 130, the node 161 that is displayed as the node 161a with a different color from the other nodes 161 also changes.

(Display of Movement Between Nodes of Tree Structure)

FIG. 15 is a diagram illustrating an example of movement between clusters that are displayed as nodes of a tree structure in the third embodiment of the present disclosure.

FIG. 15 shows a group of the nodes 161 indicating the cluster tree structure. In the example shown in FIG. 15, "Japan" is set as a root node, and the tree structure of the nodes 161 is developed using hierarchies, such as the metropolis and prefectures, municipalities, and the like.

As described above, in the present embodiment, it is possible to select the cluster to be displayed as the cluster display 130 on the map 100, from among the clusters displayed as the nodes 161 on the tree structure display 160. In response to this selection, the display control portion 14 moves the displayed map 100 or changes the scale of the displayed map 100, for example, and thereby changes the cluster display 130 to be displayed. Movement of the map 100 or changing of the scale of the map 100 performed in this type of case is hereinafter referred to as transition of the display of the map 100.

In the example shown in FIG. 15, the cluster to be displayed is changed from the cluster displayed by the node 161 "Osaki" to the cluster displayed by the node 161 "Nakafurano town". At this time, the display control portion 14 causes the transition of the display of the map 100 such that, in the cluster tree structure, the clusters on the path from the cluster before the change to the cluster after the change are sequentially displayed as the cluster displays 130 on the display portion 15.

This type of transition of the display will be specifically explained using the example shown in FIG. 15. First, the display control portion 14 causes the display portion 15 to display the cluster of the node 161 "Osaki" as the cluster display 130. Next, the display control portion 14 causes the display portion 15 to display, as the cluster display 130, the cluster of the node 161 "Shinagawa ward" that is a higher level node of "Osaki". Further, the display control portion 14 causes the display portion 15 to display, as the cluster display 130, the cluster of the node 161 "Tokyo Metropolis" that is a higher level node of "Shinagawa ward". In this way, when a higher level of the node 161 is displayed as the cluster display 130, the display control portion 14 reduces the scale of the map 100 (zooms out). Further, the display control portion 14 may move the map 100 so that the cluster display 130 that is newly displayed is displayed in an appropriate position, such as in the vicinity of the center of the map 100.

Here, a common top level node of the node 161 "Osaki" and the node 161 "Nakafurano town" is the node 161 "Japan". Therefore, until the cluster of the node 161 "Japan" is displayed as the cluster display 130 on the display portion 15, the display control portion 14 continues the transition of the display of the map 100 to display the cluster of a higher level of the node 161 as the cluster display 130.

After the cluster of the node 161 "Japan" has been displayed as the cluster display 130 on the display portion 15, the display control portion 14 changes the display such that the clusters of the lower level nodes 161 are sequentially displayed as the cluster displays 130. Specifically, the display control portion 14 causes the display portion 15 to display the cluster of the node 161 "Hokkaido" as the cluster display 130. Next, the display control portion 14 causes the display portion 15 to display, as the cluster display 130, the cluster of the node 161 "Sorachi county" that is a lower level node of "Hokkaido". Further, the display control portion 14 causes the display portion 15 to display, as the cluster display 130, the cluster of the target node 161 "Nakafurano town" that is a lower level node of "Sorachi county".

In the above-described example, if the transition of the display of the map 100 is not easily seen because of a space between the hierarchies of the nodes 161, the display control portion 14 may interpolate another display of the map 100 between the display of a parent node and the display of a child node. For example, between the display of the map 100 when the cluster of the node 161 "Shinagawa ward" is displayed as the cluster display 130 and the display of the map 100 when the cluster of the node 161 "Tokyo Metropolis" is displayed as the cluster display 130, if at least one of the scale and the position differs significantly from a range in which the user feels that he/she can easily see the displays, the display control portion 14 interpolates another display of the map 100 between these displays.

Note that the position of the map 100 to be interpolated can be obtained by linear interpolation based on the position of the map 100 when the parent node is displayed and the position of the map 100 when the child node is displayed. Further, the scale of the map 100 to be interpolated may be obtained by linear interpolation based on the scale of the map 100 used to display the parent node and the scale of the map 100 used to display the child node. Alternatively, the scale of the map 100 to be interpolated may be set based on a predetermined zoom level.

The predetermined zoom level is a zoom level that is set in advance in the display control portion 14 in order to display the map 100. The predetermined zoom level will be explained using an example in which a maximum scale of the display is set at a zoom level "0" and the zoom level increases as the scale reduces. In this example, the zoom level used to display the cluster of the node 161 "Osaki" is "18", and the zoom level used to display the cluster of the node 161 "Shinagawa ward", which is a higher level node of the node 161 "Osaki", is "17". In this case, the display control portion 14 changes the display from "Osaki" to "Shinagawa ward" without interpolating the display of the map 100. On the other hand, the zoom level used to display the cluster of the node 161 "Tokyo Metropolis", which is a higher level node of the node 161 "Shinagawa ward", is "15". In this case, if the display control portion 14 directly changes the display from "Shinagawa ward" to "Tokyo Metropolis", the zoom level jumps from "17" to "15" and the transition of the display may give the user an abrupt impression. To address this, the display control portion 14 interpolates the display of the map 100 with the zoom level "16" between these displays. The center position of the display of the map 100 to be interpolated can be obtained by linear interpolation based on the center position of the map 100 when "Shinagawa ward" is displayed and the center position of the map 100 when "Tokyo Metropolis" is displayed. Further, the zoom level used to display the cluster of the node 161 "Sorachi county" is "15", and the zoom level used to display the node 161 "Nakafurano town", which is a lower level node of the node 161 "Sorachi county", is "19". In this case, the display control portion 14 interpolates the displays of the map 100, whose zoom levels are "16", "17" and "18", between these displays. In this way, a plurality of displays of the map 100 may be interpolated by the display control portion 14.

With the displays described above, it is possible to visually show the user how the clusters, which are displayed as the cluster displays 130 on the map 100, are changing. Note that, in order to more visually show the change of the displayed clusters, the display control portion 14 may, for example, display the nodes 161 corresponding to the parent node and the child node that are displayed before and after the display change, using a different color from the other nodes 161. Alternatively, the display control portion 14 may display, on the display portion 15, at least one of the names of the nodes 161 corresponding to the parent node and the child node that are displayed before and after the display change.

(Division of Cluster on Tree Structure Display)

FIG. 16 is a diagram showing an example in which the cluster is divided using a tree structure display in the third embodiment of the present disclosure.

In FIG. 16, in a similar way to FIG. 14, the display control portion 14 causes the display portion 15 to display the map 100 and the tree structure display 160. The operation acquisition portion 11 acquires the trajectory 120 of the user's pointing operation that traverses a link between the nodes 161 displayed on the tree structure display 160. The operation acquisition portion 11 provides information about the trajectory 120 to the cluster editing portion 12 and the display control portion 14. The display control portion 14 causes the display portion 15 to display the trajectory 120 as shown in FIG. 16. Also in the example below, in a similar way to the first embodiment, the operation acquisition portion 11 may enter the cluster editing mode from the normal mode in response to the user's touch on the specific section of the display portion 15, and may acquire the trajectory 120.

In the example shown in FIG. 16, the trajectory 120 traverses the link between the nodes 161. When the trajectory 120 traverses the link between the nodes 161 in this way, the cluster editing portion 12 deletes the link traversed by the trajectory 120 in the cluster tree structure. Therefore, in the example shown in FIG. 16, the cluster editing portion 12 deletes the link between the node 161 "Neighborhood" and the node 161 "Yokohama station".

It should be noted here that deletion of the link in the tree structure indicates deletion of a parent-child relationship between the nodes. More specifically, in the above example, the cluster editing portion 12 deletes the parent-child relationship between the node 161 "Neighborhood" and the node 161 "Yokohama station". As a result, the cluster of the node 161 "Yokohama station" changes to an individual cluster that is not included in the cluster of the node 161 "Neighborhood". In other words, this link deletion is processing that divides the sub-cluster "Yokohama station" from the cluster "Neighborhood". The cluster editing portion 12 reflects this editing result on the cluster information 16. Note that, when the divided node 161 "Yokohama station" has child nodes, a parent-child relationship with the child nodes can be maintained and an individual tree structure can be formed, in which the node 161 "Yokohama station" serves as a root node.

Further, the cluster editing portion 12 may provide the above-described editing result to the display control portion 14, and the display control portion 14 may display the cluster "Yokohama station" independently from the cluster "Neighborhood" on the cluster display 130 that is displayed on the map 100. In this way, the display control portion 14 may reflect a result of the cluster editing performed by the user operating the tree structure display 160, on the cluster display 130 of the map 100 in real time. Conversely, the display control portion 14 may reflect a result of the cluster editing performed by the user operating the cluster display 130, on the tree structure display 160 in real time. In summary, the cluster display 130 and the tree structure display 160 can be interactive displays for cluster editing.

(Generation and Combining of Clusters on Tree Structure Display)

FIG. 17 is a diagram showing an example in which the clusters are generated and combined using the tree structure display in the third embodiment of the present disclosure. FIG. 17 shows a process in which the clusters are generated and combined.

In (a) of FIG. 17, the display control portion 14 causes the display portion 15 to display the map 100, the cluster displays 130, the cluster name displays 140, the tree structure display 160 and the nodes 161. This display is the same as the display after the cluster has been divided up in the example shown in FIG. 16. More specifically, the tree structure display 160 shows a display of the cluster tree structure in which the node 161 "Home and neighborhood" is a root node, and the node 161 "Yokohama station" that is independent from this cluster tree structure. The clusters "Home" and "Neighborhood", and the cluster "Yokohama station" that is divided off and independent from the cluster "Neighborhood" are displayed on the map 100 as the cluster displays 130 (note that the cluster name displays 140 other than "Neighborhood" are hidden under the tree structure display 160). The nodes 161a that indicate these clusters are displayed with a different color from the other nodes 161b.

Here, the operation acquisition portion 11 acquires information about an operation that the user uses to select a given position on the tree structure display 160. Here, information about an operation, such as double tap etc., can be obtained. The operation acquisition portion 11 provides the acquired information about the operation to the cluster editing portion 12 and the display control portion 14. In accordance with the information about the operation, the display control portion 14 displays a new node 161n in a position that is selected by the user on the tree structure display 160. On the other hand, in response to the information about this operation, the cluster editing portion 12 recognizes that the new node 161n has been added to the cluster tree structure. However, the position of the new node 161n in the tree structure has not yet been determined.

In (b) of FIG. 17, the operation acquisition portion 11 acquires the trajectories 120 of pointing operations performed by the user drawing links between the nodes 161. The operation acquisition portion 11 provides information about the trajectories 120 to the cluster editing portion 12 and the display control portion 14. The display control portion 14 causes the display portion 15 to display the trajectories 120 as shown in (b) of FIG. 17. On the other hand, the cluster editing portion 12 sets, in the cluster tree structure, a link between the new node 161n and the node 161 "Home and neighborhood", and a link between the new node 161 and the node 161 "Yokohama station". Thus, the new node 161n is generated as a parent node of the node 161 "Home and neighborhood" and the node 161 "Yokohama station". In other words, this link setting is processing that combines the cluster "Home and neighborhood" and the cluster "Yokohama station" and thereby forms a new cluster.

In (c) of FIG. 17, the cluster editing portion 12 reflects a result of the above-described editing on the cluster information 16, and provides the editing result to the cluster name editing portion 13 and the display control portion 14. The cluster name editing portion 13 generates a cluster name for the cluster shown by the new node 161n. In the example shown in (c) of FIG. 17, when the parent node is newly generated, the cluster name editing portion 13 generates a cluster name by jointly using the names of the corresponding child nodes. More specifically, the cluster name editing portion 13 generates the cluster name "Home and neighborhood, Yokohama station" of the cluster shown by the new node 161n, by jointly using the cluster name "Home and neighborhood" and the cluster name "Yokohama station". The cluster name editing portion 13 provides information about the generated cluster name to the display control portion 14.

On the other hand, the display control portion 14 reflects, on the cluster display 130 and the cluster name display 140, the information about the cluster and the cluster name provided from the cluster editing portion 12 and the cluster name editing portion 13, respectively. More specifically, the display control portion 14 displays, on the map 100, the cluster display 130 and the cluster name display 140 that show the newly generated cluster "Home and neighborhood, Yokohama station". The clusters "Home", "Neighborhood" and "Yokohama station" shown as the cluster displays 130 in (b) of FIG. 17 correspond to sub-clusters of the newly displayed cluster "Home and neighborhood, Yokohama station". Therefore, the cluster displays 130 and the cluster name displays 140 of these clusters may be deleted from the display portion 15.

Further, the display control portion 14 also reflects these pieces of information on the display of the tree structure display 160. More specifically, the display control portion 14 displays the name "Home and neighborhood, Yokohama station" for the new node 161n, and displays the link between the new node 161n and the node 161 "Home and neighborhood" and the link between the new node 161n and the node 161 "Yokohama station". Further, in response to the change of the cluster display 130, the display control portion 14 displays the node "Home and neighborhood, Yokohama station" that was displayed as the node 161n, as the node 161a with a different color from the other nodes 161b.

(Deletion of Cluster on Tree Structure Display)

FIG. 18 is a diagram showing an example in which the cluster is deleted using the tree structure display in the third embodiment of the present disclosure. FIG. 18 shows states before and after the cluster is deleted.

In (a) of FIG. 18, the display control portion 14 causes the display portion 15 to display the map 100, the cluster display 130, the cluster name display 140, the tree structure display 160 and the nodes 161. This display is similar to the display after the clusters have been combined in the example shown in FIG. 17. More specifically, the cluster tree structure, in which the node 161 "Home and neighborhood, Yokohama station" is a root node, is displayed on the tree structure display 160. The cluster "Home and neighborhood, Yokohama station" is displayed as the cluster display 130 on the map 100. The node 161a indicating the cluster "Home and neighborhood, Yokohama station" is displayed with a different color from the other nodes 161b.

Here, the operation acquisition portion 11 acquires the trajectories 120 of the user's pointing operations, which traverse the nodes 161 displayed on the tree structure display 160 a plurality of times. The operation acquisition portion 11 provides information about the trajectories 120 to the cluster editing portion 12 and the display control portion 14. The display control portion 14 causes the display portion 15 to display the trajectories 120 as shown in (a) of FIG. 18. On the other hand, the cluster editing portion 12 deletes, in the cluster tree structure, the node 161 "Home and neighborhood, Yokohama station" and the node 161 "Yokohama station" that have been respectively traversed the plurality of times by the trajectories 120.

In (b) of FIG. 18, the cluster editing portion 12 reflects a result of the above-described editing on the cluster information 16, and provides the editing result to the display control portion 14. The display control portion 14 deletes, from the display portion 15, the cluster display 130 and the cluster name display 140 that correspond to the deleted node 161 "Home and neighborhood, Yokohama station". Here, among the child nodes of the deleted node 161 "Home and neighborhood, Yokohama station", the node 161 "Home and neighborhood" is not deleted. Therefore, the display control portion 14 displays the cluster display 130 and the cluster name display 140 of "Home and neighborhood" on the map 100, in place of those of "Home and neighborhood, Yokohama station". On the other hand, among the child nodes of the deleted node 161 "Home and neighborhood, Yokohama station", the node 161 "Yokohama station" is deleted together with the parent node. Further, the node 161 "Yokohama station" is a leaf node having no child node. Therefore, the display control portion 14 displays image content included in the cluster "Yokohama station" on the map 100 as the image icon 110 (which is hidden under the tree structure display 160 in (b) of FIG. 18).

Further, the display control portion 14 reflects the above-described change on the display of the tree structure display 160. Specifically, the display control portion 14 deletes, from the tree structure display 160, the deleted nodes 161 "Home and neighborhood, Yokohama station" and "Yokohama station", and the display of the links connected to these nodes 161. Further, the display control portion 14 displays the node 161a "Home and neighborhood" that is newly displayed as the cluster display 130, using a different color from the other nodes 161b.

In this way, in the present embodiment, the cluster indicated by the node 161 can be edited by the user performing an operation on the node 161 on the tree structure display 160. Thus, the user can perform cluster editing while visually and comprehensively grasping information of all of the clusters included in the tree structure.

Note that, as described above, in the present embodiment, the tree structure display 160 is displayed in addition to the map 100 that is also displayed in the first and second embodiments. Therefore, the present embodiment can be achieved in combination with the first and second embodiments. In this case, the cluster editing portion 12 is set so that the cluster editing can be performed in accordance with both the user's operation on the cluster display 130 on the map 100, and the user's operation on the node 161 on the tree structure display 160. The display control portion 14 interactively reflects the result of the cluster editing on each of the displays.

Although the third embodiment was initially described with respect to geographic features, the scope of the embodiment should not be so limited. For example, instead of geographic clusters, the tree structure could be used for organizing genealogy information. For example, a family tree has people as its nodes and parents forming tree branches. Data, such as birth records, photos, videos, and other information associated with one or more people in the family may be associated with different nodes in the family tree. The structure and processes described in FIGS. 14-18 are equally applicable for clustering family-related data according to a family tree hierarchical arrangement.

In this embodiment, to assist in generating meta-data that is associated with a photo, for example, as available in SONY® digital still cameras, face detection is used to associate people's faces with preregistered family members. The preregistration is done on a local computer, or a remote server. When a photo is taken, the face recognition feature compares the captured face, and associates face and then associates in memory the face with the photograph. The association may be performed with meta-data or a tag. Photos with common meta-data or tags are then included in a common cluster, such as with a family tree. For example, a child's photograph would be associated not only with other photos of the child, but also through a sibling-relationship, parent relationship, and grandparent relationship. Thus, the child's photo may be a particular data item, but a group of photos of the child may be grouped in a cluster with the child's name. That cluster may then be combined with other clusters of siblings as part of a "children" cluster. Likewise, when the children cluster is combined with a parents cluster, a "family" cluster is created, using the family name.

4. Fourth Embodiment

Next, a fourth embodiment of the present disclosure will be explained with reference to FIG. 19 to FIG. 22. The fourth embodiment of the present disclosure is different from the above-described first to third embodiments in that editing of the cluster name is performed by the cluster name editing portion 13. However, the other processing is similar to that of the first to third embodiments, and thus a detailed explanation thereof is omitted.

(Tree Structure of Cluster Names)

FIG. 19 is a diagram illustrating a tree structure of cluster names in the fourth embodiment of the present disclosure.

FIG. 19 shows an example in which a cluster name N is generated based on an address A of each of the items of content that are classified into clusters. In this example, n items of content from "content 1" to "content n" that are classified into the clusters are captured image content items, and they respectively have address information A1 to An indicating image capturing positions. Here, the address information A is information like "Japan, Kanto region, Kanagawa prefecture, Yokohama city, Nishi ward, in front of station, 1-block". In this example, the address information has a hierarchical structure of "country, region, prefecture, city, ward, town, block".

In the present embodiment, the cluster name is generated using one or a plurality of names in a given hierarchy in the hierarchical structure of this type of address information. First, when names in the "ward" hierarchy are used to generate a cluster name, the names in the "ward" hierarchy that are included in the address information A of each content are extracted. As a result, names N5-1 to N5-5 respectively indicating "Nishi ward", "Kanagawa ward", "Midori ward", "Kawasaki ward" and "Saiwai ward" are extracted. Therefore, the cluster name that is generated using the names in the "ward" hierarchy is, for example, "Nishi ward, Kanagawa ward, Midori ward, Kawasaki ward, Saiwai ward".

Next, when names in the "city" hierarchy are used to generate a cluster name, the names in the "city" hierarchy that are included in the address information A of each content are extracted. As a result, names N4-1 and N4-2 respectively indicating "Yokohama city" and "Kawasaki city" are extracted. Therefore, the cluster name that is generated using the names in the "city" hierarchy is, for example, "Yokohama city, Kawasaki city".

Next, when names in the "prefecture" hierarchy are used to generate a cluster name, the names in the "prefecture" hierarchy that are included in the address information A of each content are extracted. As a result, a name N3 indicating "Kanagawa prefecture" is extracted. In summary, in the example shown in FIG. 19, the content items classified into the clusters are all captured in the Kanagawa prefecture. Accordingly, the cluster name that is generated using the names in the "prefecture" hierarchy is a name including the name N3 "Kanagawa prefecture". In a similar way, the cluster name that is generated using names in the "region" hierarchy is a name including a name N2 "Kanto region". Further, the cluster name that is generated using the name of "country" is a name including a name N1 "Japan".

(Cluster Name Change by Movement Operation)

FIG. 20 is a diagram showing an example in which the cluster name is changed by an operation that moves the cluster name display in the fourth embodiment of the present disclosure. FIG. 20 shows a process in which the cluster name is changed.

In (a) of FIG. 20, the display control portion 14 causes the display portion 15 to display the map 100, the cluster display 130 and the cluster name display 140. The operation acquisition portion 11 acquires information about an operation that the user uses to move the cluster name display 140 to the right. Here, the operation that the user uses to move the cluster name display 140 is, for example, a drag operation, a flick operation or the like with respect to the region of the cluster name display 140. The operation acquisition portion 11 provides the information about the above-described operation to the cluster name editing portion 13.

In (b) of FIG. 20, the cluster name editing portion 13 changes the name that is displayed as the cluster name display 140. The cluster name editing portion 13 utilizes the address hierarchical structure to generate the cluster names, an example of which is explained with reference to FIG. 19, and thereby generates a cluster name using a name in the hierarchy that is one-level higher than the name used for the original cluster name display 140. Specifically, the cluster name editing portion 13 generates a cluster name using "Kanagawa prefecture", which is the name in the "Prefecture" hierarchy that is one-level higher than the "city" level name "Yokohama city, Kawasaki city" used for the cluster name display 140 in (a) of FIG. 20.

The cluster name editing portion 13 reflects the change of the cluster name on the cluster information 16, and provides information about the new cluster name to the display control portion 14. The display control portion 14 causes the display portion 15 to display the provided new cluster name as the cluster name display 140. Specifically, the display control portion 14 changes a text 142 of the cluster name display 140 from "Yokohama city, Kawasaki city" to "Kanagawa prefecture". At this time, the display control portion 14 may adjust the size of a frame 141 of the cluster name display 140 in accordance with the text 142 after the change, without changing the display position of the frame 141.

Here, if the operation acquisition portion 11 acquires information about an operation that the user uses to move the cluster name display 140 further to the right, the cluster name editing portion 13 generates a cluster name using a name in a hierarchy that is even higher up. Specifically, the cluster name editing portion 13 generates a cluster name using "Kanto region", which is the name in the "region" hierarchy that is one-level higher than the "prefecture" level name "Kanagawa prefecture" used for the cluster name display 140 in (b) of FIG. 20.

In (c) of FIG. 20, the cluster name generated using "Kanto region" is provided to the display control portion 14 and is displayed on the display portion 15 as the cluster name display 140.

In this way, the cluster name editing portion 13 changes the hierarchy of the name used as the cluster name display 140, in accordance with a user's operation that moves the cluster name display 140. In the example shown in FIG. 20, in accordance with the operation that moves the cluster name display 140 to the right, a higher level name is displayed as the cluster name display 140. On the other hand, when an operation is performed in which the cluster name display 140 is moved to the left, a lower level name is displayed as the cluster name display 140. More specifically, when the operation acquisition portion 11 acquires information about the operation that moves the cluster name display 140 to the left, the display of the display portion 15 changes from (c) to (b), or from (b) to (a) of FIG. 20.

Note that the names displayed as the cluster name display 140 are not limited to the examples of the three hierarchies shown in FIG. 20, and the names may be changed between more than three hierarchies. For example, if information about the operation that moves the cluster name display 140 to the left is acquired in the state shown in (a) of FIG. 20, the cluster name editing portion 13 may generate a cluster name using "Nishi ward, Kanagawa ward, Midori ward, Kawasaki ward, Saiwai ward" that is one-level lower than the "city" level name, and the generated name may be displayed as the cluster name display 140.

In this way, the hierarchy of the cluster name is changed in response to the operation that moves the cluster name display 140. Thus, for example, the user can easily switch whether to simplify the cluster name by using the name in a higher level hierarchy indicating a larger district, or to show the content of the cluster in more detail by jointly using the names in a lower level hierarchy indicating a smaller district. Further, a case in which the name in a higher level hierarchy is used and a case in which the names in a lower level hierarchy are used are respectively associated with different directions of the operation that moves the cluster name display 140. As a result, the operation to change the hierarchy can be performed more intuitively.

(Selection from Cluster Name List)

FIG. 21 is a diagram showing an example in which the cluster name is changed by selection from a list in the fourth embodiment of the present disclosure. FIG. 21 shows a process in which the cluster name is changed.

In (a) of FIG. 21, the display control portion 14 causes the display portion 15 to display the map 100, the cluster display 130 and a cluster name list display 143. Here, the display control portion 14 may be set to enter the cluster name editing mode from the normal mode, and to display the cluster name list display 143 when the operation acquisition portion 11 acquires information about a predetermined operation performed by the user. The predetermined operation can be a long pressing operation or a tapping operation on the cluster name display 140, for example. Further, the predetermined operation can be an operation on the "editing start" button that is separately displayed, for example. Furthermore, the predetermined operation can be continuation of the user's touch on the specific section of the display portion 15 in a similar way to the first embodiment.

The cluster name list display 143 can be displayed when the cluster name editing portion 13 provides the display control portion 14 with information about two or more names that can be displayed as the cluster name display 140. In the example shown in (a) of FIG. 21, the cluster name list display 143 is a list corresponding to the address hierarchical structure. Specifically, the cluster name list display 143 displays a list including, for example, "Kanagawa prefecture" that is the "prefecture" level name, "Yokohama city, Kawasaki city" that is the "city" level name, "Nishi ward/Kanagawa ward/Midori ward/Kawasaki ward/Saiwai ward" that is the "ward" level name. The operation acquisition portion 11 acquires information about an operation that the user uses to select one of the names displayed on the cluster name list display 143.

In (b) of FIG. 21, the cluster name editing portion 13 provides the display control portion 14 with information about the name selected by the operation, the information about which has been acquired by the operation acquisition portion 11. The display control portion 14 causes the display portion 15 to display the cluster name display 140 that shows the selected name. In the example shown in (b) of FIG. 21, the cluster name display 140 generated using "Yokohama city, Kawasaki city" is displayed.

In the text 142 of the cluster name display 140 that is displayed in this case, a section corresponding to "Yokohama city" is displayed in a larger size and a section corresponding to "Kawasaki city" is displayed in a smaller size. This indicates that, among the image content items included in the cluster shown by the cluster display 130, more image content items are included in the district of "Yokohama city" than in the district of "Kawasaki city". In this way, the display control portion 14 may acquire attribute information of a plurality of names used as the cluster names from the cluster name editing portion 13, and may change a display manner of displaying characters of the text 142 in accordance with the number of pieces of the attribute information. In the example shown in (b) of FIG. 21, information about the number of the image content items included in the district indicated by each of the names is acquired from the cluster name editing portion 13 as the attribute information. In accordance with the attribute information, the display control portion 14 changes the size of the characters as a change of the display manner.

In the above-described example, the attribute information is not limited to the number of image content items included in the district indicated by the name. The attribute information can be, for example, the category of the name (a commercial facility, a public facility, a housing facility, a sightseeing spot etc.), the area, the population, or the number of households of the district indicated by the name, the popularity of the district indicated by the name, whether or not the district indicated by the name is one of the metropolis, a capital city and a city designated by ordinance, or the number of times the name is selected by the user's editing operation.

Further, in the above-described example, the change of the display manner of the characters of the text 142 is not limited to a change in the character size. The change of the display manner can be made, for example, by changing the font type (Ming-style typeface, Gothic typeface etc., for example), changing the color, changing to a bold face, or adding an under line.

In this way, the display manner of the characters of the text 142 is changed in accordance with the attribute information of the name. Thus, the name that is chosen for the district is likely to feel appropriate to the user, such as a district including more image content items, a more prominent district or the like, can be distinctly displayed on the cluster name display 140. Further, it is possible to distinctly display, on the cluster name display 140, the name of the district that is likely to be requested by the user, such as the name of the district which is included in the category specified by the user when capturing the image content items or which has been used several times previously by the user.

(Cluster Name Change by Pinch Operation)

FIG. 22 is a diagram showing an example in which cluster name is changed by a pinch operation on the cluster name display in the fourth embodiment of the present disclosure. FIG. 22 shows a process in which the cluster name is changed.

In (a) of FIG. 22, the display control portion 14 causes the display portion 15 to display the map 100, the cluster display 130 and the cluster name display 140. The operation acquisition portion 11 acquires information about a pinch-out operation performed on the cluster name display 140. The operation acquisition portion 11 provides the information about the pinch-out operation to the cluster name editing portion 13 and the display control portion 14.

In (b) of FIG. 22, in accordance with the information about the pinch-out operation, the display control portion 14 enlarges the frame 141 of the cluster name display 140. The cluster name editing portion 13 provides the display control portion 14 with information about the name "Kanagawa prefecture Yokohama city, Kawasaki city" that is obtained by adding "Yokohama city, Kawasaki city", which is the name in a lower level hierarchy, to "Kanagawa prefecture", which is the name displayed as the cluster name display 140 in (a) of FIG. 22. When the size of the frame 141 becomes sufficiently large, the display control portion 14 changes the text 142 to "Kanagawa prefecture Yokohama city, Kawasaki city". More specifically, as the frame 141 is enlarged by the pinch-out operation, the display control portion 14 displays a longer name that is obtained by adding the lower level name to the name displayed as the cluster name display 140. Note that, at this time, there is no change in the scale of the map 100 and in the size of the cluster display 130.

In (c) of FIG. 22, the display control portion 14 further enlarges the frame 141 because the operation acquisition portion 11 has subsequently acquired information about the pinch-out operation in the state shown in (b) of FIG. 22. The cluster name editing portion 13 provides the display control portion 14 with information about the name "Kanagawa prefecture Yokohama city Nishi ward/Kanagawa ward/Midori ward, Kawasaki city Kawasaki ward/Saiwai ward" that is obtained by adding, to "Kanagawa prefecture Yokohama city, Kawasaki city", the name in a lower level hierarchy "Nishi ward/Kanagawa ward/Midori ward/Kawasaki ward/Saiwai ward". When the size of the frame 141 becomes sufficiently large, the display control portion 14 changes the text 142 to "Kanagawa prefecture Yokohama city Nishi ward/Kanagawa ward/Midori ward, Kawasaki city Kawasaki ward/Saiwai ward".

Note that, in this case, the newly displayed name is not a name that is obtained by simply adding the name in the lower level hierarchy to the name displayed in (b) of FIG. 22, but a name that is obtained by inserting "Nishi ward/Kanagawa ward/Midori ward" after "Yokohama city" and inserting "Kawasaki ward/Saiwai ward" after "Kawasaki city". In this way, the cluster name editing portion 13 may generate a longer cluster name by inserting the name in the lower level hierarchy to a position that reflects the hierarchical structure of names such as that shown in FIG. 19.

On the other hand, when the operation acquisition portion 11 acquires information about a pinch-in operation performed on the cluster name display 140, the display control portion 14 reduces the size of the frame 141. The cluster name editing portion 13 provides the display control portion 14 with information about the name that is obtained by deleting the name in the lowest level hierarchy from the name displayed as the cluster name display 140. When the size of the frame 141 becomes too small to fully display the text 142, the display control portion 14 changes the cluster name of the text 142 to the shorter cluster name provided from the cluster name editing portion 13. More specifically, when the information about the pinch-in operation is acquired, the display of the display portion 15 changes from (c) to (b), or from (b) to (a) of FIG. 22.

In this way, in the present embodiment, in response to the user's operation performed on the cluster name display 140, it is possible to edit the cluster name that is generated using the names having the hierarchical structure of addresses or the like. Thus, the user can change the hierarchy of the displayed name by an intuitive operation, and can easily search the cluster name that is considered to be suitable for expressing the cluster.

Note that, as described above, the cluster name display 140 is operated in the present embodiment unlike the first to third embodiments. Therefore, the present embodiment can be achieved in combination with the first to third embodiments. For example, when the present embodiment is combined with the first embodiment or the second embodiment, the information processing device 10 is set such that the processing of the first or second embodiment is performed for the operation on the cluster display 130, and the processing of the present embodiment is performed for the operation on the cluster name display 140. Further, when the present embodiment is combined with the third embodiment, the information processing device 10 is set such that editing of the cluster and the cluster name is performed in accordance with an operation performed with respect to cluster display 130 and the cluster name display 140 on the map 100, and in accordance with an operation performed with respect to the nodes 161 on the tree structure display 160. In this case, an editing result of the cluster and the cluster name is interactively reflected on each of the displays of the cluster display 130, the cluster name display 140 and the tree structure display 160.

5. Fifth Embodiment

Next, a fifth embodiment of the present disclosure will be explained with reference to FIG. 23. The fifth embodiment of the present disclosure is different from the above-described third embodiment in that the tree structure display is used to edit the cluster name. However, the other processing is similar to that of the third embodiment, and thus a detailed explanation thereof is omitted.

FIG. 23 is a diagram showing an example in which the cluster name is set using the tree structure display in the fifth embodiment of the present disclosure. FIG. 23 shows a process in which the cluster name is set.

In (a) of FIG. 23, the display control portion 14 causes the display portion 15 to display the map 100, the cluster display 130, the cluster name display 140 and the tree structure display 160. Here, the display control portion 14 may be set to enter the cluster name editing mode from the normal mode when the operation acquisition portion 11 acquires information about a predetermined operation performed by the user, and may be set to delete just the text 142 of the cluster name display 140 without deleting the frame 141, and to display the tree structure display 160. The predetermined operation can be a long pressing operation or a tapping operation on the cluster name display 140, for example. Further, the predetermined operation can be an operation on the "editing start" button that is separately displayed, for example. Furthermore, the predetermined operation can be continuation of the user's touch on the specific section of the display portion 15 in a similar way to the first embodiment.

In (b) of FIG. 23, the operation acquisition portion 11 acquires information about an operation that the user uses to select the nodes 161. The operation acquisition portion 11 provides the information about this operation to the cluster name editing portion 13. The cluster name editing portion 13 generates a cluster name using the names of the nodes 161 selected by the user's operation. In the example shown in (b) of FIG. 23, the three nodes 161 "Home", "Kanagawa gakuen high school" and "Yokohama station" are selected, and the cluster name editing portion 13 generates a cluster name "Home, Kanagawa gakuen high school, Yokohama station" in which the names of these nodes 161 are jointly used. The cluster name editing portion 13 provides information about the generated cluster name to the display control portion 14.

In (c) of FIG. 23, the display control portion 14 causes the display portion 15 to display the provided cluster name as the text 142 of the cluster name display 140. At this time, the display control portion 14 may adjust the size of the frame 141 in accordance with the length of the text 142 to be displayed. The display control portion 14 may end the cluster name editing mode and delete the tree structure display 160 from the display portion 15. In a case where the tree structure display 160 is displayed before entering the cluster name editing mode, the display control portion 14 may continue to display the tree structure display 160.

In this way, in the present embodiment, it is possible to edit the name displayed as the cluster name display 140 in accordance with the user's operation performed with respect to the nodes 161 on the tree structure display 160. Thus, the user can edit the cluster name while visually and comprehensively grasping information of all of the clusters included in the tree structure.

Note that, as described above, the present embodiment has a similar configuration to the third embodiment. Therefore, in a similar way to the third embodiment, the present embodiment can be achieved in combination with each of the other embodiments.

6. Sixth Embodiment

Next, a sixth embodiment of the present disclosure will be explained with reference to FIG. 24 and FIG. 25. The sixth embodiment of the present disclosure applies the above-described first to fifth embodiments to a chosen dimensional feature space. Therefore, the description other than the dimension of the feature space is similar to that of each of the above-described embodiments, and thus a detailed explanation thereof is omitted.

FIG. 24 is a diagram illustrating a relationship between a chosen dimensional feature space and a two-dimensional feature space. FIG. 24 shows a cluster C in a chosen dimensional feature space, and a projection Cp of the cluster C onto a two-dimensional plane. The cluster C can be displayed on the display portion 15 of the information processing device 10 by transformation to the projection Cp. In the present embodiment, editing is added to the cluster C based on an editing operation of the projection Cp that is similar to an editing operation of the cluster in the two-dimensional feature space.

FIG. 25 is a diagram showing an example in which clusters are combined in the sixth embodiment of the present disclosure. FIG. 25 shows states before and after the clusters are combined.

In (a) of FIG. 25, the display control portion 14 causes the display portion 15 to display a three-dimensional space 200, cluster displays 230 and the cluster name displays 140. The three-dimensional space 200 is a three-dimensional feature space in which, for example, a geographic space is displayed. In the example shown in (a) of FIG. 25, Mt. Fuji is displayed in the three-dimensional space 200. The cluster display 230 can be displayed as a projection of the cluster onto a two-dimensional plane in the three-dimensional space 200.

Here, the operation acquisition portion 11 acquires the trajectory 120 of a pointing operation performed by the user. The trajectory 120 surrounds the two cluster displays 230 "Top of Mt. Fuji" and "Foot of Mt. Fuji". The operation acquisition portion 11 provides information about the trajectory 120 to the cluster editing portion 12 and the display control portion 14. The display control portion 14 causes the display portion 15 to display the trajectory 120 as shown in (a) of FIG. 25.

In (b) of FIG. 25, the cluster editing portion 12 generates a new cluster that contains the clusters shown by the above-described two cluster displays 230. The cluster editing portion 12 provides information about the generated cluster to the display control portion 14, and the display control portion 14 causes the display portion 15 to display a projection of the new cluster onto the two-dimensional plane, as the cluster displays 230. Further, the cluster editing portion 12 provides the information about the generated cluster to the cluster name editing portion 13, and the cluster name editing portion 13 generates a cluster name for the generated cluster. The cluster name editing portion 13 provides the generated cluster name to the display control portion 14, and the display control portion 14 causes the display portion 15 to display the cluster name "Mt. Fuji" as the cluster name display 140.

In this way, in the present embodiment, the projection of the cluster onto a two-dimensional plane in the three-dimensional space 200, which is a three-dimensional feature space, is displayed as the cluster display 230, and the cluster is edited in accordance with an operation performed on the cluster display 230. In a similar way, if the projection of a cluster onto a two-dimensional plane in a chosen dimensional feature space is displayed as a cluster display and the cluster is edited in accordance with an operation performed on the cluster display, the configuration similar to that of the above-described first to fifth embodiments can be applied not only to the case of the map 100, which is a two-dimensional feature space, but also to a chosen dimensional feature space.

7. Seventh Embodiment

Next, a seventh embodiment of the present disclosure will be explained with reference to FIG. 26 to FIG. 31. The seventh embodiment of the present disclosure is different from each of the above-described embodiments in that files in a file system and the display of a folder are taken to be position data item in a one-dimensional feature space and the display of a cluster. However, the other processing is similar to that of each of the above-described embodiments, and thus a detailed explanation thereof is omitted.

FIG. 26 is a diagram illustrating a feature space and position data item in the seventh embodiment of the present disclosure.

In FIG. 26, the display control portion 14 causes the display portion 15 to display file icons 310. The file icons 310 are arranged in accordance with a criterion set in advance, such as name, update date and time, size, type and the like. In the present embodiment, a file layout 300 is taken to be a one-dimensional feature space. In this case, the file icons 310 are data displays that show position data item of the feature space.

(Generation of Folder)

FIG. 27 is a diagram showing an example in which a folder is generated in the seventh embodiment of the present disclosure. FIG. 27 shows states before and after the folder is generated.

In (a) of FIG. 27, the operation acquisition portion 11 acquires a trajectory 320 of a user's pointing operation performed with respect to the file icons 310 displayed on the display portion 15. For example, when the operation acquisition portion 11 is a mouse, the trajectory 320 can be acquired as a trajectory of a pointer moved by the mouse. Further, for example, when the operation acquisition portion 11 is a touch panel, the trajectory 320 can be acquired as a trajectory of a user's touch on the display portion 15. The operation acquisition portion 11 provides information about the trajectory 320 to the cluster editing portion 12 and the display control portion 14. When the display control portion 14 acquires the information about the trajectory 320, the display control portion 14 causes the display portion 15 to display the trajectory 320 as shown in (a) of FIG. 27.

On the other hand, when the cluster editing portion 12 acquires the information about the trajectory 320, the cluster editing portion 12 determines how to edit the folder based on the shape of the trajectory 320. In the example shown in (a) of FIG. 27, the trajectory 320 surrounds the two file icons 310, i.e., "text A.txt" and "text B.txt". When the trajectory 320 surrounds the file icons 310 in this way, the cluster editing portion 12 generates a new folder that contains the files indicated by the surrounded file icons 310. Note that, in the present embodiment, the folder is treated as a cluster into which files are classified. The files are position data item that are arranged in particular positions of the file layout 300.

In (b) of FIG. 27, the cluster editing portion 12 generates a folder that contains the above-described two files. The cluster editing portion 12 provides information about the generated folder to the display control portion 14, and the display control portion 14 causes the display portion 15 to display a folder icon 330 that indicates the generated folder. At this time, the display control portion 14 deletes the file icons 310 that indicate the files contained in the folder, from the display portion 15.

On the other hand, the cluster editing portion 12 provides the information about the generated folder to the cluster name editing portion 13, and the cluster name editing portion 13 generates a folder name for the generated folder. For example, the cluster name editing portion 13 generates a folder name "text A and text B" by jointly using the file names contained in the folder. The cluster name editing portion 13 provides information about the generated folder name to the display control portion 14, and the display control portion 14 displays the folder name in the vicinity of the corresponding folder icon 330, as a folder name display 340.

(Combining of Folders)

FIG. 28 is a diagram showing an example in which folders are combined in the seventh embodiment of the present disclosure. FIG. 28 shows states before and after the folders are combined.

In (a) of FIG. 28, the display control portion 14 causes the display portion 15 to display the folder icons 330 and the folder name displays 340. The operation acquisition portion 11 acquires the trajectory 320. The operation acquisition portion 11 provides information about the trajectory 320 to the cluster editing portion 12 and the display control portion 14. The display control portion 14 causes the display portion 15 to display the trajectory 320 as shown in (a) of FIG. 28.

In the example shown in (a) of FIG. 28, the trajectory 320 surrounds the two folder icons 330. When the trajectory 320 surrounds the folder icons 330 in this way, the cluster editing portion 12 generates a new folder that contains the folders indicated by the surrounded folder icons 330.

In (b) of FIG. 28, the cluster editing portion 12 generates a new folder that contains the folders indicated by the above-described two folder icons 330. At this time, the cluster editing portion 12 holds information about the original two folders in the cluster information 16. Further, the cluster editing portion 12 generates a new folder as a higher level folder of these folders. In this case, the original two folders and the new folder have a parent-child relationship in a tree structure, and information of the tree structure formed by these folders is held in the cluster information 16.

Here, the cluster editing portion 12 provides information about the generated new folder to the display control portion 14, and the display control portion 14 causes the display portion 15 to display the folder icon 330 that indicates the new folder. Further, the display control portion 14 deletes, from the display portion 15, the folder icons 330 indicating the original two folders that are contained in the new folder.

On the other hand, the cluster editing portion 12 provides the information about the generated folder to the cluster name editing portion 13, and the cluster name editing portion 13 generates a folder name for the generated folder. For example, the cluster name editing portion 13 generates a folder name "text and music" by jointly using the folder names contained in the generated folder. The cluster name editing portion 13 provides information about the generated folder name to the display control portion 14, and the display control portion 14 displays the folder name in the vicinity of the corresponding folder icon 330, as the folder name display 340.

(Division of Folder)

FIG. 29 is a diagram showing a first example in which the folder is divided in the seventh embodiment of the present disclosure. FIG. 29 shows states before and after the folder is divided.

In the first example, the folder is divided using information of the folder tree structure that is held in the cluster information 16. More specifically, the folder is divided by changing the folder displayed as the folder icon 330 from a parent folder to child folders in the tree structure.

In (a) of FIG. 29, the display control portion 14 causes the display portion 15 to display the folder icon 330 and the folder name display 340. The operation acquisition portion 11 acquires the trajectory 320. The operation acquisition portion 11 provides information about the trajectory 320 to the cluster editing portion 12 and the display control portion 14. The display control portion 14 causes the display portion 15 to display the trajectory 320 as shown in (a) of FIG. 29.

In the example shown in (a) of FIG. 29, the trajectory 320 traverses the folder icon 330. When the trajectory 320 traverses the folder icon 330 in this way, the cluster editing portion 12 divides the folder indicated by the traversed folder icon 330.

In (b) of FIG. 29, the cluster editing portion 12 divides the folder indicated by the above-described folder icon 330 into two folders. As described above, the two folders after the division are lower level folders of the original folder in the folder tree structure. The cluster editing portion 12 provides information about the folders after the division to the display control portion 14, and the display control portion 14 causes the display portion 15 to display the folder icons 330 indicating the folders after the division. At this time, the display control portion 14 deletes the folder icon 330 indicating the folder before the division, from the display portion 15.

On the other hand, the cluster editing portion 12 provides information about the folders after the division to the cluster name editing portion 13, and the cluster name editing portion 13 acquires folder names of the folders after the division that are held in the cluster information 16, and provides the folder names to the display control portion 14. The display control portion 14 displays, as the folder name displays 340, the provided folder names in the vicinity of the corresponding folder icons 330.

FIG. 30 is a diagram showing a second example in which the folder is divided in the seventh embodiment of the present disclosure. FIG. 30 shows states before and after the folder is divided.

In (a) of FIG. 30, the display control portion 14 causes the display portion 15 to display the folder icon 330 and thumbnail displays 331. Note that the thumbnail displays 331 are icons that show files contained in the folder indicated by the folder icon 330, using thumbnail images etc. The operation acquisition portion 11 acquires the trajectory 320. The operation acquisition portion 11 provides information about the trajectory 320 to the cluster editing portion 12 and the display control portion 14. The display control portion 14 causes the display portion 15 to display the trajectory 320 as shown in (a) of FIG. 30.

In the example shown in (a) of FIG. 30, the trajectory 320 traverses the folder icon 330. When the trajectory 320 traverses the folder icon 330 in this way, the cluster editing portion 12 divides the folder indicated by the traversed folder icon 330.

Further, in the example shown in (a) of FIG. 30, the trajectory 320 classifies the thumbnail displays 331 included in the folder indicated by the folder icon 330, into a thumbnail display 331a and thumbnail displays 331b. In this type of case, the cluster editing portion 12 divides the folder indicated by the folder icon 330, in accordance with the classification of the thumbnail displays 331 classified by the trajectory 320.

In (b) of FIG. 30, the cluster editing portion 12 divides the folder indicated by the above-described folder icon 330 into two folders. These folders are folders that respectively contain the file shown by the thumbnail display 331a and the files shown by the thumbnail displays 331b, which are classified by the trajectory 320. The cluster editing portion 12 provides information about the folders after the division to the display control portion 14, and the display control portion 14 causes the display portion 15 to display the folder icons 330 that indicate the folders after the division. At this time, the display control portion 14 deletes the folder icon 330 that indicates the folder before the division, from the display portion 15. However, the thumbnail displays 331 may continue to be displayed in order to show the files contained in the folders indicated by the respective folder icons 330.

(Deletion of Folder)

FIG. 31 is a diagram showing an example in which the folder is deleted in the seventh embodiment of the present disclosure. FIG. 31 shows states before and after the folder is deleted.

In (a) of FIG. 31, the display control portion 14 causes the display portion 15 to display the folder icon 330 and the folder name display 340. The operation acquisition portion 11 acquires the trajectory 320. The operation acquisition portion 11 provides information about the trajectory 320 to the cluster editing portion 12 and the display control portion 14. The display control portion 14 causes the display portion 15 to display the trajectory 320 as shown in (a) of FIG. 31.

In the example shown in (a) of FIG. 31, the trajectory 320 traverses the folder icon 330 three times. When the trajectory 320 traverses the folder icon 330 a plurality of times in this way, the cluster editing portion 12 deletes the folder indicated by the traversed folder icon 330.

In the present embodiment, both the folder division and the folder deletion are performed when the trajectory 320 traverses the folder icon 330. The movement that traverses the folder icon 330, which is performed by the user using the trajectory of a pointing operation, is movement that intuitively evokes both the division and the deletion of the folder. Therefore, it is desirable that, while the trajectory 320 traversing the folder icon 330 is used as a trigger for both the division and the deletion of the folder, it is determined whether the folder is to be divided or the folder is to be deleted based on some kind of standard that feels natural to the user.

Given this, the cluster editing portion 12 determines whether the folder is to be divided or the folder is to be deleted based on the number of times the trajectory 320 traverses the folder icon 330. More specifically, when the trajectory 320 traverses the folder icon 330 once, the cluster editing portion 12 divides the folder. On the other hand, when the trajectory 320 traverses the folder icon 330 multiple times, the cluster editing portion 12 deletes the folder. At this time, the cluster editing portion 12 may delete the files contained in the deleted folder, together with the folder. In this case, the above-described determination based on the number of times traversing is performed may include a determination as to whether only the folder is to be deleted or the folder and the files are to be deleted together. For example, when the trajectory 320 traverses the folder icon 330 two or three times, the cluster editing portion 12 may delete only the folder, and when the trajectory 320 traverses the folder icon 330 four or more times, the cluster editing portion 12 may delete the folder and the files contained in the folder.

Note that the number of times that is used as the standard for determination is not limited to the above-described example. For example, as in the second example of the folder division, when the folder is divided by the trajectory 320 classifying the thumbnail displays 331 contained in the folder icon 330, it is likely to be necessary for the trajectory 320 to have a complicated shape in order to allow classification. Therefore, a larger number of times may be used as the standard for determination. Further, in order to inhibit the folder from being deleted by an erroneous operation, the trajectory 320 may have to traverse the folder icon 330 three times or more, for example, before the folder can be deleted.

In (b) of FIG. 31, the cluster editing portion 12 deletes the folder indicated by the above-described folder icon 330. The files contained in the deleted folder are currently not contained in the folder (more precisely, the files are directly contained in a root folder, which is not displayed). The cluster editing portion 12 provides the display control portion 14 with information about the deleted folder and the files classified into the deleted folder. The display control portion 14 deletes the folder icon 330 indicating the deleted folder from the display portion 15. At the same time, the display control portion 14 causes the display portion 15 to display the file icons 310 indicating the files contained in the deleted folder.

In this way, in the present embodiment, information about the user's operation on the folder icon 330 can be acquired as the trajectory 320 of the pointing operation, and various types of folder editing can be performed depending on the shape of the trajectory 320. Thus, the user can add various types of editing to the folder displayed as the folder icon 330, by performing an intuitive operation.

8. Hardware Configuration

Next, a hardware configuration of the information processing device 10 according to an embodiment of the present disclosure described above will be described in detail with reference to FIG. 32. FIG. 32 is a block diagram for describing a hardware configuration of the information processing device 10 according to an embodiment of the present disclosure.

The information processing device 10 includes a CPU 901, a ROM 903, and a RAM 905. Furthermore, the information processing device 10 may also include a host bus 907, a bridge 909, and external bus 911, an interface 913, an input device 915, an output device 917, a storage device 919, a drive 921, a connection port 923, and a communication device 925.

The CPU 901 functions as a processing device and a control device, and controls the overall operation or a part of the operation of the information processing device 10 according to various programs recorded in the ROM 903, the RAM 905, the storage device 919 or a removable storage medium 927. The ROM 903 stores programs to be used by the CPU 901, processing parameters and the like. The RAM 905 temporarily stores programs to be used in the execution of the CPU 901, parameters that vary in the execution, and the like. The CPU 901, the ROM 903 and the RAM 905 are connected to one another through the host bus 907 configured by an internal bus such as a CPU bus.

The host bus 907 is connected to the external bus 911 such as a PCI (Peripheral Component Interconnect/Interface) bus via the bridge 909.

The input device 915 is input means to be operated by a user, such as a mouse, a keyboard, a touch panel, a button, a switch, a lever or the like. Further, the input device 915 may be remote control means that uses an infrared or another radio wave, or it may be an externally-connected appliance 929 such as a mobile phone, a PDA or the like conforming to the operation of the information processing device 10. Furthermore, the input device 915 is configured from an input control circuit or the like for generating an input signal based on information input by a user with the operation means described above and outputting the signal to the CPU 901. A user of the information processing device 10 can input various kinds of data to the information processing device 10 or instruct the information processing device 10 to perform processing, by operating the input device 915.

The output device 917 is configured from a device that is capable of visually or auditorily notifying a user of acquired information. Examples of such device include a display device such as a CRT display device, a liquid crystal display device, a plasma display device, an EL display device or a lamp, an audio output device such as a speaker or a headphone, a printer, a mobile phone, a facsimile and the like. The output device 917 outputs results obtained by various processes performed by the information processing device 10, for example. To be specific, the display device displays, in the form of text or image, results obtained by various processes performed by the information processing device 10. On the other hand, the audio output device converts an audio signal such as reproduced audio data or acoustic data into an analogue signal, and outputs the analogue signal.

The storage device 919 is a device for storing data configured as an example of a storage unit of the information processing device 10. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various types of data, and various types of data obtained from the outside, for example.

The drive 921 is a reader/writer for a recording medium, and is incorporated in or attached externally to the information processing device 10. The drive 921 reads information recorded in the attached removable storage medium 927 such as a magnetic disk, an optical disk, a magneto-optical disk, or a semiconductor memory, and outputs the information to the RAM 905. Furthermore, the drive 921 can write in the attached removable storage medium 927 such as a magnetic disk, an optical disk, a magneto-optical disk, or a semiconductor memory. The removable storage medium 927 is, for example, a DVD medium, an HD-DVD medium, or a Blu-ray (registered trademark) medium. The removable storage medium 927 may be a CompactFlash (CF; registered trademark), a flash memory, an SD memory card (Secure Digital Memory Card), or the like. Alternatively, the removable storage medium 927 may be, for example, an electronic appliance or an IC card (Integrated Circuit Card) equipped with a non-contact IC chip.

The connection port 923 is a port for allowing devices to directly connect to the information processing device 10. Examples of the connection port 923 include a USB (Universal Serial Bus) port, an IEEE 1394 port, a SCSI (Small Computer System Interface) port, and the like. Other examples of the connection port 923 include an RS-232C port, an optical audio terminal, an HDMI (High-Definition Multimedia Interface) port, and the like. With the externally connected device 929 connected to this connection port 923, the information processing device 10 directly obtains various types of data from the externally connected device 929, and provides various types of data to the externally connected device 929.

The communication device 925 is a communication interface configured from, for example, a communication device for connecting to a communication network 931. The communication device 925 is, for example, a wired or wireless LAN (Local Area Network), a Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol, such as TCP/IP, on the Internet and with other communication devices, for example. The communication network 931 connected to the communication device 925 is configured from a network or the like connected via wire or wirelessly, and may be, for example, the Internet, a home LAN, infrared communication, radio wave communication, satellite communication or the like.

Heretofore, an example of the hardware configuration of the information processing device 10 has been shown. Each of the structural elements described above may be configured using a general-purpose material, or may be configured from hardware dedicated to the function of each structural element. Accordingly, the hardware configuration to be used can be changed as appropriate according to the technical level at the time of carrying out each of the embodiments described above.

9. Supplement

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10 Information processing device
11 Operation acquisition portion
12 Cluster editing portion
13 Cluster name editing portion
14 Display control portion
15 Display portion
16 Cluster information
100 Map
110 Image icon
120, 320 Trajectory
130, 230 Clusters display
135 Sub-cluster display
145 Sub-cluster name display
140 Cluster name display
160 Tree structure display
161 Node
200 Three-dimensional space
300 File layout
310 File icon
330 Folder icon
331 Thumbnail display
340 Folder name display

The invention claimed is:
1. An information processing device, comprising:
  circuitry configured to:
    display, on a display device, a first name of a first cluster comprising a first plurality of data items, wherein the first plurality of data items have at least a first data item association;
    acquire a first trajectory of a first user operation on the first cluster;
    generate at least one second cluster comprising a second plurality of data items, based on the first trajectory,
    wherein the second plurality of data items have at least a second data item association different from the at least first data item association;
    display at least two names for the at least one second cluster, based on the at least second data item association;
    detect a second user operation that corresponds to selection of a second name from the at least two names,
    wherein the second name comprises a plurality of words;
    acquire first information of the second name,
      wherein the first information comprises a third plurality of data items, and
      wherein each of the third plurality of data items corresponds to a respective one of the plurality of words;
    edit, based on the at least second data item association and the first information, the second name to generate a third name of the at least one second cluster;
    display the at least one second cluster with the third name;

display the first plurality of data items as a tree structure; and control modification of a node in the tree structure, based on the first trajectory of the first user operation that is across the tree structure.

2. The information processing device of claim 1, wherein the circuitry is further configured to receive the first user operation through a local interface.

3. The information processing device of claim 1, wherein the circuitry is further configured to receive the first user operation from a remote device.

4. The information processing device of claim 1, wherein the information processing device further comprises a touch panel configured to receive the first user operation.

5. The information processing device of claim 1, wherein the first trajectory is a closed loop that surrounds the first plurality of data items.

6. The information processing device of claim 1, wherein the circuitry is further configured to:
acquire a second trajectory of a third user operation on at least two clusters other than each of the first cluster and the at least one second cluster;
merge the at least two clusters into a third cluster, based on the second trajectory that is a closed loop that surrounds the at least two clusters,
wherein the third cluster has a fourth plurality of data items; and
create a fourth name for the third cluster, based on a common data item association for the fourth plurality of data items.

7. The information processing device of claim 1, wherein the circuitry is further configured to:
divide the first cluster into at least a third cluster and at least a fourth cluster based on the first trajectory of the first user operation that bisects the first cluster,
wherein the at least third cluster has a fourth plurality of data items and the at least fourth cluster has a fifth plurality of data items;
create a fourth name for the at least third cluster, based on a first common data item association for the fourth plurality of data items; and
create a fifth name for the at least fourth cluster, based on a second common data item association for the fifth plurality of data items.

8. The information processing device of claim 1, wherein the circuitry is further configured to:
terminate display of the first cluster, based on the first trajectory of the first user operation that traces a pattern over the first cluster; and
display the first plurality of data items.

9. The information processing device of claim 4, wherein the circuitry is further configured to:
register one of a drag operation, a flick operation or a pinch operation;
merge at least two clusters, other than each of the first cluster and the at least one second cluster, into a third cluster based on one of the drag operation, the flick operation, or the pinch operation that urges the at least two clusters towards each other,
wherein the third cluster has a fourth plurality of data items; and
generate a fourth name for the third cluster, based on a common data item association for the fourth plurality of data items.

10. The information processing device of claim 1, wherein the circuitry is further configured to:

receive a pinch-out operation on a third cluster other than each of the first cluster and the at least one second cluster;
divide the third cluster into at least a fourth cluster and at least a fifth cluster, based on the pinch-out operation; and
display a fourth name for the at least fourth cluster and a fifth name for the at least fifth cluster.

11. The information processing device of claim 1, wherein the circuitry is further configured to display the first cluster in a dimensional feature space by transformation of the first cluster into the dimensional feature space.

12. The information processing device of claim 11, wherein the dimensional feature space is a geographic space and each of the first plurality of data items is a geographic data item.

13. The information processing device of claim 1, wherein the first plurality of data items are files, and the first cluster is a folder that contains the files.

14. The information processing device of claim 13,
wherein the files are photographs, and
wherein the circuitry is further configured to:
detect a plurality of faces of people in the photographs; and
associate the photographs with the first cluster.

15. The information processing device of claim 1, wherein the circuitry is further configured to generate the at least one second cluster based on a shape of the first trajectory of the first user operation.

16. The information processing device of claim 1, wherein the circuitry is further configured to enter a cluster editing mode to edit the second name, based on detection of a third user operation on the display device.

17. An information processing method, comprising:
in an information processing device:
displaying, on a display device, a first name of a first cluster comprising a first plurality of data items, wherein the first plurality of data items have at least a first data item association;
acquiring a first trajectory of a first user operation on the first cluster;
generating at least one second cluster comprising a second plurality of data items, based on the first trajectory,
wherein the second plurality of data items have at least a second data item association different from the at least first data item association;
displaying at least two names for the at least one second cluster, based on the at least second data item association;
detecting a second user operation that corresponds to selection of a second name from the at least two names, wherein the second name comprises a plurality of words;
acquiring first information of the second name,
wherein the first information comprises a third plurality of data items, and
wherein each of the third plurality of data items corresponds to a respective one of the plurality of words;
editing, based on the at least second data item association and the first information, the second name to generate a third name of the at least one second cluster;
displaying the at least one second cluster with the third name;
displaying the first plurality of data items as a tree structure; and controlling modification of a node in the tree structure, based on the first trajectory of the first user operation that is across the tree structure.

18. The information processing method of claim 17, further comprising registering the first user operation on a touch panel.

19. The information processing method of claim 17, wherein the first trajectory surrounds the first plurality of data items.

20. The information processing method of claim 17, further comprising:
   acquiring a second trajectory of a third user operation on at least two clusters other than each of the first cluster and the at least one second cluster;
   merging the at least two clusters into a third cluster, based on the second trajectory that surrounds the at least two clusters,
   wherein the third cluster has a fourth plurality of data items; and
   creating a fourth name for the third cluster, based on a common data item association for the fourth plurality of data items.

21. A non-transitory computer-readable medium having stored thereon, computer-executable instructions, which when executed by a computer cause the computer to execute operations, the operations comprising:
   displaying, on a display device, a first name of a first cluster comprising a first plurality of data items, wherein the first plurality of data items have at least a first data item association;
   acquiring a trajectory of a first user operation on the first cluster;
   generating at least one second cluster comprising a second plurality of data items, based on the trajectory,
   wherein the second plurality of data items have at least a second data item association different from the at least first data item association;
   displaying at least two names for the at least one second cluster, based on the at least second data item association;
   detecting a second user operation that corresponds to selection of a second name from the at least two names, wherein the second name comprises a plurality of words;
   acquiring first information of the second name,
      wherein the first information comprises a third plurality of data items, and
      wherein each of the third plurality of data items corresponds to a respective one of the plurality of words;
   editing, based on the at least second data item association and the first information, the second name to generate a third name of the at least one second cluster;
   displaying the at least one second cluster with the third name;
   displaying the first plurality of data items as a tree structure; and
   controlling modification of a node in the tree structure, based on the trajectory of the first user operation that is across the tree structure.

\* \* \* \* \*